United States Patent
Okkema

(10) Patent No.: US 11,007,687 B2
(45) Date of Patent: May 18, 2021

(54) POLYURETHANE INJECTION SYSTEM AND METHOD

(71) Applicant: LEGACY FOAM, LLC, Zeeland, MI (US)

(72) Inventor: Bruce M. Okkema, Zeeland, MI (US)

(73) Assignee: LEGACY FOAM LLC, Zeeland, MI (US)

( * ) Notice: Subject to any disclaimer, the term of this patent is extended or adjusted under 35 U.S.C. 154(b) by 375 days.

(21) Appl. No.: 16/145,407

(22) Filed: Sep. 28, 2018

(65) Prior Publication Data

US 2019/0099926 A1   Apr. 4, 2019

Related U.S. Application Data

(60) Provisional application No. 62/566,675, filed on Oct. 2, 2017.

(51) Int. Cl.
*B29C 44/42* (2006.01)
*B29C 45/27* (2006.01)
(Continued)

(52) U.S. Cl.
CPC .............. *B29C 44/425* (2013.01); *B29B 7/00* (2013.01); *B29B 7/7457* (2013.01); *B29B 7/7471* (2013.01); *B29B 7/805* (2013.01); *B29B 7/806* (2013.01); *B29C 33/34* (2013.01); *B29C 44/04* (2013.01); *B29C 44/3442* (2013.01); *B29C 44/42* (2013.01); *B29C 44/588* (2013.01); *B29C 45/04* (2013.01); *B29C 45/2703* (2013.01); *B29C 2045/2714* (2013.01); *B29C 2045/2716* (2013.01); *B29K 2075/00* (2013.01); *B29K 2105/0014* (2013.01); *B29K 2105/04* (2013.01)

(58) Field of Classification Search
CPC .... B29C 2045/2714; B29C 2045/2716; B29C 45/04; B29C 45/0408; B29C 45/27; B29C 45/2701; B29C 45/2708; B29C 33/34; B29C 44/425
See application file for complete search history.

(56) References Cited

U.S. PATENT DOCUMENTS 806,783 A   12/1905  Dayton
2,290,510 A   7/1942  Talalay
(Continued)

FOREIGN PATENT DOCUMENTS

WO   WO-2010030584 A1 *   3/2010   ........... B29C 44/428

*Primary Examiner* — Atul P. Khare
(74) *Attorney, Agent, or Firm* — Price Heneveld LLP

(57) ABSTRACT

A system and method to dispense, mix, and inject liquids and force them into a vented investment pattern mold cavity comprises a source of raw materials in fluid communication with an injection unit for metering and delivering the raw materials. A mixing and injection head receives and mixes the metered raw materials. A movable molding cart upon which an investment pattern mold is mounted is disposed adjacent the injection unit and proximate the mixing and injection head. The movable molding cart includes a fill cup that may be engaged by the mixing and injection head. A displaceable gating tray provides fluid communication with the fill cup and a sprue aligned with an investment port on a lower portion of the investment pattern mold. The system also includes a digital computer control by which the injection process may be controlled.

50 Claims, 43 Drawing Sheets

(51) Int. Cl.
  *B29B 7/00* (2006.01)
  *B29C 44/34* (2006.01)
  *B29C 44/04* (2006.01)
  *B29B 7/80* (2006.01)
  *B29C 44/58* (2006.01)
  *B29B 7/74* (2006.01)
  *B29C 45/04* (2006.01)
  *B29C 33/34* (2006.01)
  *B29K 105/04* (2006.01)
  *B29K 75/00* (2006.01)
  *B29K 105/00* (2006.01)

(56) References Cited

U.S. PATENT DOCUMENTS

| | | |
|---|---|---|
| 2,992,455 A | 7/1961 | Salzman |
| 3,070,846 A | 1/1963 | Schrier |
| 3,108,326 A | 10/1963 | Thiel |
| 3,320,345 A | 5/1967 | Lirones |
| 3,581,341 A | 6/1971 | Perry |
| 3,787,159 A | 1/1974 | Bielfeldt |
| 3,799,723 A | 3/1974 | Lally et al. |
| 3,809,519 A | 5/1974 | Garner |
| 3,869,757 A | 3/1975 | Holly |
| 3,939,530 A | 2/1976 | Holly |
| 4,108,956 A | 8/1978 | Lee |
| 4,150,931 A | 4/1979 | Gabrys |
| 4,240,999 A * | 12/1980 | Decker, Jr. ............ B29C 44/383 264/46.5 |
| 4,532,093 A * | 7/1985 | O'Malley ................ B29C 33/36 264/101 |
| 4,653,995 A | 3/1987 | Ward |
| 4,740,150 A | 4/1988 | Sayer |
| 4,828,480 A | 5/1989 | Smith |
| 4,923,667 A | 5/1990 | Sayer |
| 4,943,407 A | 7/1990 | Hendry |
| 5,028,377 A | 7/1991 | Hendry |
| 5,110,085 A | 5/1992 | Iwasawa |
| 5,178,886 A | 1/1993 | Donovan et al. |
| 5,328,352 A | 7/1994 | Pierce |
| 5,407,342 A * | 4/1995 | Boucher ............ B29C 45/0025 425/145 |
| 5,997,783 A | 12/1999 | Hunter et al. |
| 6,056,536 A | 5/2000 | Schad et al. |
| 6,398,542 B1 | 6/2002 | Romanski et al. |
| 6,481,490 B1 | 11/2002 | Vihtelic et al. |
| 6,805,540 B2 | 10/2004 | Ishihara |
| 7,270,166 B2 | 9/2007 | Jakus et al. |
| 7,318,713 B2 | 1/2008 | Xu et al. |
| 7,458,806 B2 | 12/2008 | Barth |
| 7,878,785 B2 | 2/2011 | Cathcart et al. |
| 7,958,932 B2 | 6/2011 | Chaudhry et al. |
| 7,980,042 B2 * | 7/2011 | Polk, Jr. ................ B29C 51/20 52/587.1 |
| 8,366,429 B2 | 2/2013 | Cathcart et al. |
| 8,591,787 B2 | 11/2013 | Chaudhry et al. |
| 9,364,889 B2 | 6/2016 | Chaudhry et al. |
| 2002/0084543 A1* | 7/2002 | Buja ..................... B29C 45/78 264/40.4 |
| 2003/0127765 A1* | 7/2003 | Weiland ............ B29C 37/0028 264/69 |
| 2009/0028987 A1 | 1/2009 | Condo |
| 2013/0174996 A1 | 7/2013 | Chaudhry et al. |
| 2014/0138014 A1 | 5/2014 | Chaudhry et al. |

* cited by examiner

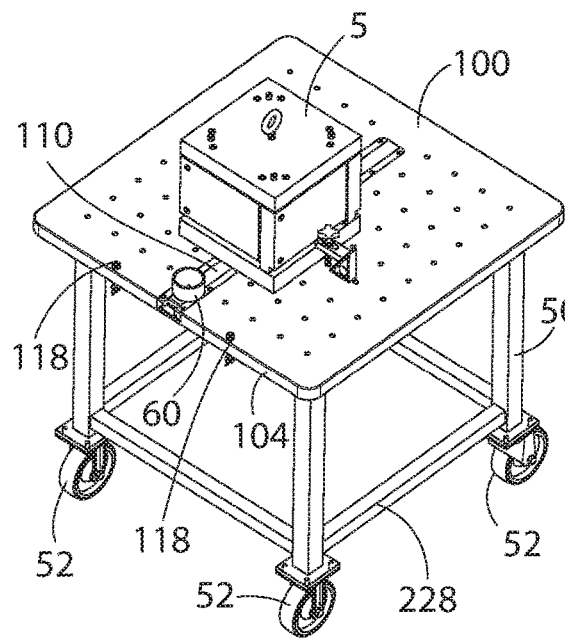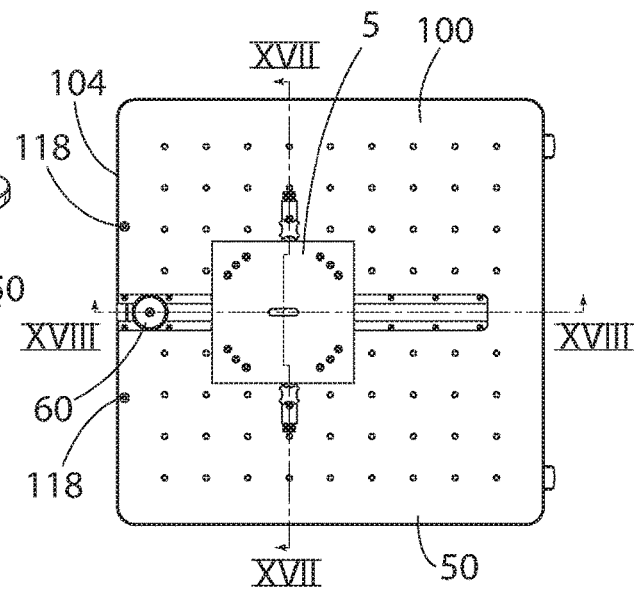
FIG. 15               FIG. 16
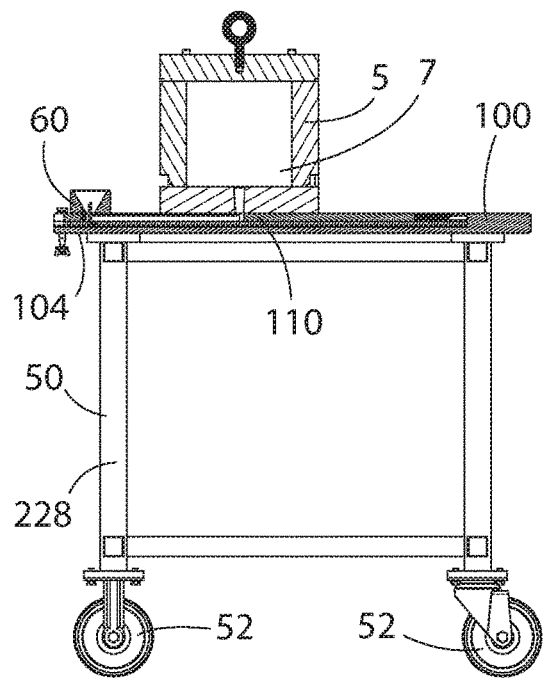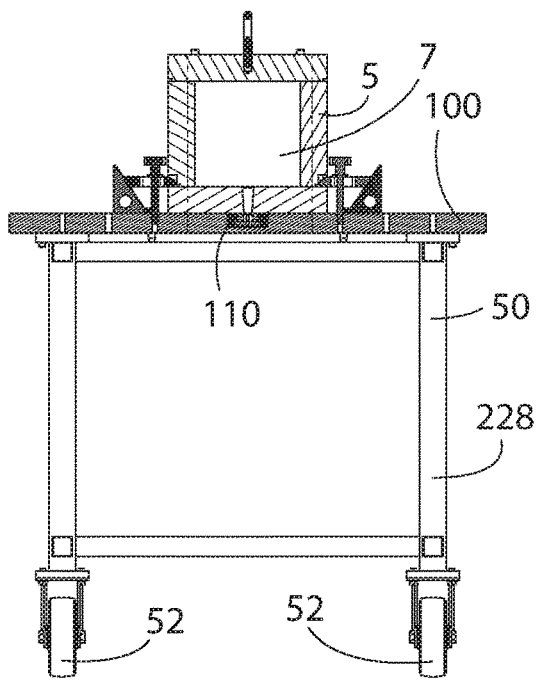
FIG. 17               FIG. 18

| No | Project Name | Iso | Polly | Injection Speed (cc/sec) | Shot Size (cc) | Mixer Speed (RPM) | Vent Timer (sec) | Injection Time (sec) | RPM Recommended |
|---|---|---|---|---|---|---|---|---|---|
| 1 | Ratio Check | 1 | 1 | 800 | 35 | 0 | 0 | 23 | 4200 |
| 2 | Cup Shot 2 | 1 | 1 | 550 | 40 | 5000 | 60 | 14 | 4800 |
| 3 | Cup Shot | 1 | 1 | 200 | 20 | 2500 | 56 | 10 | 2400 |
| 4 | Handle | 1 | 1 | 230 | 15 | 8000 | 0 | 15 | 1800 |
| 5 | Legacy Soluble Solid | 1 | 1 | 1250 | 60 | 4000 | 0 | 24 | 7200 |
| 6 | 33560 Aristo-Cast Plug | 1 | 1 | 425 | 25 | 4000 | 0 | 17 | 3000 |
| 7 | 33560 Hex Sample with Cores | 1 | 1 | 1000 | 30 | 5000 | 75 | 33 | 3600 |
| 8 | 3350 Hex Mold without Cores | 1 | 1 | 2000 | 80 | 6500 | 70 | 25 | 9600 |
| 9 | Count Check | 1 | 1 | 3000 | 25 | 2500 | 0 | 120 | 3000 |
| 10 | Program 1033560 Hex Mold | 1 | 1 | 540 | 45 | 4000 | 0 | 12 | 5400 |
| 11 | Program 10 | 0 | 0 | 0 | 0 | 0 | 0 | 0 | 0 |
| 12 | Program 12 | 0 | 0 | 0 | 0 | 0 | 0 | 0 | 0 |
| 13 | Program 13 | 0 | 0 | 0 | 0 | 0 | 0 | 0 | 0 |
| 14 | Program 14 | 0 | 0 | 0 | 0 | 0 | 0 | 0 | 0 |
| 15 | Program 15 | 0 | 0 | 0 | 0 | 0 | 0 | 0 | 0 |
| 16 | Program 16 | 0 | 0 | 0 | 0 | 0 | 0 | 0 | 0 |

FIG. 32

| No | Project Name | Iso | Polly | Injection Speed (cc/sec) | Shot Size (cc) | Mixer Speed (RPM) | Vent Timer (sec) | Injection Time (sec) | RPM Recommended |
|---|---|---|---|---|---|---|---|---|---|
| 1 | Ratio Check | 1 | 1 | 800 | 35 | 0 | 0 | 23 | 4200 |
| 2 | Cup Shot 2 | 1 | 1 | 550 | 40 | 5000 | 60 | 14 | 4800 |
| 3 | Cup Shot | 1 | 1 | 200 | 20 | 2500 | 56 | 10 | 2400 |
| 4 | Handle | | | | | | | | 1800 |
| 5 | Legacy Solut | | | | | | | | 7200 |
| 6 | 33560 Aristo | | | | | | | | 3000 |
| 7 | 33560 Hex Sc | | | | | | | | 3600 |
| 8 | 3350 Hex Mc | | | | | | | | 9600 |
| 9 | Count Check | | | | | | | | 3000 |
| 10 | Program 103 | | | | | | | | 5400 |
| 11 | Program 10 | | | 0 | 0 | 0 | 0 | 0 | 0 |
| 12 | Program 12 | | | 0 | 0 | 0 | 0 | 0 | 0 |
| 13 | Program 13 | | | 0 | 0 | 0 | 0 | 0 | 0 |
| 14 | Program 14 | | | 0 | 0 | 0 | 0 | 0 | 0 |
| 15 | Program 15 | | | 0 | 0 | 0 | 0 | 0 | 0 |
| 16 | Program 16 | | | 0 | 0 | 0 | 0 | 0 | 0 |

Dialog overlay:
Project Name: 33560 Aristo-Cast Plug
Halo A: 1
Halo B: 1
Shot Size (cc): 425
Injection Speed (cc/sec): 25
Mixer Speed (RPM): 4000
Vent Timer (sec): 0
[Cancel] [Save]

[Mixer Load] [Abort Cycle] [Load Selected Program] [Edit Selected Program] [Save To File] [Load From File]

FIG. 33

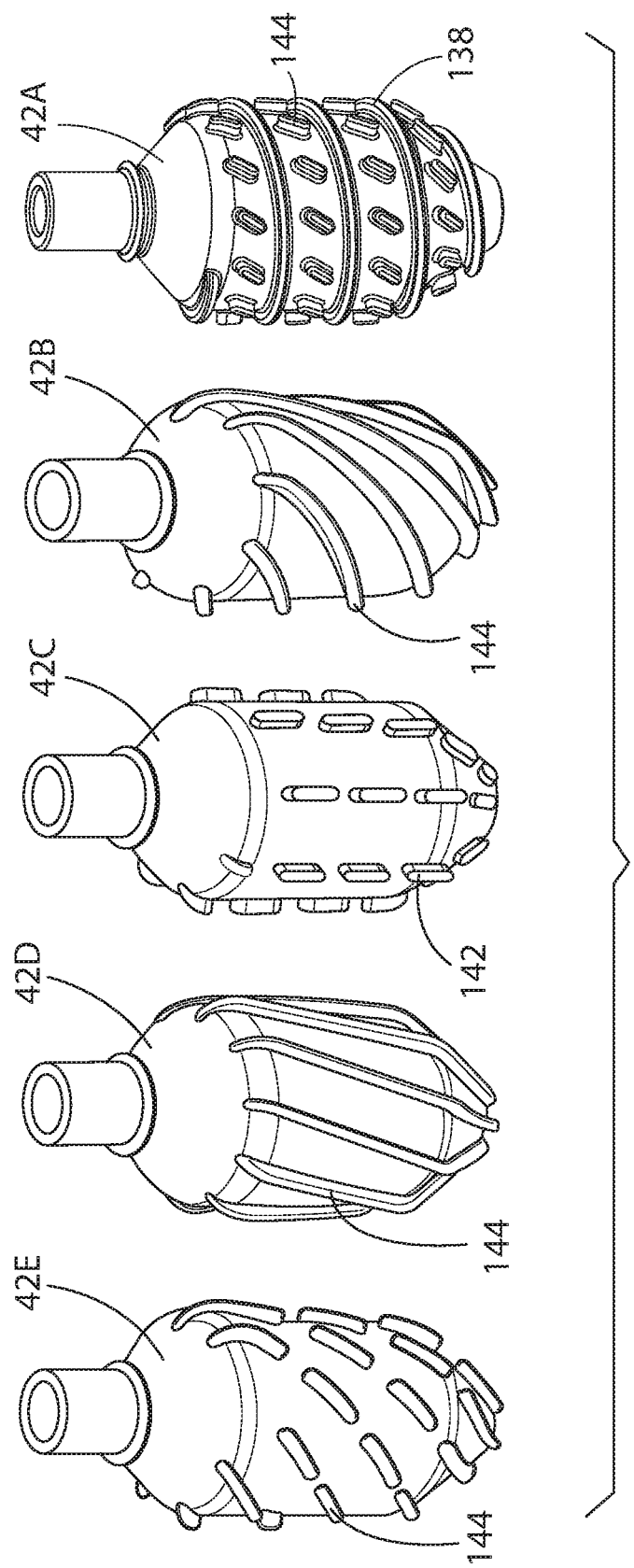

POLYURETHANE INJECTION SYSTEM AND METHOD

CLAIM OF PRIORITY

This application claims priority under 35 U.S.C. § 119(e) to U.S. Provisional Application No. 62/566,675 filed Oct. 2, 2017, entitled "Foam Injection System," which is incorporated herein by reference in its entirety.

FIELD OF THE INVENTION

The present disclosure relates to a polyurethane injection system and method for molding useful articles, such as cellular foam patterns used in metal investment castings and, more particularly, an automated polyurethane injection system for automatically mixing and delivering a predetermined quantity of materials for the injection of polyurethane articles.

BACKGROUND OF THE INVENTION

Recently, the metal investment castings industry has begun to employ the use of cellular foam patterns around which a ceramic mold can be produced for the purpose of pouring investment castings of commonly used metals. The cellular foam pattern, often comprised of a polyurethane composition, is intended to be substituted for wax patterns used in the lost wax process. Wax patterns have long suffered from the disadvantage that wax patterns tend to distort when removed from the investment pattern mold cavity and thus fail to provide a faithful reproduction of the intended component or product configuration. However, the formation of cellular foam patterns using a polyurethane material has been found to be problematic, in that the A component (isocyanate) and the B component (typically a polyol such as glycerin, soybean oil, or other polyol), and potentially a catalyst, must be immediately and thoroughly mixed prior to such injection. An improved dispensing, mixing, and injection system and method to achieve timely delivery of the fully mixed polyurethane material to the investment pattern mold cavity, particularly a system and method that simplifies use and increases repeatability of the overall process, was desired.

BRIEF SUMMARY OF THE INVENTION

The present disclosure thus provides a system and method to dispense, mix, and inject liquids and force them into a mold cavity, which may be a vented investment pattern mold cavity. The formulation chemically reacts to create a self-skinning foam article that completely fills the cavity, and importantly, maintain its shape subsequent to removal from the investment pattern mold cavity. Additionally, the disclosure provides a system and method for sealing the investment pattern mold cavity, rinsing and drying a vertical mixing chamber, and expelling the rinse material into a collection vessel. This process defines a complete cycle, wherein one injection per cycle may be obtained. The present disclosure also depicts a system capable of very small molds and small shot sizes. The various components, features, operations, and steps of this system and method are described herein.

According to a first aspect of the present disclosure, an injection system for molding molded articles within a mold cavity is disclosed. The injection system comprises an injection unit comprising a mixing and injection head further comprising a vertical mixing chamber, an inlet to the vertical mixing chamber for raw material, and an injection nozzle at a lower end of the vertical mixing chamber for an injectable product. A metering pump delivers a predetermined quantity of raw materials to the vertical mixing chamber. A movable molding cart is provided upon which the mold cavity is mounted, the movable molding cart comprising a displaceable gating tray disposed within a channel, a fill cup disposed on the displaceable gating tray, and a closable sprue in alignment with the mold cavity. When the movable molding cart is in a first position proximate the mixing and injection head, the fill cup may be placed in vertical alignment with the injection nozzle of the vertical mixing chamber and the closable sprue is placed in an open position, whereby the injectable product is injected into an investment port of the mold cavity.

According to another aspect of the present disclosure, a system to dispense, mix, and inject liquids and force them into a vented investment pattern mold cavity comprises a source of raw materials in fluid communication with an injection unit for metering and delivering the raw materials. A mixing and injection head mounted proximate an edge of the injection unit receives and mixes the metered raw materials. A movable molding cart upon which an investment pattern mold is mounted is disposed adjacent the injection unit and proximate the mixing and injection head. The movable molding cart may include a fill cup mounted to an edge of an upper platform that may be controlled by the position of the mixing and injection head, rinse table, or manually. The movable molding cart may include a displaceable gating tray upon which the fill cup is mounted at a first end thereof. The displaceable gating tray is disposed within a channel provided in the upper platform of the movable molding cart. When the cart is locked in the molding position, the displaceable gating tray is capable of being in fluid communication with the sprue and capable of being aligned with an investment port on a lower portion of the investment pattern mold at a second, opposite end of the displaceable gating tray.

According to a still further aspect of the present disclosure, the system also includes a digital computer control by which the injection process is controlled and the components to be injected are metered, mixed, and injected. The digital computer can be readily programed to store information by which to control the ratio of the components used in the injection of the polyurethane, the mixing speed and duration, and injection period for a wide variety of molded articles, and thereby control the properties of the molded article, the cycle time of the molding process, and quickly allow interchangeable use of the system with a wide variety of molded articles.

According to an additional aspect of the present disclosure, an injection system to dispense, mix, and inject liquids and force them into a vented investment pattern mold cavity of an investment pattern mold is disclosed. A source of raw materials is in fluid communication with an injection unit for metering and delivering the raw material. A mixing and injection head is mounted proximate an edge of the injection unit that receives and mixes the metered raw materials. A movable molding cart upon which the investment pattern mold is mounted is disposed adjacent the injection unit and proximate the mixing and injection head, the movable molding cart further comprising a fill cup mounted proximate an edge of an upper platform that may be may be controlled by the position of the mixing and injection head, rinse table, or manually.

According to another aspect of the present disclosure, the movable molding cart may be moved to a first position adjacent the injection unit to align the sprue with the investment port on the lower portion of the investment pattern mold and automatically displaced to a second position when the movable molding cart is removed from the first position adjacent the injection unit to displace a displaceable gating tray and close fluid communication between the sprue and the investment port on the lower portion of the investment pattern mold. Alternatively, the movement in the displaceable gating tray is not actuated by the cart and is actuated manually. The system may then automatically move the piston and close both the sprue and mold filling port according to a programmed cycle time.

According to an additional aspect of the present disclosure, the mixing and injection head comprises a rotatable turbine and a static mix chamber housing. The rotatable turbine has a cylindrical cavity adapted to receive an axially reciprocating plunger biased to a fully extended position by a spring disposed at a closed end of the central cavity, which urges the axially reciprocating plunger to the fully extended position. When the mixing and injection head is fully engaged with either of the fill cup or the rinse cup, a vertically extending pin mounted within each of the fill cup and the rinse cup pushes the axially reciprocating plunger upward against the urging of the spring to allow material to exit the mixing head.

According to a further aspect of the present disclosure, the mixing and injection head may be engaged with the rinse cup at the conclusion of the injection cycle. The injection unit is then actuated to pass solvent rinse through the mixing and injection head, where in a first embodiment the vertically extending pin mounted within the rinse cup pushes the plunger upward against the urging of the spring to allow passage of the solvent rinse through the rinse cup and a waste line to a waste rinse vessel.

According to yet another aspect of the present disclosure, a method is disclosed for dispensing, mixing, and injecting a polymer formulation into a mold cavity wherein the formulation chemically reacts to create a self-skinning foam article that completely fills the mold cavity and maintains its shape subsequent to removal from the mold cavity. The method comprises the steps of: mounting the mold cavity upon a movable molding cart, the movable molding cart comprising a displaceable gating tray disposed within a channel and a closable sprue in alignment with the mold cavity; moving the movable molding cart into proximity with a vertical mixing chamber; delivering a predetermined quantity of raw materials of the polymer formulation to a vertical mixing chamber; mixing the raw materials of the polymer formulation within the vertical mixing chamber; injecting the raw materials of the polymer formulation into the mold cavity; sealing the mold cavity; and rinsing the vertical mixing chamber with a rinse material and expelling the rinse material into a collection vessel and drying the vertical mixing chamber.

These and other aspects, objects, and features of the present invention will be understood and appreciated by those skilled in the art upon studying the following specification and appended drawings.

BRIEF DESCRIPTION OF THE DRAWINGS

FIG. 15 is a perspective view of the movable molding cart of the first embodiment of the injection system in accordance with the present disclosure;

FIG. 16 is a top view of the movable molding cart of the first embodiment of the injection system in accordance with the present disclosure;

FIG. 17 is a front cross-sectional view of the movable molding cart along the line XVII-XVII of the first embodiment of the injection system of FIG. 16 in accordance with the present disclosure;

FIG. 18 is a side cross-sectional view of the movable molding cart along the line XVIII-XVIII of the first embodiment of the injection system of FIG. 16 in accordance with the present disclosure;

FIG. 32 is a front view of the control panel of the second embodiment of the injection system in accordance with the present disclosure;

FIG. 33 is another front view of the control panel of the second embodiment of the injection system in accordance with the present disclosure;

FIG. 51 is a perspective view of various embodiments of the rotatable turbine in accordance with the present disclosure.

DETAILED DESCRIPTION

Figure 1:
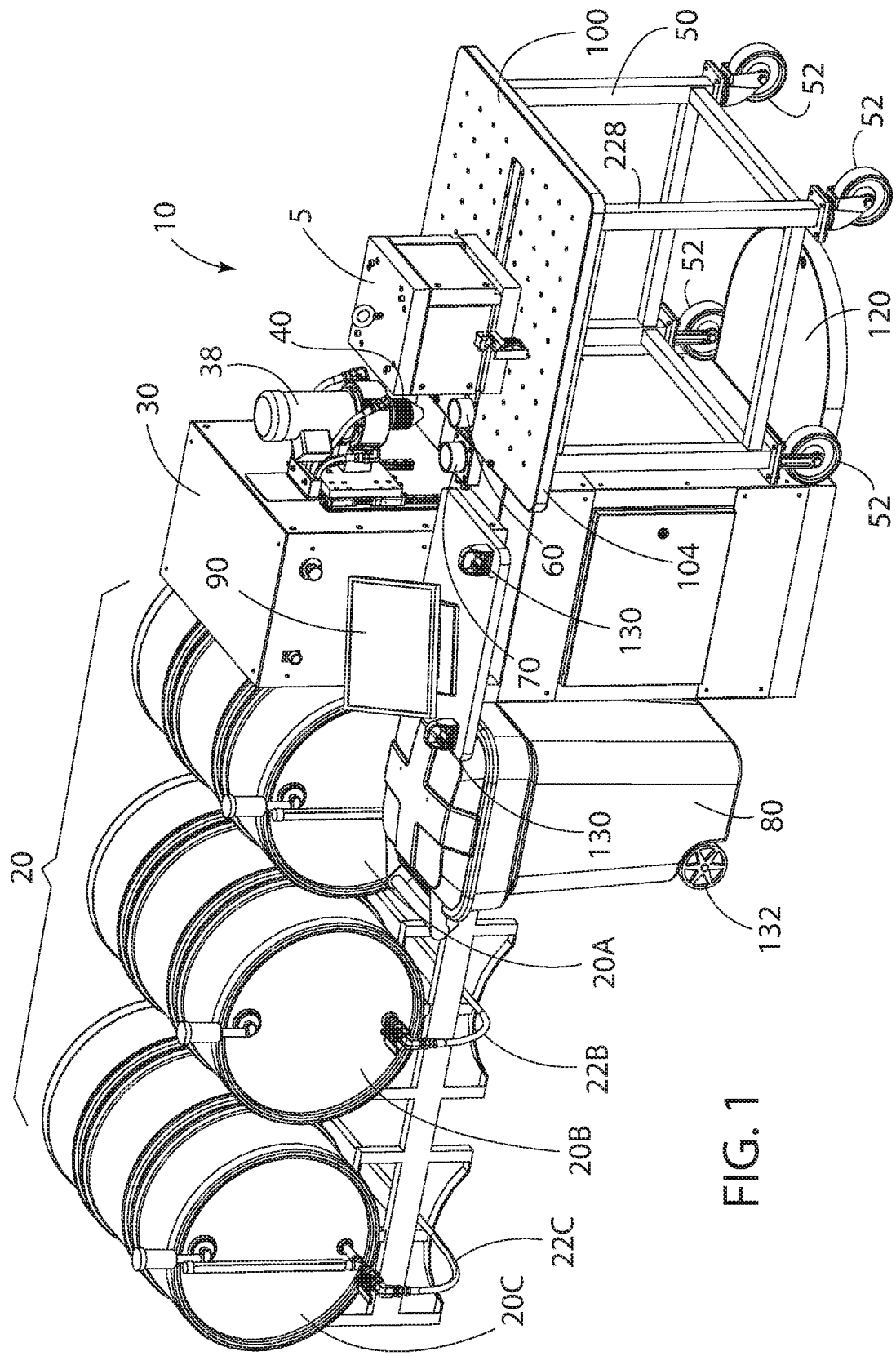
FIG. 1 is a front side perspective view of a first embodiment of the injection system in accordance with the present disclosure.
Figure 2:
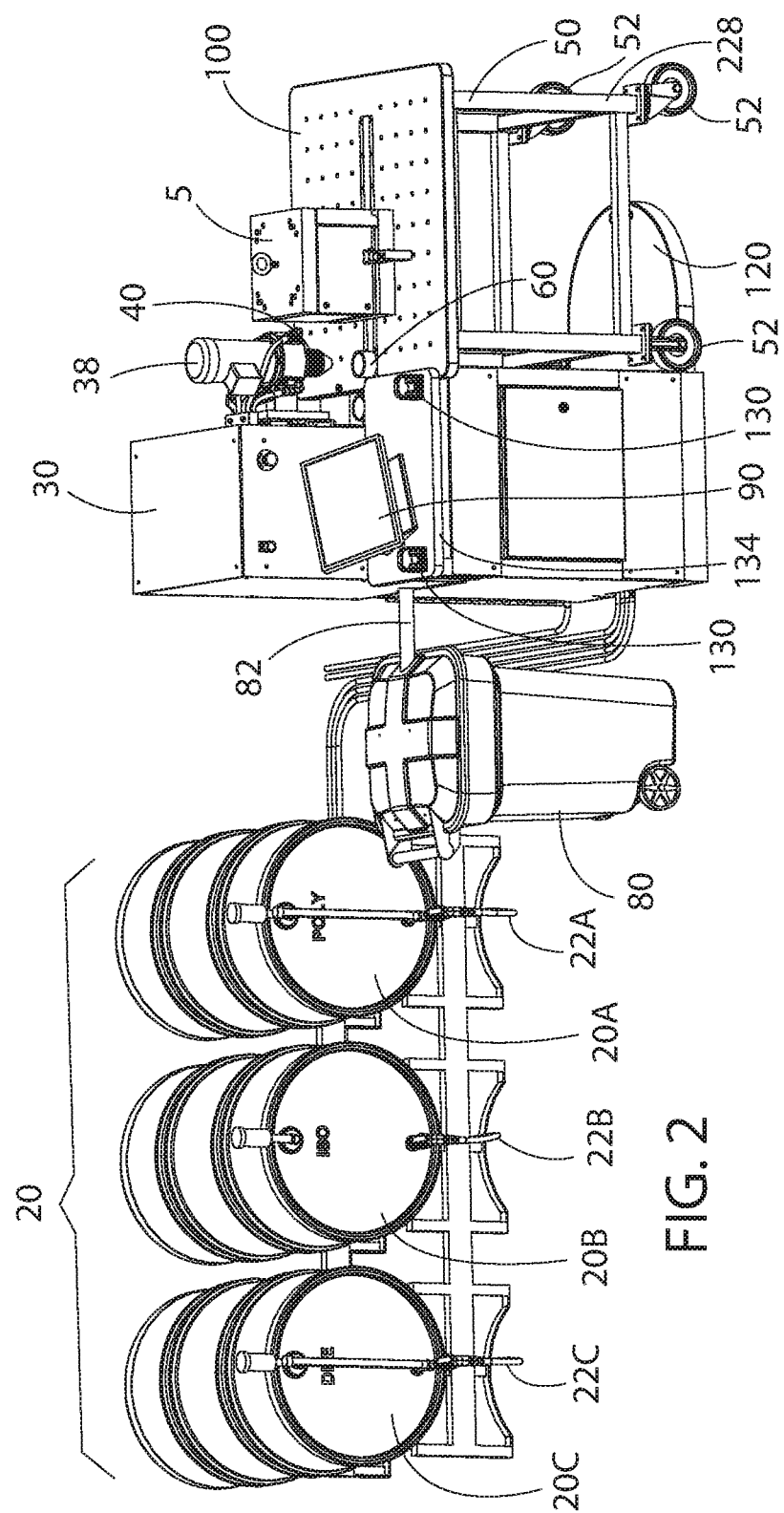
FIG. 2 is another front side perspective view of the first embodiment of the injection system in accordance with the present disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In accordance with the present disclosure, a system and method for dispensing, mixing and injecting a combination of chemical formulations comprised of an isocyanate and polyol are disclosed. These chemical formulations may be formulated to provide specific advantages to several aspects of the mold-making foundry processes, such as dimensional accuracy and stability, good quality surface finish and detail, minimal thermal expansion, minimal ash and residue after burnout, and high chemical stability in its raw state.

The overall system 10 consists of a source of raw materials 20, an injection unit 30 for metering and delivering the raw materials 20, a mixing and injection head 40 that receives and mixes the metered raw materials 20, a movable molding cart 50 upon which an investment pattern mold 5 may be mounted and upon which may be provided a fill cup 60 that is engaged by the mixing and injection head 40, a rinse cup 70, and a waste rinse vessel 80. The system is preferably powered by 480 three phased power and compressed air service.

The raw materials 20 may include a stored quantity 20A of an A component comprised of an isocyanate, a stored quantity 20B of an B component comprised of a polyol, and a stored quantity 20C of a solvent rinse, such as dibasic ester. The raw materials 20 are in fluid communication via lines 22C, 22B, 22C with the injection unit 30, within which are disposed the motors 24A, 24B, 24C, metering pumps 26A, 26B 26C, delivery lines 28A, 28B, 28C, and various hydraulic lines and fittings, pneumatic valves and cylinders coupled with and controlled by a Programmable Logic Controller (PLC), which is further controlled by a digital computer 90 sending stored data and parameters programmed by the user to the PLC. A pressurized dry nitrogen tank 16 may be in fluid communication with each of stored quantities 20A, 20B, 20C via pressure line 18 to facilitate a constant and reliable flow of raw materials 20 though lines 22A, 22B, 22C to the injection unit 30.

A consistent ratio of the A to B components is desired. To achieve such a mixture in consistent and predetermined ratios, the injection unit 30 delivers precise quantities of the A and B components, in the desired ratio, to the mixing and injection head 40, which will be described in more detail below. The injection unit 30 achieves a consistent mix ratio by controlling the operation and output of the hydraulic gear metering pumps 26A, 26B, which may be driven by 1-HP servo motors 24A, 24B, capable of delivering over five gallons of product in one minute. The metering pumps 26A, 26B are driven at precise, controlled speeds by the PLC and its digital servo motors 24A, 24B. The metering pumps 26A, 26B dispense a precise volume of liquid per revolution, while encoders, mounted on the motor shafts, count the number of revolutions of the shaft over a specified period of time, providing feedback to the PLC in order to dispense the specified volume of liquid. By controlling the speed of the motors 24A, 24B, the delivery rate of the product to the mixing and injection head 40 can also be precisely controlled.

The system 10 is controlled by a computer 90 running a standard operating system. The computer 90 allows for network connectivity, normal backup and uploading capability, as well as providing both a manual and an automatic operating mode for the machine. In particular, each investment pattern mold 5 may have a specific and differing volume of material required to fill it. As demonstrated in FIGS. 32 and 33, the user may create hundreds of unique mold-specific programs with data fields such as project name, mold volume/shot size, mix ratio, injection speed, injection time, mixing speed, vent time, etc. The computer 90 may have the capability of storing these programs and using this data to control the system parameters while operating in the automatic mode during an injection cycle and a rinse cycle. The system 10 is thus adapted to automatically dispense the raw materials in the desired quantity at a desired rate, mix and inject liquids and force them into a cavity 7 of the investment pattern mold 5 from a source of raw materials 20 in fluid communication with the injection unit 30 for metering.

In sum, the digital computer control can be programmed to store information by which to control the ratio of the components used in the injection of the injectable product, such as polyurethane, the mixing speed and duration, and the injection period for a plurality of molded articles, and thereby control the properties of the molded article, thereby reducing the cycle time of the molding process and allowing rapid interchangeable use of the system with a wide variety of molded articles.

The mixing and injection head 40 of the injection unit 30 may be movable vertically before and after the injection cycle and the rinse cycle by PLC controlled pneumatic cylinders and pneumatic valves that are adapted to raise and lower the mixing and injection head 40, and to engage and disengage the movable molding cart 50 at various points during the injection cycle and the rinse cycle. The mixing and injection head 40 is mounted proximate an edge of the injection unit 30 and receives and mixes the metered raw materials 20.

The movable molding cart 50, upon which the investment pattern mold 5 is mounted, may be selectively disposed adjacent the injection unit 30 and proximate the mixing and injection head 40. A semi-circular floor guide 120 may be located adjacent the bottom portion of the injection unit 30, the semi-circular floor guide 120 having a diameter slightly smaller than the space between the wheels 52 of the movable molding cart 50, whereby the movable molding cart 50 is reliably positioned relative to the injection unit 30 when moved toward the injection unit 30. The upper platform 100 of the movable molding cart 50 may be provided with a plurality of threaded mounting holes 102 by which a wide variety of shapes and sizes of investment pattern molds 5 may be attached and secured.

Figure 19:
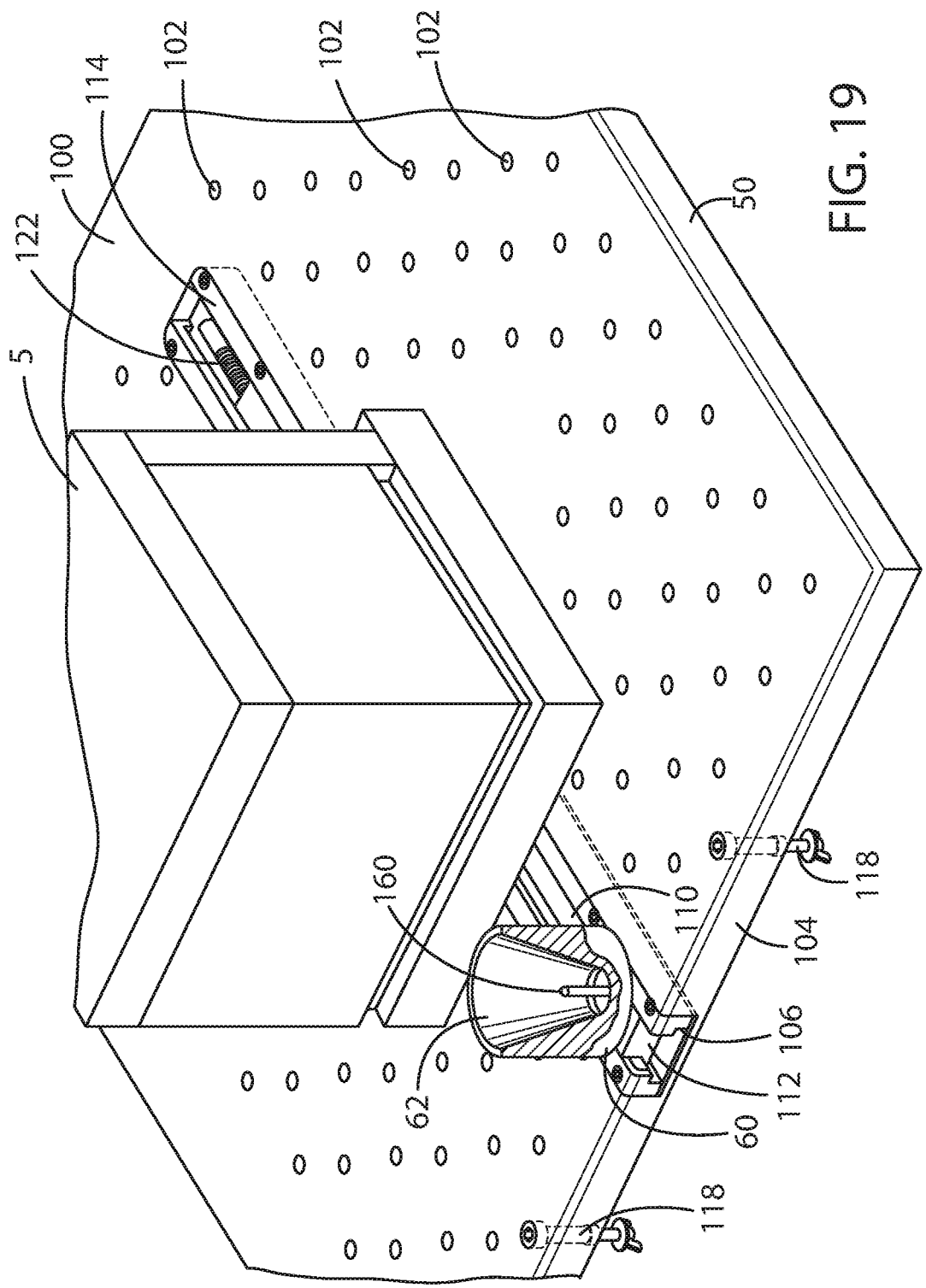
FIG. 19 is a partial cross-sectional view of the movable molding cart and investment pattern mold of the first embodiment of the injection system in accordance with the present disclosure.

The movable molding cart 50 may include the fill cup 60 mounted to a displaceable gating tray 110 and disposed near an edge 104 of the upper platform 100 that may be selectively engaged by the mixing and injection head 40. The displaceable gating tray 110 may be disposed within a channel 106, best seen in FIG. 19, provided in the upper platform 100 of the movable molding cart 50. The displaceable gating tray 110 is adapted to provide fluid communication with the fill cup 60 at a first end 112 thereof and a sprue 108 aligned with an investment port 116 on a lower portion of the investment pattern mold at a second, opposite end 114 thereof, as perhaps best seen in FIG. 20. The rinse cup 70 may be also mounted on an edge of the injection unit 30, as further described herein.

A compression spring 122 may be disposed proximate the second, opposite end of the displaceable gating tray 110 and urges the displaceable gating tray 110 toward the injection unit 30 when the mixing and injection head 40 is stationed in its Up position, thus forcing the displaceable gating tray 110 and the fill cup 60 toward the edge 104 of the upper platform 100 of the movable molding cart 50.

Figure 3:
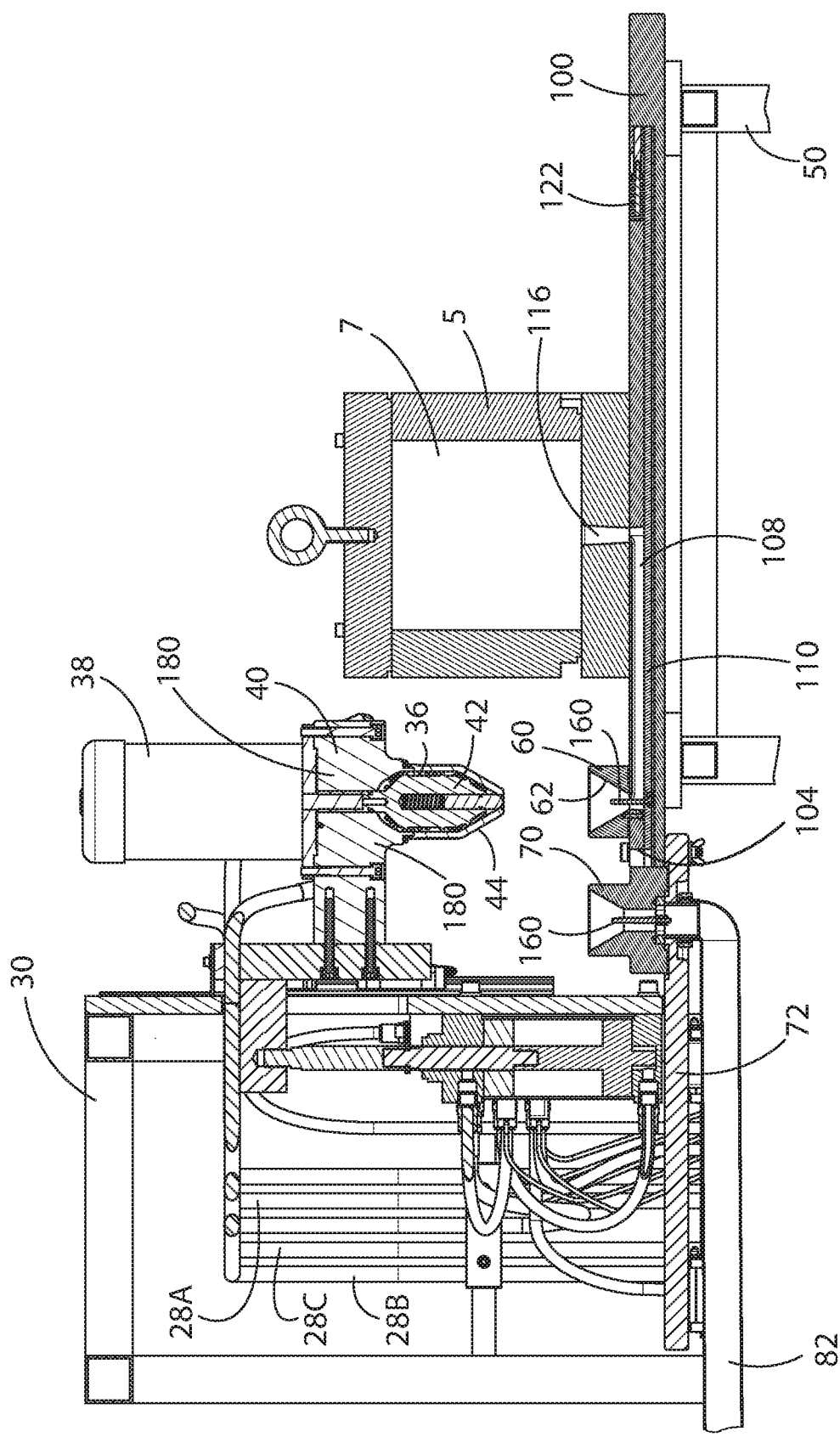
FIG. 3 is side cross-sectional view of the injection unit, mixing and injection head, and investment pattern mold of the first embodiment of the injection system in accordance with the present disclosure.
Figure 4:
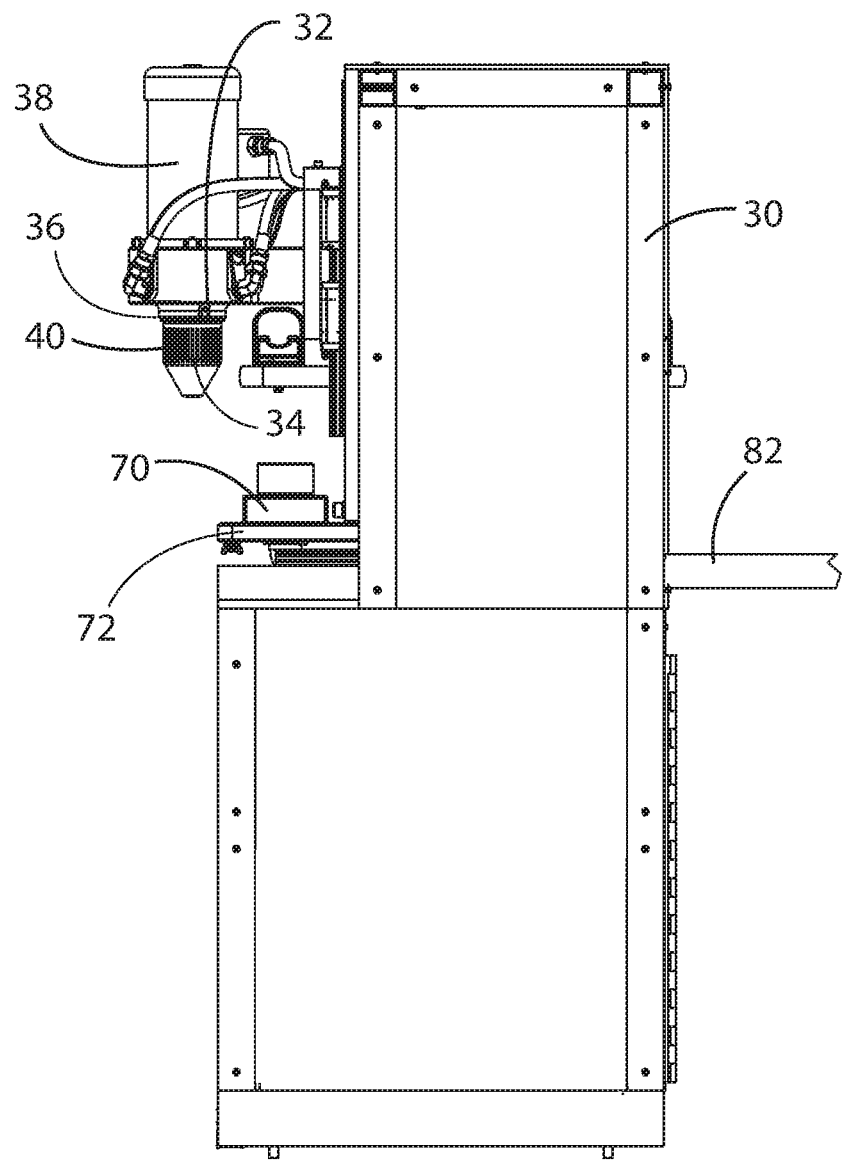
FIG. 4 is side view of the injection unit and mixing and injection head of the first embodiment of the injection system in accordance with the present disclosure.
Figure 5:
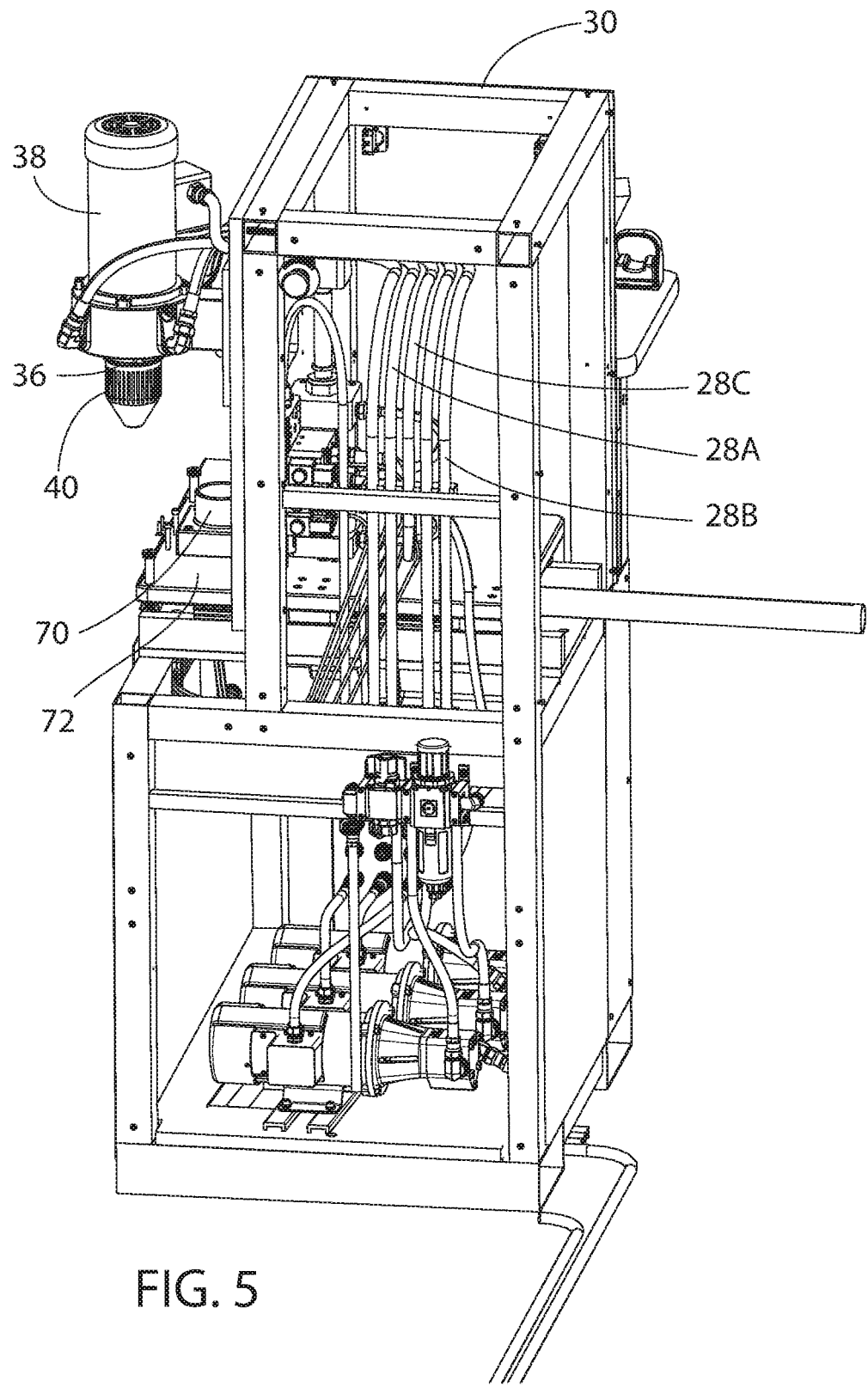
FIG. 5 is a rear perspective view of the injection unit and mixing and injection head of the first embodiment of the injection system in accordance with the present disclosure.
Figure 6:
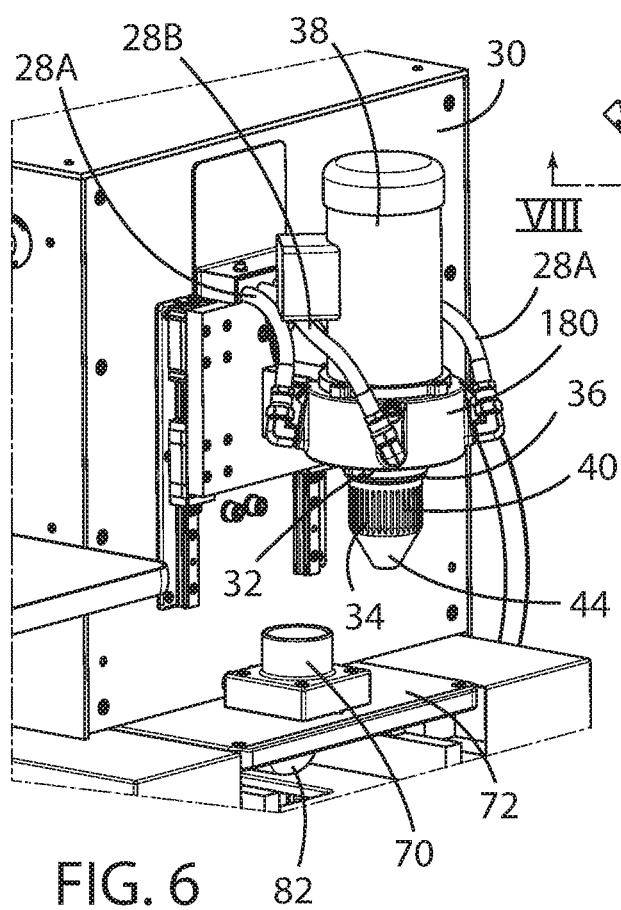
FIG. 6 is a perspective view of the mixing and injection head of the first embodiment of the injection system in accordance with the present disclosure.
Figure 7:
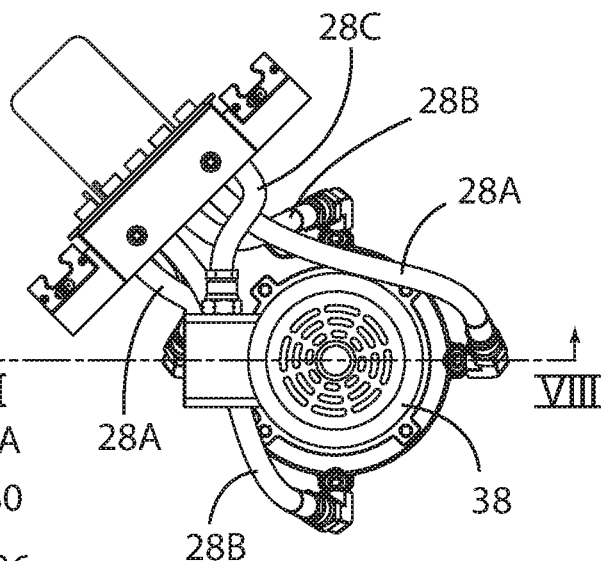
FIG. 7 is a perspective view of the mixing and injection head of the first embodiment of the injection system in accordance with the present disclosure.
Figure 8:
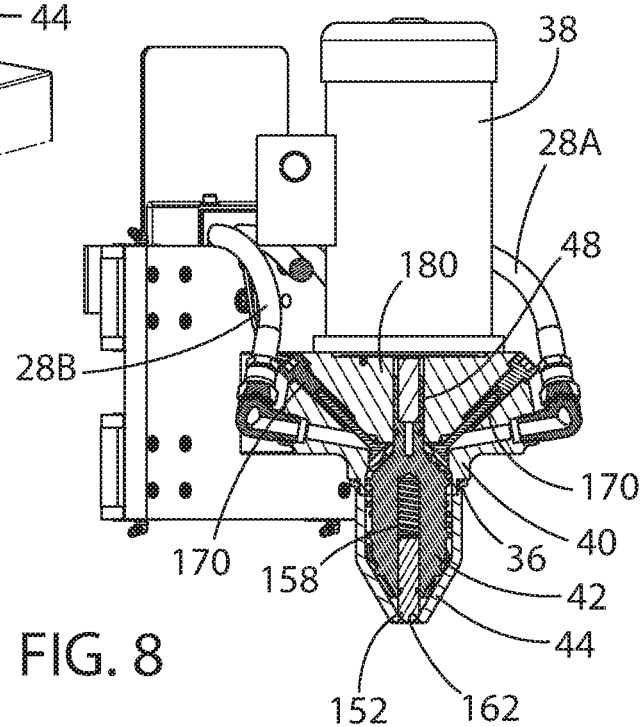
FIG. 8 is a cross-sectional side view of the mixing and injection head of the first embodiment of the injection system in accordance with the present disclosure, taken along the line VIII-VIII in FIG. 7.
Figure 9:
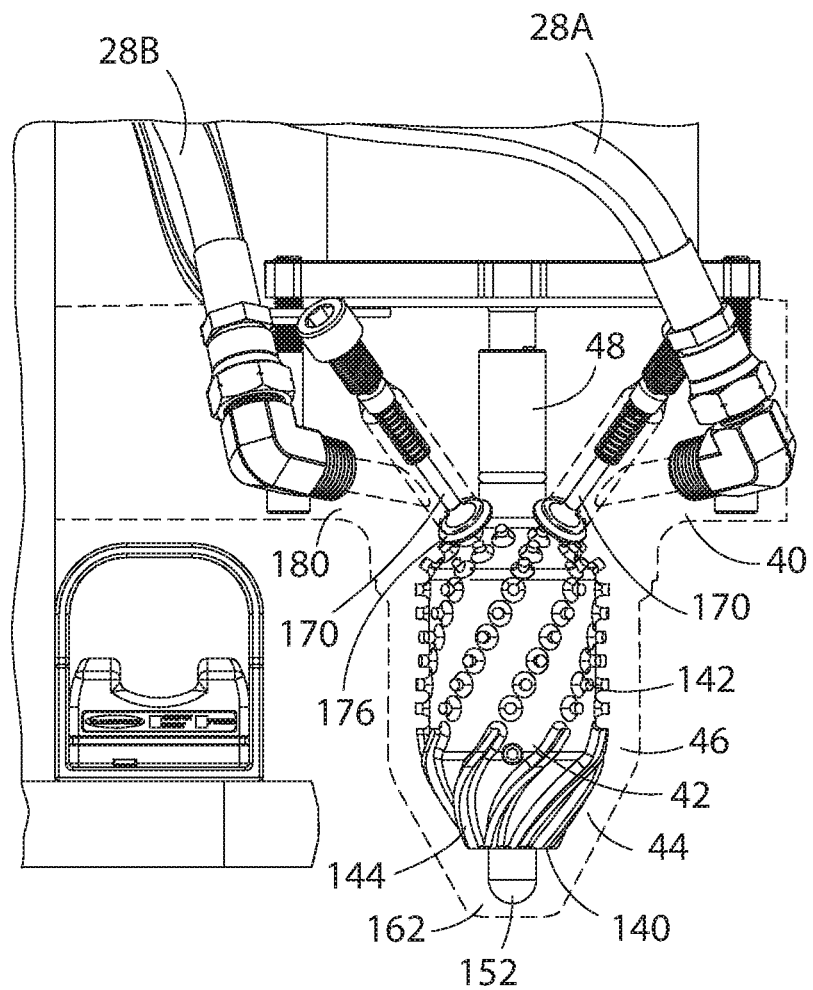
FIG. 9 is a transparent side view of the mixing and injection head of the first embodiment of the injection system in accordance with the present disclosure.
Figure 10:
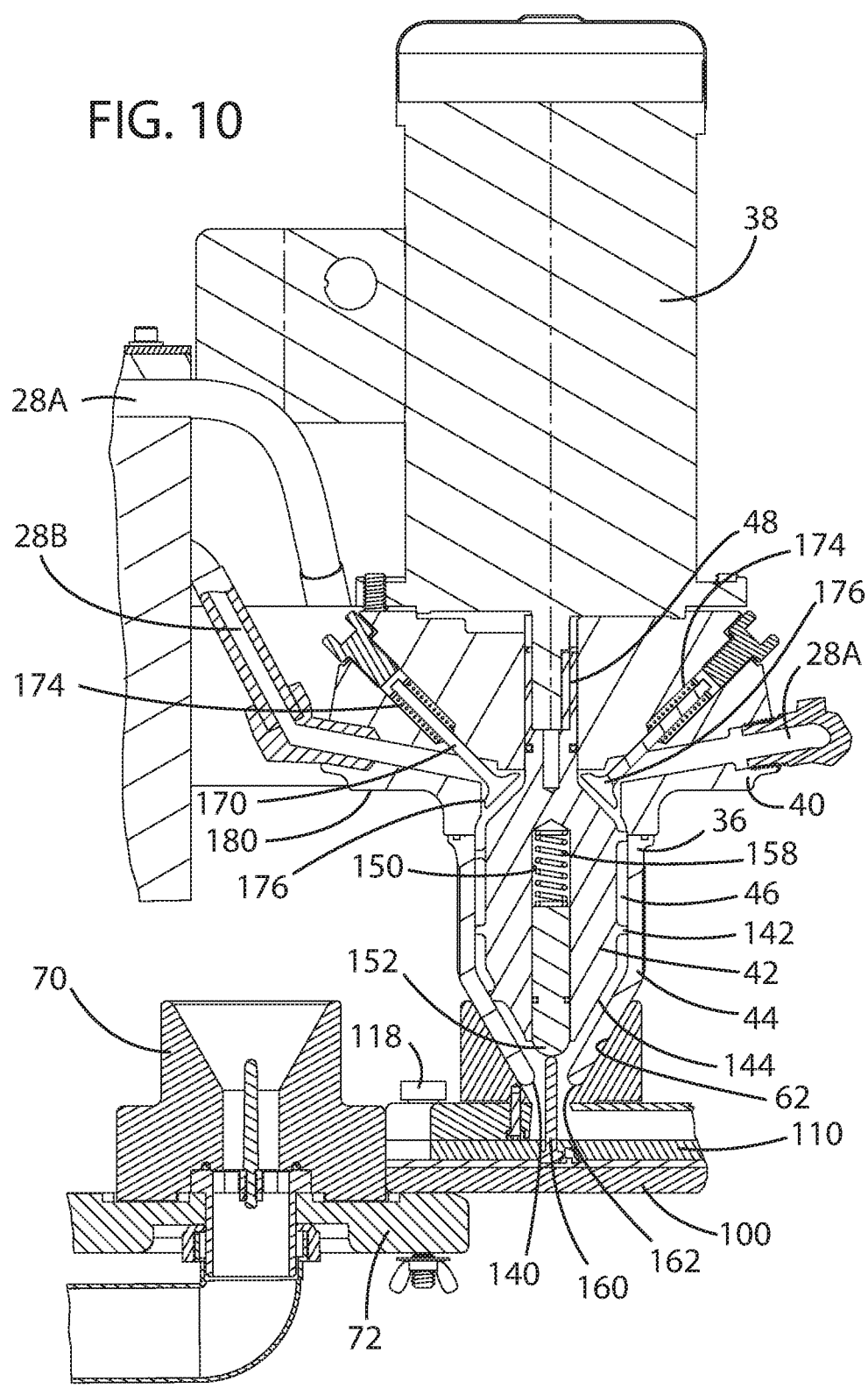
FIG. 10 is yet another cross-sectional side view of the mixing and injection head of the first embodiment of the injection system in accordance with the present disclosure.
Figure 11:
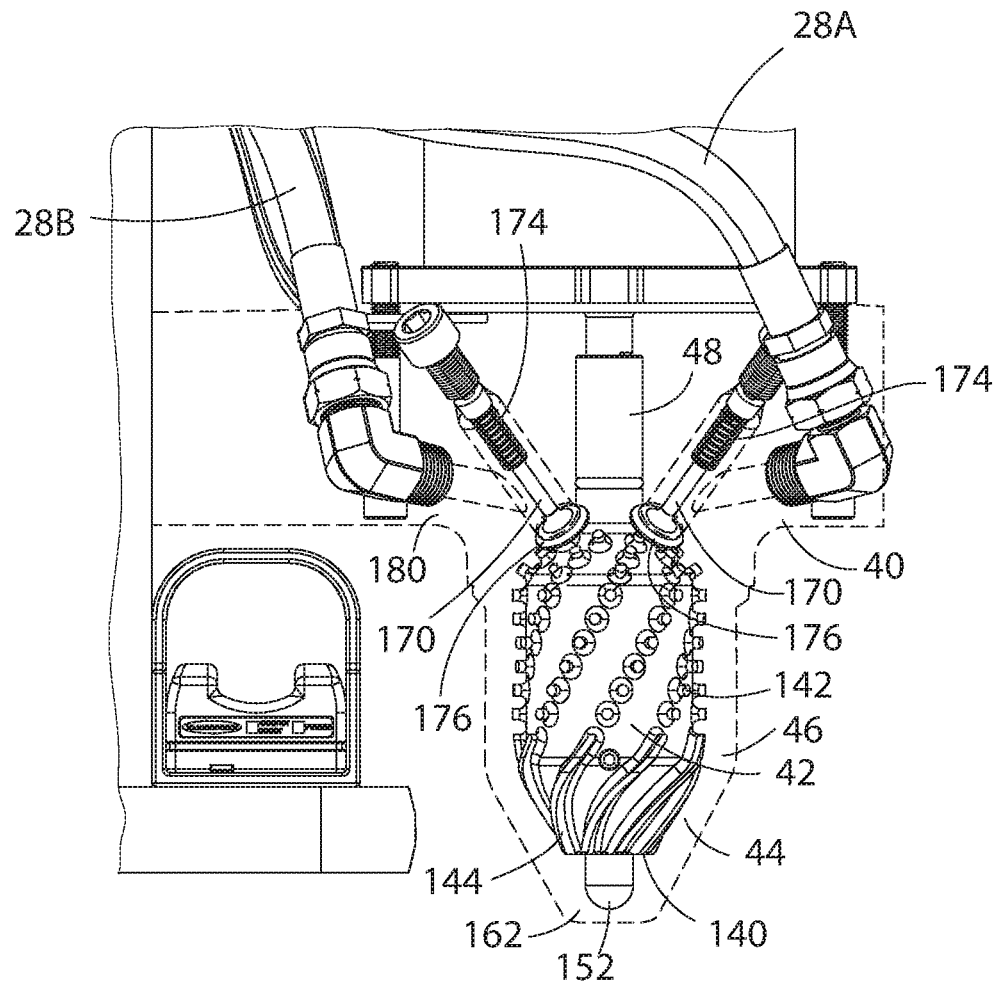
FIG. 11 is a side transparent view of the intake valves of the mixing and injection head of the first embodiment of the injection system in accordance with the present disclosure.
Figure 20:
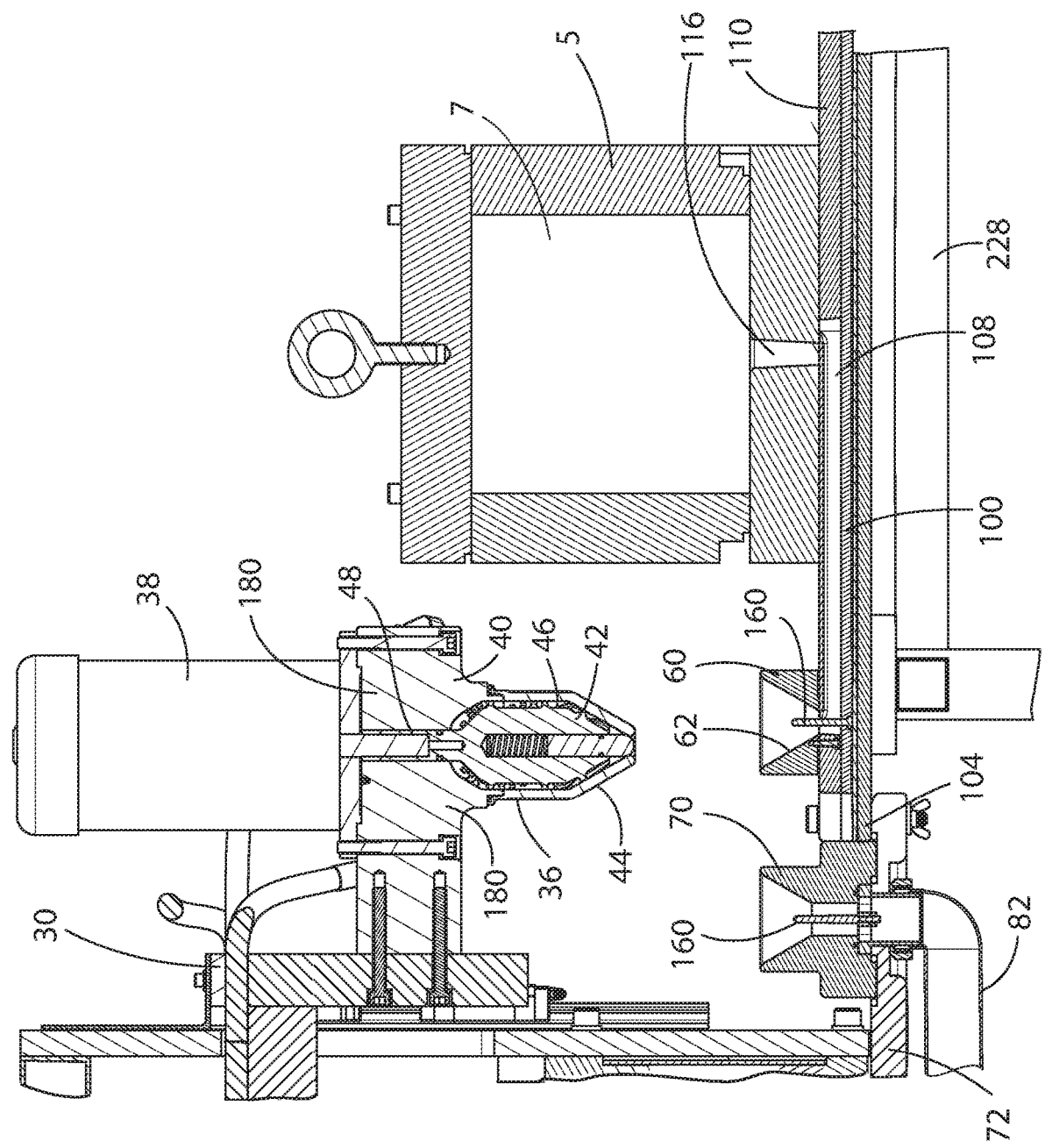
FIG. 20 is a front cross-sectional view of the mixing and injection head, investment pattern mold and the upper portion of the movable molding cart of the first embodiment of the injection system in accordance with the present disclosure, prior to the injection sequence.

In a first embodiment of the system 10, primarily shown in FIGS. 1-27, the movable molding cart 50 is moved toward and adjacent the injection unit 30 and proximate the mixing and injection head. The displaceable gating tray 110 may be displaced by such movement within the channel 106 to a first position to align the sprue 108 with the investment port 116 on the lower portion of the investment pattern mold 5, as shown in FIGS. 3 and 20. In this first embodiment, alignment pins 118 may be used to secure the movable molding cart 50 to the injection unit 30 throughout the injection cycle and the rinse cycle.

The digital computer 90 control, by which the injection process may be controlled, as further described below, is engaged, and the mixing and injection head 40 is moved downward toward the fill cup 60. The mixing and injection head 40 comprises a rotatable turbine 42 and a static mix chamber housing 44. The rotatable turbine 42 may comprise a substantially cylindrical body having a cylindrical middle portion, a semispherical upper portion coupled with an input shaft 48, and a frustoconical lower portion terminating in a central axial opening 140.

The rotatable turbine 42 middle portion may be provided with a plurality of individual raised nodes 142 arranged in oblique parallel lines relative the axis of the rotatable turbine 42, where the oblique parallel lines of the plurality of individual raised nodes 142 continue onto and terminate near the top of the semispherical upper portion. A corresponding plurality of turbine mixing flutes 144 continue the parallel lines of the individual raised nodes 142 arranged in oblique parallel lines relative the axis of the rotatable turbine 42 in the downward direction and terminate near the bottom of the frustoconical lower portion. The effect is a substantially continuous oblique line from the bottom of the frustoconical lower portion to the top of the semispherical upper portion.

Figure 43:
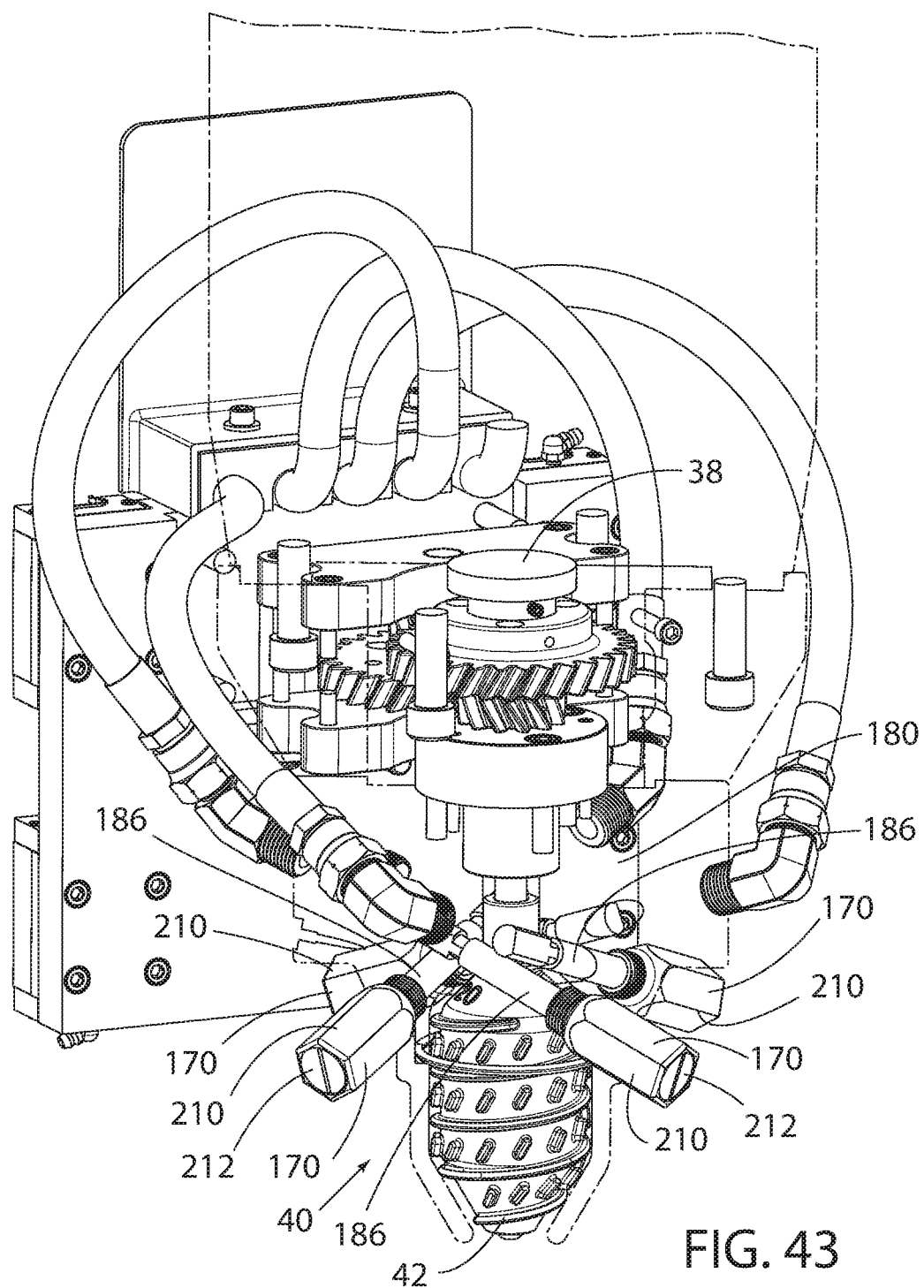
FIG. 43 is cutaway view of the injection unit of the second embodiment of the injection system in accordance with the present disclosure.

However, alternative configurations 42A, 42B, 42C, 42D, 42E for the rotatable turbine 42, such as shown in FIG. 51, may be used. To this end, alternatively, the cylindrical middle portion, the semispherical upper portion, and the frustoconical lower portion of the rotatable turbine are each provided with a plurality of individual raised flutes 144, as shown as rotatable turbine 42A. The raised flutes 144 may be vertically arranged as a plurality of sets of oblique parallel lines relative the axis of the rotatable turbine 42A, where the plurality of sets of the oblique parallel lines of the plurality of individual raised flutes 144 are separated by a plurality of ribs 138 extending about the circumference of the rotatable turbine 42A. As best shown in FIGS. 43 and 51, four sets of oblique parallel lines of flutes 144 may be separated by three circumferential ribs 138, all arranged in a slight helical pattern. It has been unexpectedly found that this rotatable turbine configuration, in comparison to the alternative rotatable turbine configurations 42B, 42C, 42D, 42E shown in FIG. 51, provides the most uniform and consistent mixing of the A and B components of the polyurethane.

Figure 12:
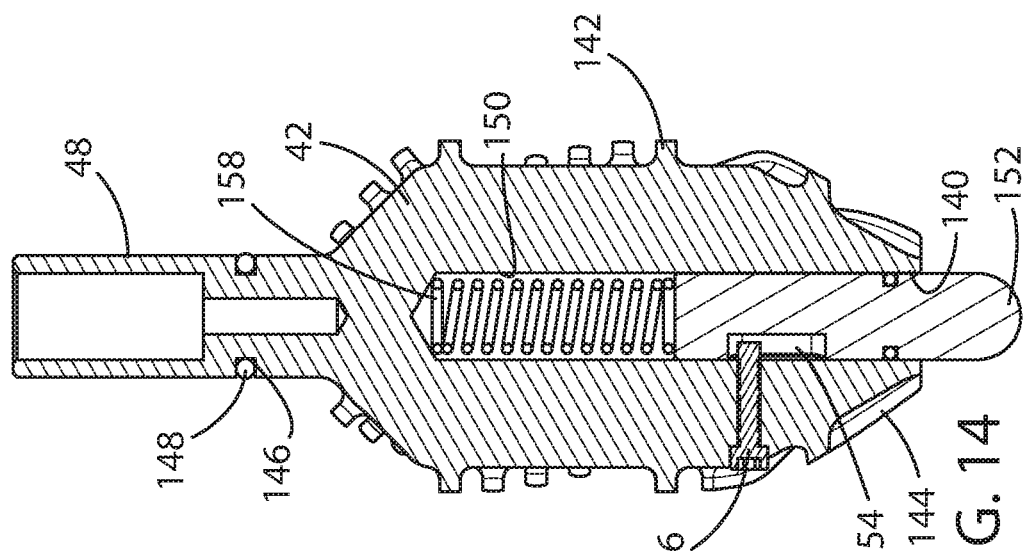
FIG. 12 is a perspective view of the rotatable turbine of the mixing and injection head of the first embodiment of the injection system in accordance with the present disclosure.
Figure 13:
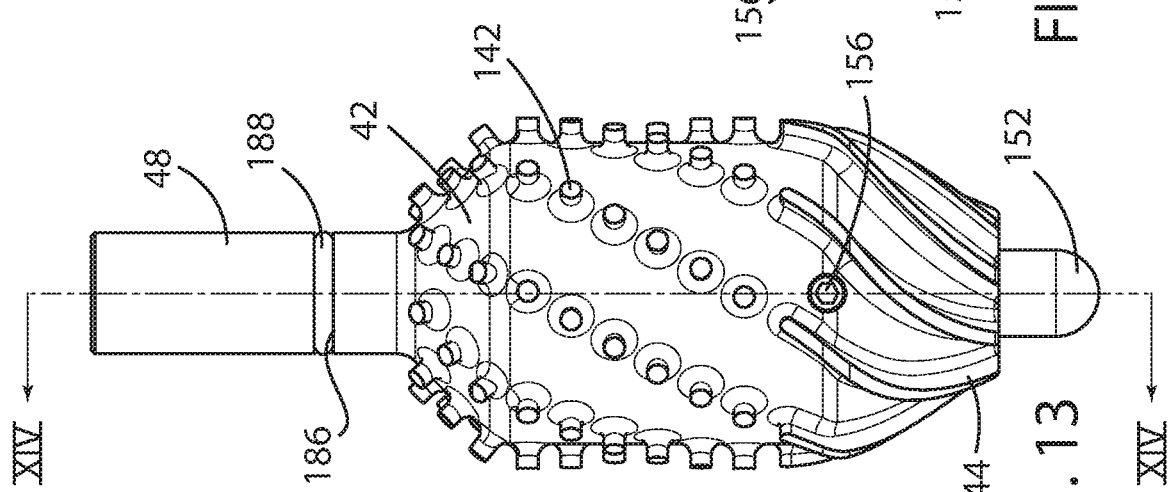
FIG. 13 is a side view of the rotatable turbine of the mixing and injection head of the first embodiment of the injection system in accordance with the present disclosure.
Figure 14:
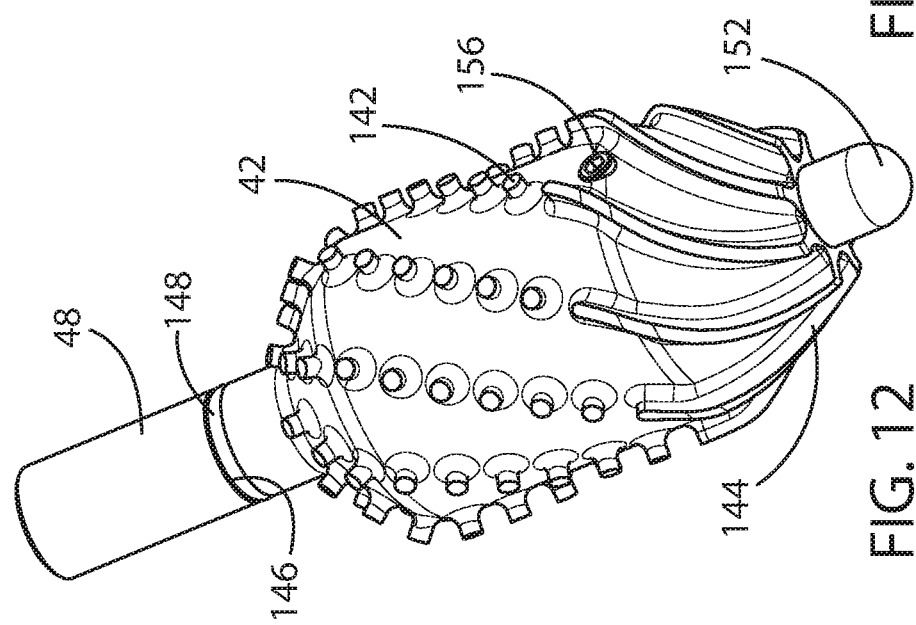
FIG. 14 is a cross-sectional side view of the rotatable turbine of the mixing and injection head along the line XIV-XIV of the first embodiment of the injection system of FIG. 13 in accordance with the present disclosure.

As shown in FIGS. 12-14, the input shaft 48 of the rotatable turbine 42 may be provided with an annular notch 146 within which is disposed an annular O-ring 148, so as after the rotatable turbine 42 is installed, raw materials 20 or injectable product 164 within the vertical mixing chamber 46 cannot flow upward into the turbine motor 38 for the rotatable turbine 42.

The static mix chamber housing 44 similarly comprises a substantially similar body configuration having a cylindrical upper portion and a frustoconical lower portion terminating at a lower injection port 162. The lower injection port 162 may be axially coincident with the central axial opening 140. The static mix chamber housing 44 may be fabricated from a clear plastic material by which the mixing process within the vertical mixing chamber 46 may be observed by the operator to confirm that the mixing and injection head 40 is operating optimally.

In a first embodiment of the injection unit 30, as shown in FIGS. 1-27, the central axial opening 140 at the bottom of the rotatable turbine 42 opens into an upwardly extending cylindrical cavity 150 along a portion of the axis of the rotatable turbine 42. The cylindrical cavity 150 is adapted to receive an axially reciprocating plunger 152 provided with an axial recess 154 on one side thereof that receives a radial fastener 156 that extends through the body of the rotatable turbine 42 and extends slightly into the cylindrical cavity 150 and into the axial recess 154. The axially reciprocating plunger 152 is biased to a fully extended position by a compression spring 158 disposed at a closed end of the cylindrical cavity 150, which urges the axially reciprocating plunger 152 to the full extended position. In the fully extended position, the radial fastener 156 engages the axial recess 154 to prevent the axially reciprocating plunger 152 from further movement within the rotatable turbine 42. As described herein, in service, when the mixing and injection head 40 is fully engaged with either of the fill cup 60 or the rinse cup 70, a vertically extending pin 160 mounted within each of the fill cup 60 and the rinse cup 70 pushes the axially reciprocating plunger 152 upward against the urging of the compression spring 158 to allow material to exit the mixing and injection head 40, as described herein.

The lower injection port 162 is axially coincident with the central axial opening 140 and the axially reciprocating plunger 152 of the rotatable turbine 42 described above, and is sized relative to the axially reciprocating plunger 152 so that the axially reciprocating plunger 152 effectively seals the lower injection port 162 when the axially reciprocating plunger 152 is in the fully extended position. The static mix chamber housing 44 may be provided with a threaded collar 36 at an upper edge of the cylindrical upper portion thereof by which the static mix chamber housing 44 is attached to the mixing and injection head 40. The exterior of the cylindrical portion may be provided with concave grooves 34 by which a secure grasp of the static mix chamber housing 44 may be obtained to either remove or install static mix chamber housing 44 to the mixing and injection head 40. The static mix chamber housing 44 also may be provided with a relatively smooth interior that is sized to closely approximate the outer shape of the rotatable turbine 42 and the individual raised nodes 142 and/or turbine mixing flutes 144 disposed on the outer surface of the rotatable turbine 42, as further discussed above, to define a vertical mixing chamber 46.

In operation of the first embodiment of the system 10, the investment pattern mold 5 is prepped for molding by clamping the empty investment pattern mold 5 to the upper platform 100 of the movable molding cart 50, such that the investment port 116 of the investment pattern mold 5 is aligned with the sprue 108 in the displaceable gating tray 110 is in the first position, as shown in FIG. 20. The movable molding cart 50 is then operably coupled with the injection unit 30, as described above.

The operator may then select the correct program from the database on the computer 90, depending the particular investment pattern mold 5 on the movable molding cart 50 and the injection parameters associated with the investment pattern mold 5, and press the start button. A pair of proximity sensors, one each located on the static base 180 on opposite sides of the mixing and injection head 40 proximate the threaded collar 36 of the static mix chamber housing 44 at an upper edge of the cylindrical upper portion, detects notches 32 disposed on the collar 36 and confirms the proper installation of the static mix chamber housing 44, thereby allowing operation of the injection phase of the cycle to continue. Proximity sensors are also provided adjacent the edge 104 of the injection unit 30 to confirm that the movable molding cart 50 is aligned properly.

Provided that the foregoing steps are satisfactorily completed, the operator may put one finger from each hand on the safety switches 130 mounted near another edge 134 of the injection unit 30 at nearly the same time, allowing the programmed sequence to begin its automated injection phase.

Figure 21:
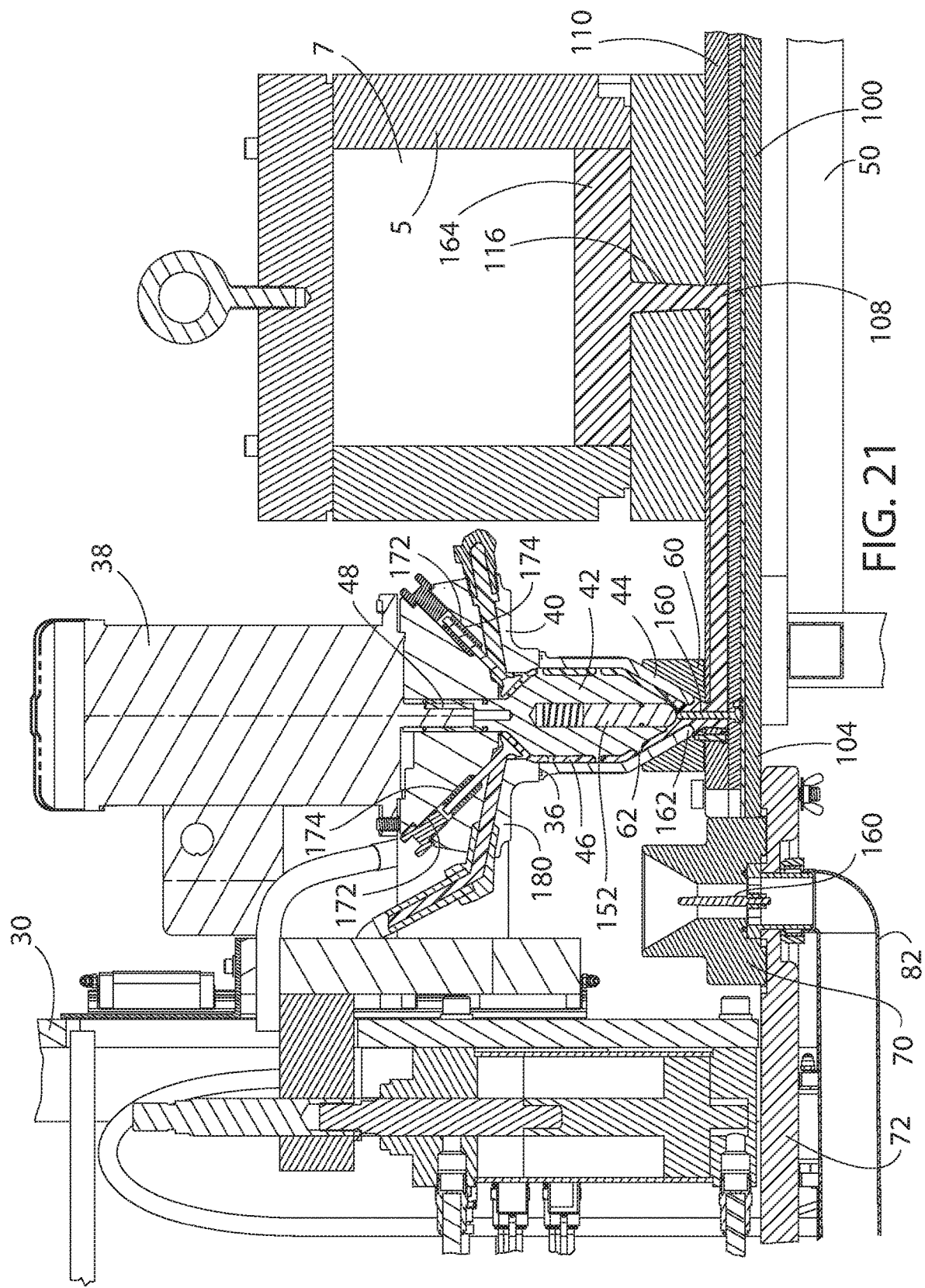
FIG. 21 is a front cross-sectional view of the mixing and injection head, investment pattern mold and the upper portion of the movable molding cart of the first embodiment of the injection system in accordance with the present disclosure, during the injection sequence.

First, the mixing and injection head 40 is moved to the Down position, engaging the fill cup 60 and pushing the displaceable gating tray 110 to the open position, as shown in FIG. 20. That is, as the mixing and injection head 40 is moved to the Down position, the mixing and injection head 40 begins to engage the inner surfaces 62 of the fill cup 60, which is formed as an inverted frustoconical cavity within which a vertically extending pin 160 is mounted. As the mixing and injection head 40 is further moved toward the Down position, the outer surface of the frustoconical lower portion of the static mix chamber housing 44 continues to engage the inner surface 62 of the inverted frustoconical conical cavity within the fill cup 60, which is fixedly attached to the displaceable gating tray 110, and thereby simultaneously laterally pushes the displaceable gating tray 110 to the open position within the movable molding cart 50, as best shown in FIGS. 20 and 21. The axially reciprocating plunger 152 also engages the vertically extending pin 160 and is displaced upward so as to open the lower injection port 162. Thus, when the mixing and injection head 40 is fully moved to the Down position, an effective seal is created between the frustoconical lower portion of the static mix chamber housing 44 and the inverted frustoconical cavity of the fill cup 60, and fluid communication is allowed between the vertical mixing chamber 46 and the displaceable gating tray 110.

The rotatable turbine motor 38 and the A and B component metering pumps 26A, 26B are then actuated to begin rotation of the rotatable turbine 42 and force material through the vertical mixing chamber 46, the fill cup 60, the displaceable gating tray 110, and into the cavity of the investment pattern mold 5, as shown in FIG. 21. By way of example only, the mixing and pumping step may take as little 20 seconds, in some instances.

Once the programmed volume of injectable product 164 has been injected into the investment pattern mold 5, the rotatable turbine motor 38 and metering pumps 26A, 26B are de-actuated, and the mixing and injection head 40 may be raised to the Up position. Since the axially reciprocating plunger 152 is now no longer in contact with the upwardly extending pin 160, the axially reciprocating plunger 152 returns to the fully extended position to effectively seal the frustoconical lower portion of the static mix chamber housing 44, thereby preventing material from dripping from the vertical mixing chamber 46 out of the mixing and injection head 40. A retractable rinse table 72 mounted on injection unit 30 is then extended, pushing the movable molding cart 50 away from the injection unit 30 and into the rinse position, closing the displaceable gating tray 110, and putting the rinse cup 70 into alignment with the mixing and injection head 40, as shown in FIG. 22.

Figure 22:
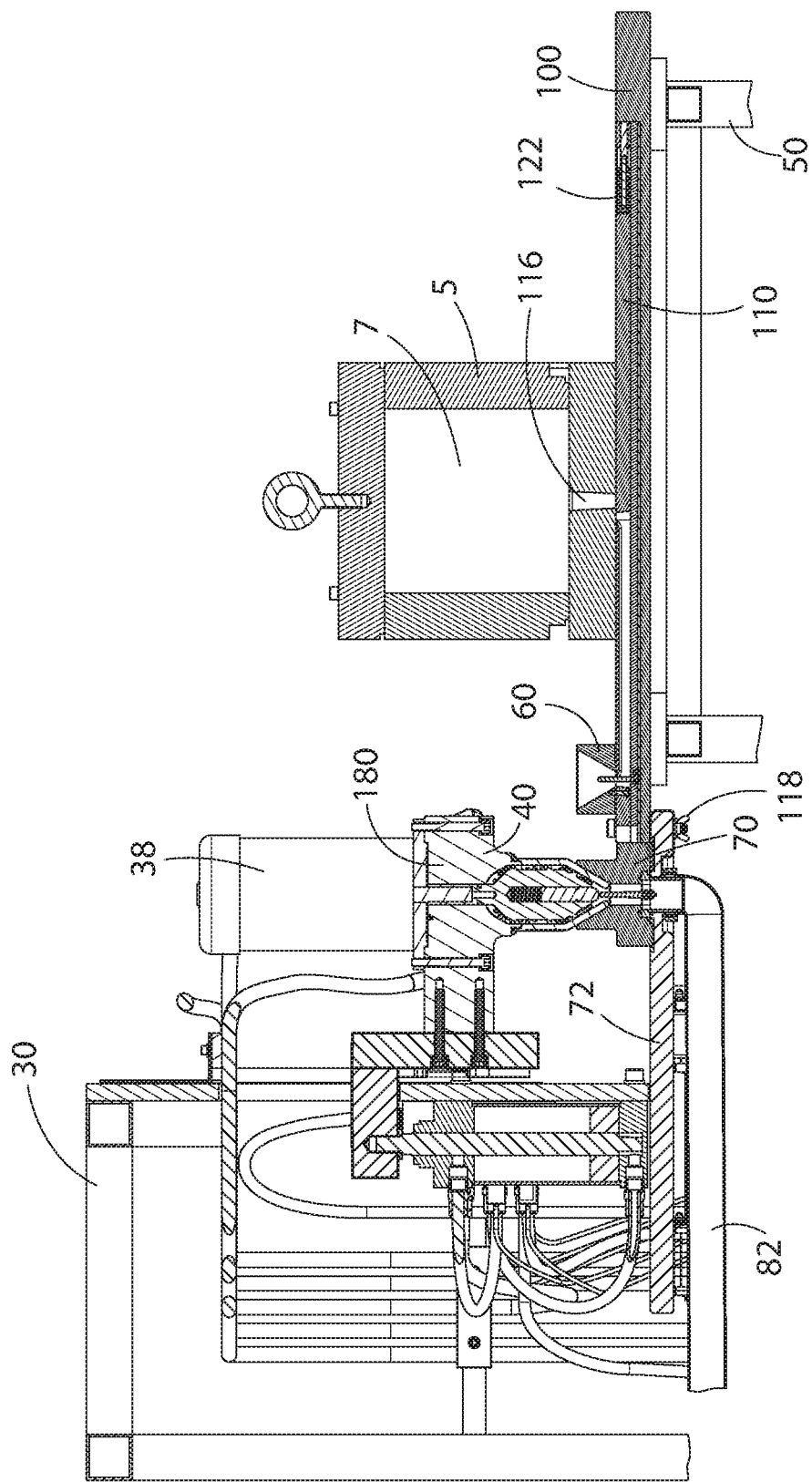
FIG. 22 is a front cross-sectional view of the mixing and injection head, investment pattern mold and the movable molding cart of the first embodiment of the injection system in accordance with the present disclosure, subsequent the injection sequence.

The displaceable gating tray 110 is thus displaced to a second position within the channel 106 as the mixing and injection head 40 moves to the Up position to close all fluid communication between the sprue 108 and the investment port 116 on the lower portion of the investment pattern mold 5, as shown in FIG. 22. The compression spring 122 disposed proximate the second, opposite end of the displaceable gating tray 110 urges the displaceable gating tray 110 and the fill cup 60 toward the edge 104 of the upper platform 100 of the movable molding cart 50 when the mixing and injection head 40 moves to the Up position. In the second position, the sprue 108 is no longer in line with the investment port 116 on the lower portion of the investment pattern mold 5, thus effectively closing the investment pattern mold 5 to maintain the target chemical reaction pressure therein after the injection phase of the cycle is compete.

The rinse cup 70 may be also mounted on an edge of the injection unit 30. As the retractable rinse table 72, upon which the rinse cup 70 may be fixedly mounted, is extended, the movable molding cart 50, still attached to the injection unit 30 and to the retractable rinse table 72 by the alignment pins 118, is moved away from the position adjacent the injection unit 30. The rinse cup 70 mounted on the injection unit 30 is thus moved into vertical alignment with the mixing and injection head 40, as shown in FIG. 22. Further, as noted above, displacement of the displaceable gating tray 110 may be obtained by the rinse retractable table 72 and rinse cup 70, which together push the displaceable gating tray 110 away from the injection unit 30 as the movable molding cart 50 is moved to a position adjacent the injection unit 30.

The mixing and injection head 40 is then again lowered to the Down position, and thereby engages the rinse cup 70, as shown in FIG. 22. The rotatable turbine motor 38 and rinse solvent metering pump 26C are then actuated, pumping a sufficient quantity of rinse solvent to clean the rotatable turbine 42 and vertical mixing chamber 46. The waste from the turbine 42 and vertical mixing chamber 46 passes from the rinse cup 70 and through the attached waste line 82 to the waste rinse vessel 80, and away from the mixing and injection head 40, as shown in FIG. 22. The waste rinse vessel 80 may comprise at least a 15-gallon waste drum. The rinse solvent metering pump 26C is turned off and an air blast may be initiated to dry the vertical mixing chamber 46. A dry nitrogen gas purge system may be utilized. The steps of rinsing with rinse solvent 20C and drying with an air blast may be repeated as necessary. Thus, fouling of the mixing and injection head 40 may be avoided. The air purge dries the rotatable turbine 42 and vertical mixing chamber 46, making the system 10 ready to shoot the next mold in seconds.

The operator can then safely release the safety switches 130. After these steps are completed, the injection cycle can be repeated as required. After the injection phase of the cycle is complete, the vent apparatus 190 on the investment pattern mold 5 may be actuated, as discussed further below.

It should be understood that, conversely, when the movable molding cart 50 is initially moved to the position adjacent the injection unit 30 and proximate the mixing and injection head 40, the retractable rinse table 72, powered by a pneumatic cylinder (not shown) pulls the rinse cup 70 and attached waste line 82 away from the mixing and injection head 40, as shown in FIG. 20.

A second embodiment of the system 10 is shown in FIGS. 28-51. Corresponding components have been designated with the same reference numbers as described above in regard to the first embodiment of the system 10. In a second embodiment of the injection unit 30, the input shaft 48 of the rotatable turbine 42 extends almost fully along the axial length of the rotatable turbine 42 and is provided with a flattened keyway 124 portion on a lower end thereof that engages a corresponding flat surface 126 along the interior diameter of the central axial opening 140 at the bottom of the rotatable turbine 42. Thus, the rotatable turbine 42 is positively coupled with the input shaft 48. A fastener 128 may be provided at the bottom of the rotatable turbine 42 and inserted into a threaded opening 132 at the lower end of the input shaft 48 to operably couple the rotatable turbine 42 to the input shaft 48.

As is in the first embodiment of the injection unit 30, the second embodiment of the injection unit 30 has a static mix chamber housing 44 provided with a threaded collar 36 at an upper edge of the cylindrical upper portion thereof by which the static mix chamber housing 44 is attached to the mixing and injection head 40, and the exterior may be provided with concave grooves 34 by which a secure grasp of the static mix chamber housing 44 may be obtained. The static mix chamber housing 44 also may be provided with a relatively smooth interior that is sized to closely approximate the outer shape of the rotatable turbine 42 and the individual raised nodes 142 and/or turbine mixing flutes 144 that may be disposed on the outer surface of the rotatable turbine 42 to define the vertical mixing chamber 46.

Figure 44:
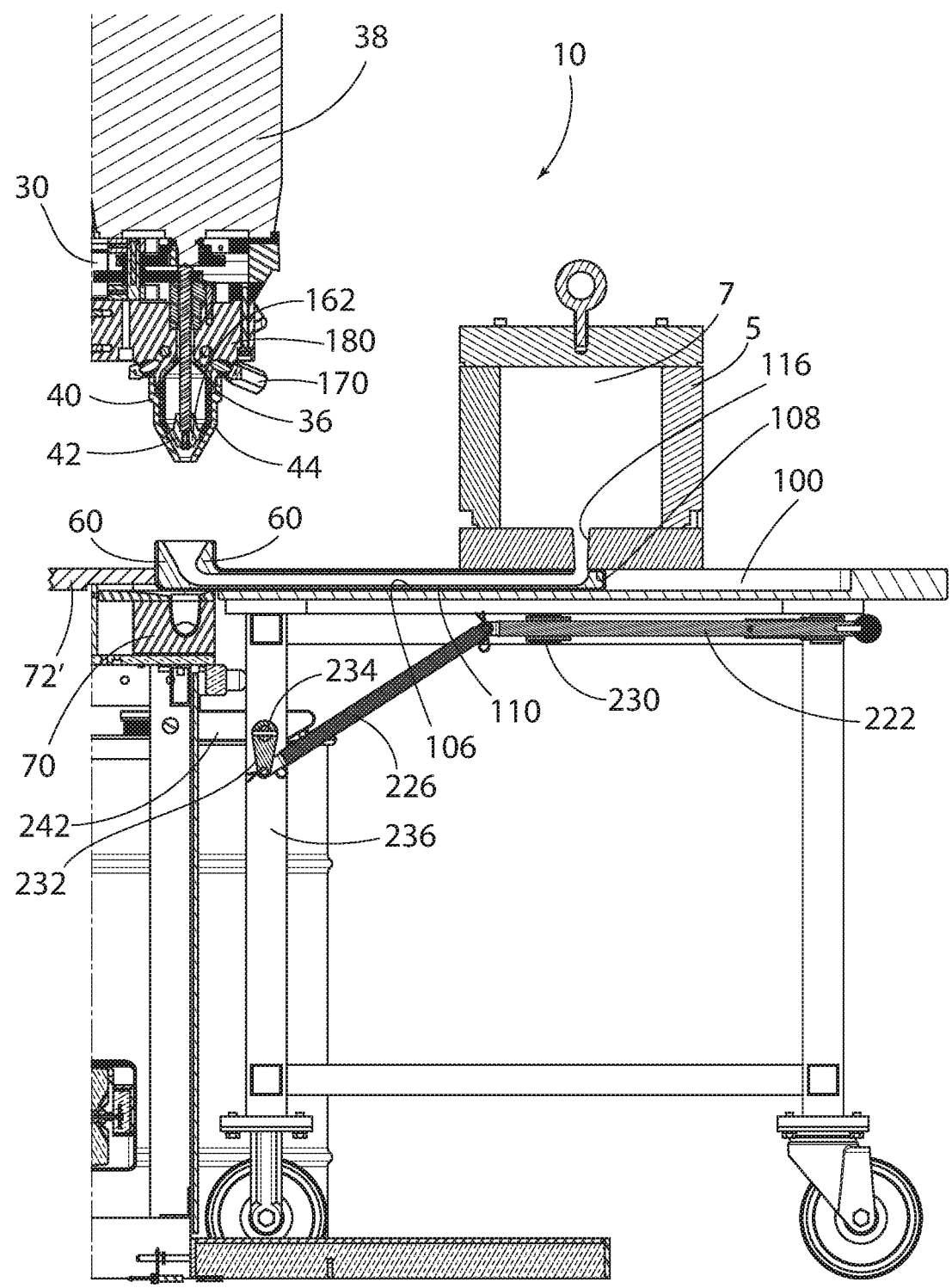
FIG. 44 is a cross-sectional view of the second embodiment of the injection system in accordance with the present disclosure.

In operation of the second embodiment of the system 10, the investment pattern mold 5 is prepped for molding by clamping the empty investment pattern mold 5 to the upper platform 100 of the movable molding cart 50, with the investment port 116 of the investment pattern mold 5 aligned with the sprue 108 in the displaceable gating tray 110 in the first position, as shown in FIG. 44. The fill cup 60 is fixedly attached to the displaceable gating tray 110, which is manually positioned to extend beyond the edge of the movable molding cart 50 that is adjacent the injection unit 30 and is thereby positioned directly beneath the mixing and injection head 40. The movable molding cart 50 is then operably coupled with the injection unit 30, as further described below.

The operator may then select the correct program from the database on the computer 90. A pair of proximity sensors again detects the proper installation of the static mix chamber housing 44, thereby allowing operation of the injection phase of the cycle to continue. Proximity sensors are also provided adjacent the edge 104 of the injection unit 30 to confirm that the movable molding cart 50 is aligned properly.

Provided that the foregoing steps are satisfactorily completed, the operator again puts one finger from each hand on the safety switches 130 mounted near another edge 132 of the injection unit 30 at nearly the same time, allowing the programmed sequence to begin its automated injection phase.

Figure 45:
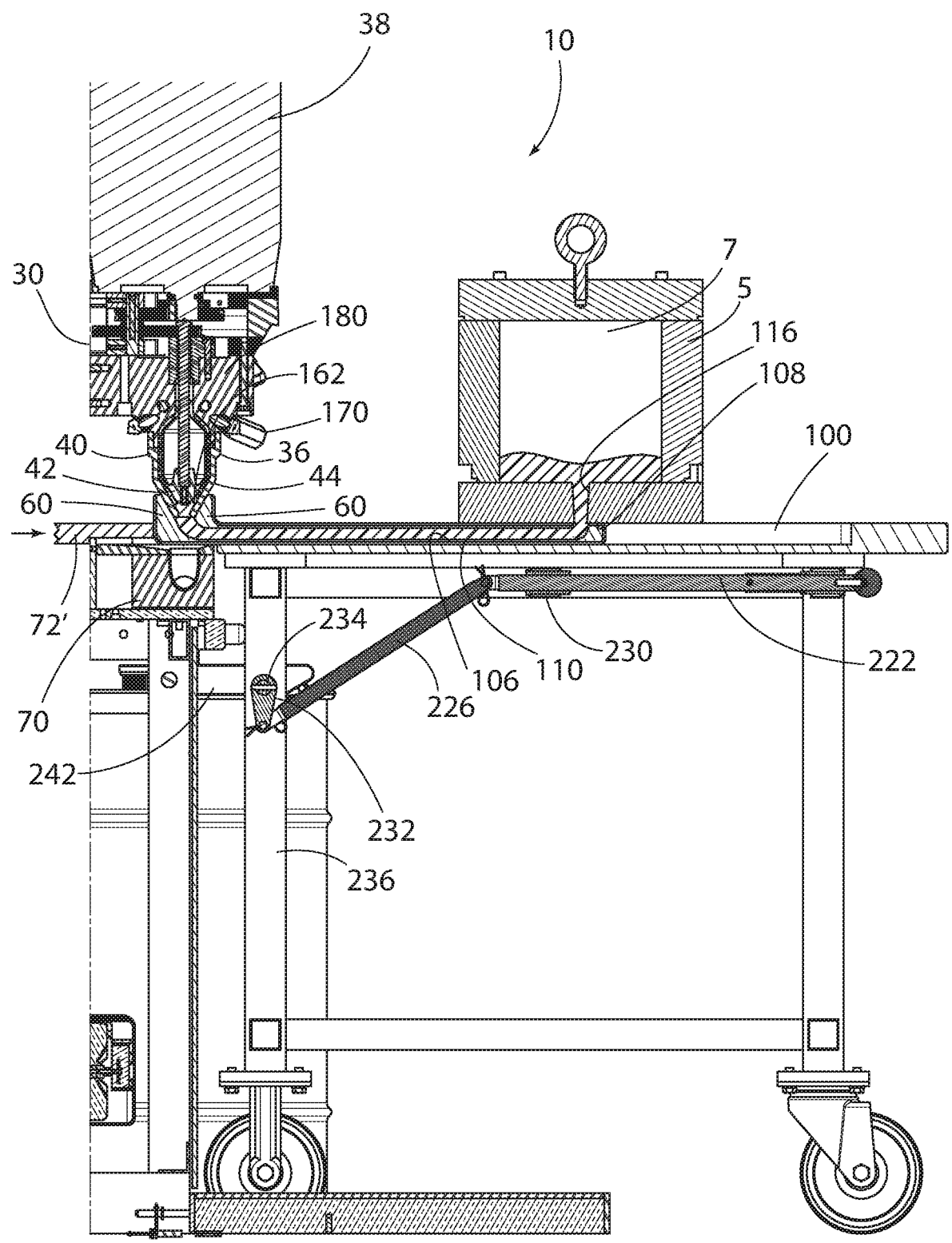
FIG. 45 is a cross-sectional view of the second embodiment of the injection system in accordance with the present disclosure.

As before, the mixing and injection head 40 is first moved to the Down position, engaging the fill cup 60, as shown in FIG. 45. When the mixing and injection head 40 is fully moved to the Down position, an effective seal is created between the frustoconical lower portion of the static mix chamber housing 44 and the inverted frustoconical cavity of the fill cup 60, and fluid communication is allowed between the vertical mixing chamber 46 and the displaceable gating tray 110.

Figure 46:
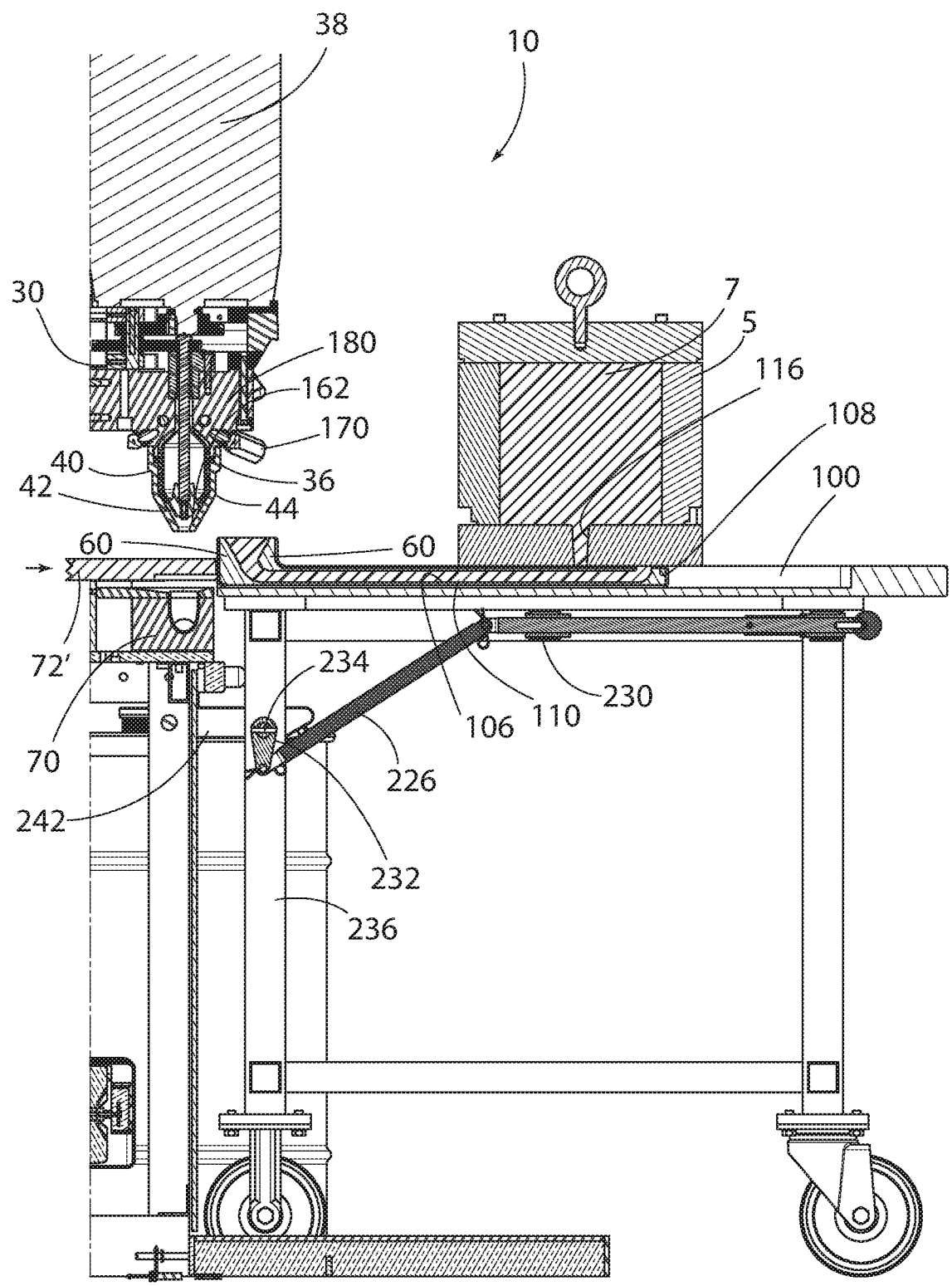
FIG. 46 is a cross-sectional view of the second embodiment of the injection system in accordance with the present disclosure.

The rotatable turbine motor 38 and the A and B component metering pumps 26A, 26B are again then actuated to begin rotation of the rotatable turbine 42 and force material raw 20A, 20B through the vertical mixing chamber 46, the fill cup 60, the displaceable gating tray 110, and into the cavity 7 of the investment pattern mold 5, as shown in FIG. 46.

Once the programmed volume of injectable product 164 has been injected into the investment pattern mold 5 and the rotatable turbine motor 38 and metering pumps 26A, 26B are de-actuated, the mixing and injection head 40 may be raised to the Up position.

After the injection phase of the cycle is complete, the displaceable gating tray 110 and the fill cup 60 attached thereto are displaced to a second position within the channel 106 by the horizontal motion of a rinse actuator 72' after the mixing and injection head 40 moves to the Up position to close all fluid communication between the sprue 108 and the investment port 116 on the lower portion of the investment pattern mold 5, as shown in FIG. 46. In the second position, where the sprue 108 is no longer in line with the investment port 116 on the lower portion of the investment pattern mold 5, the investment pattern mold 5 is effectively closed to maintain the target chemical reaction pressure therein after the injection phase of the cycle is compete.

Figure 28:
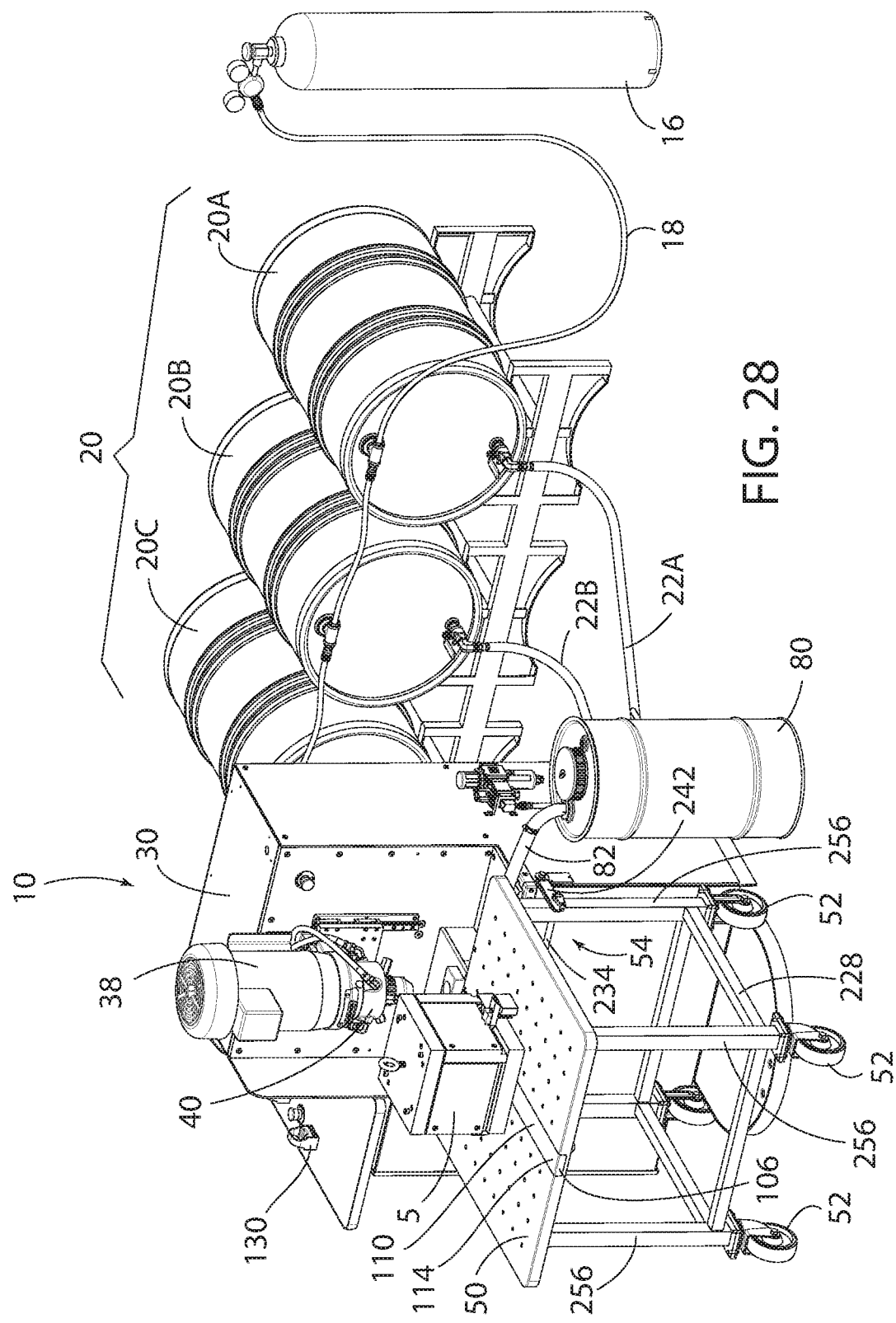
FIG. 28 is a front side perspective view of a second embodiment of the injection system in accordance with the present disclosure.
Figure 29:
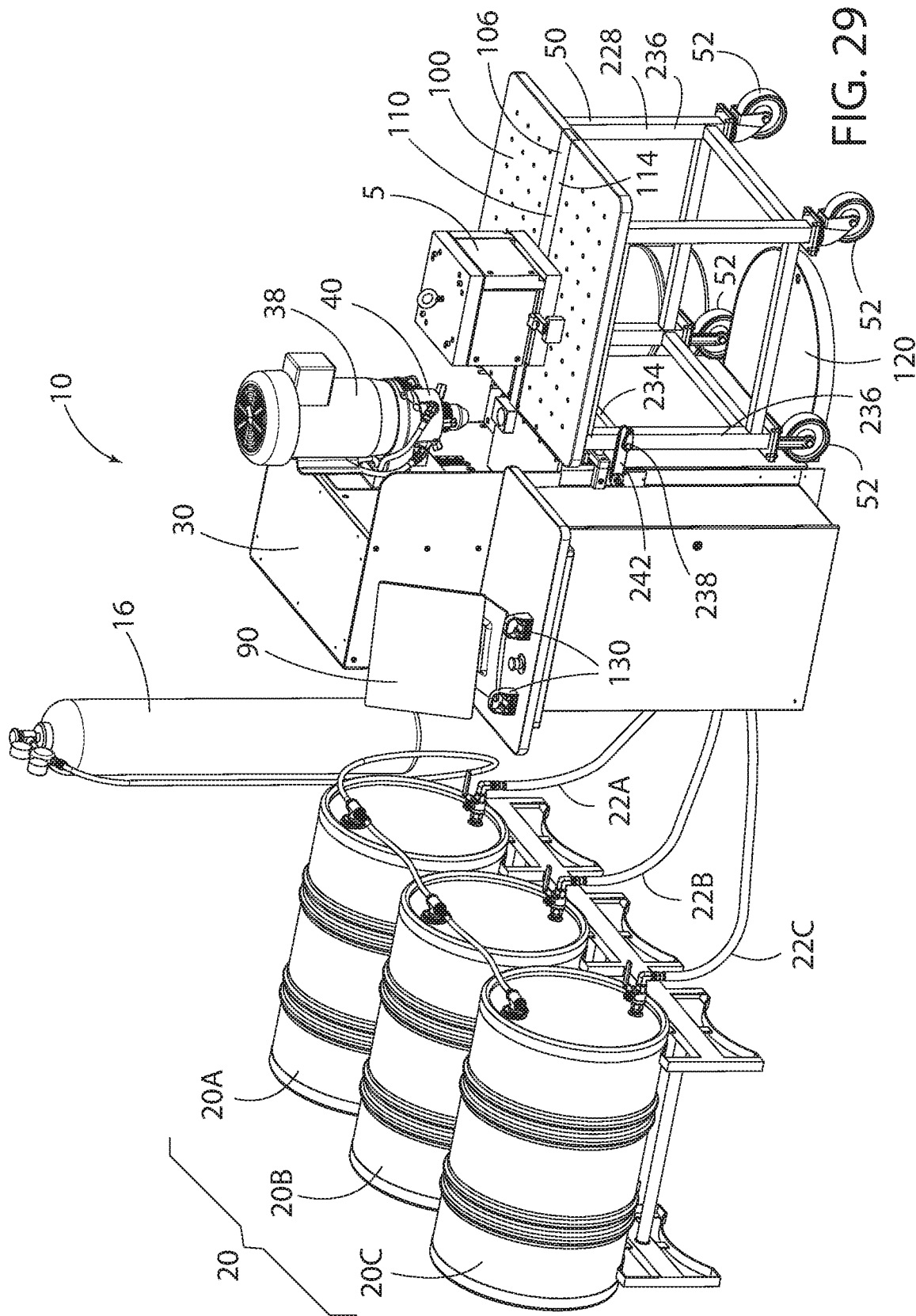
FIG. 29 is another front side perspective view of the second embodiment of the injection system in accordance with the present disclosure.
Figure 30:
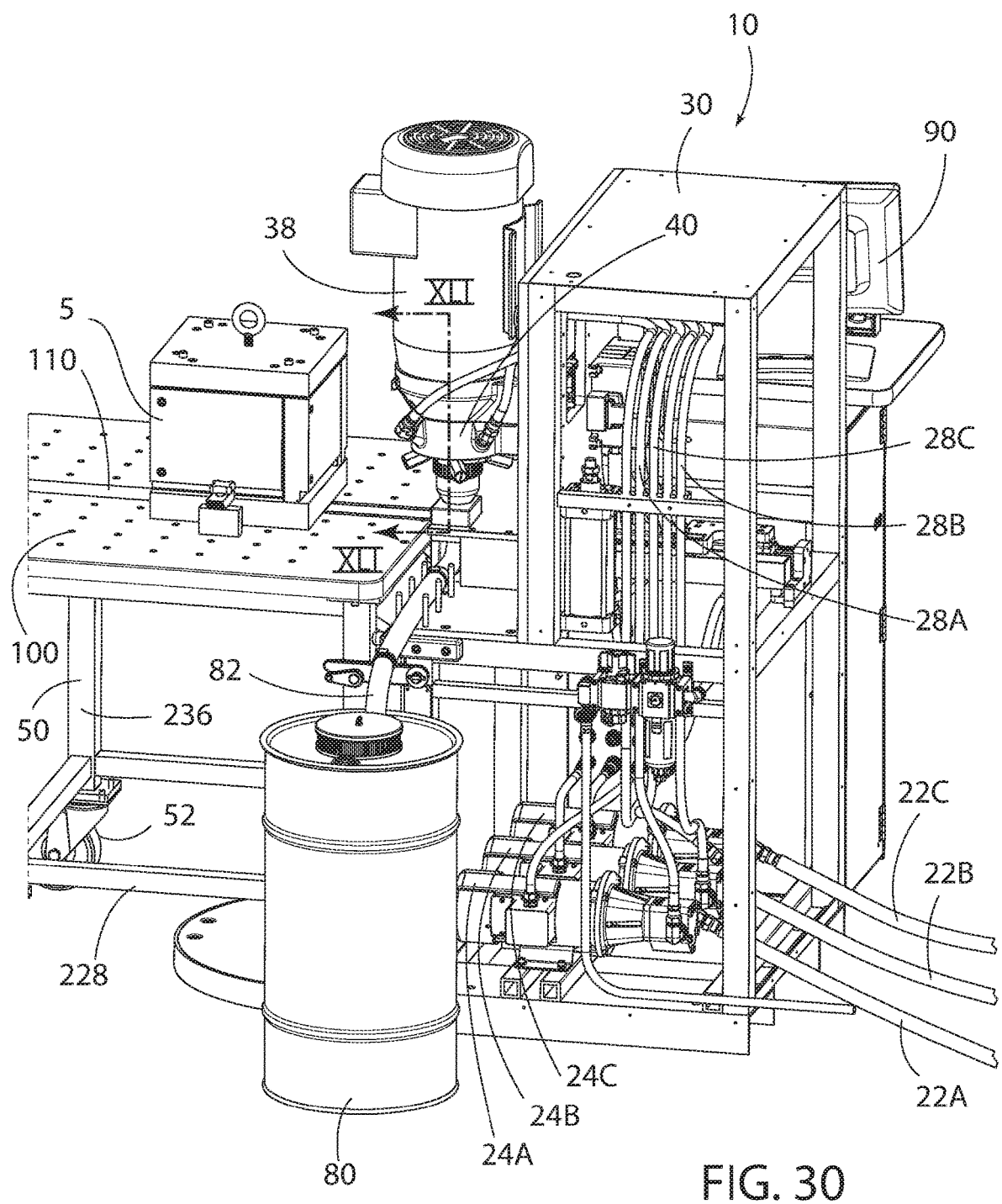
FIG. 30 is a rear side perspective view of the second embodiment of the injection system in accordance with the present disclosure.
Figure 31:
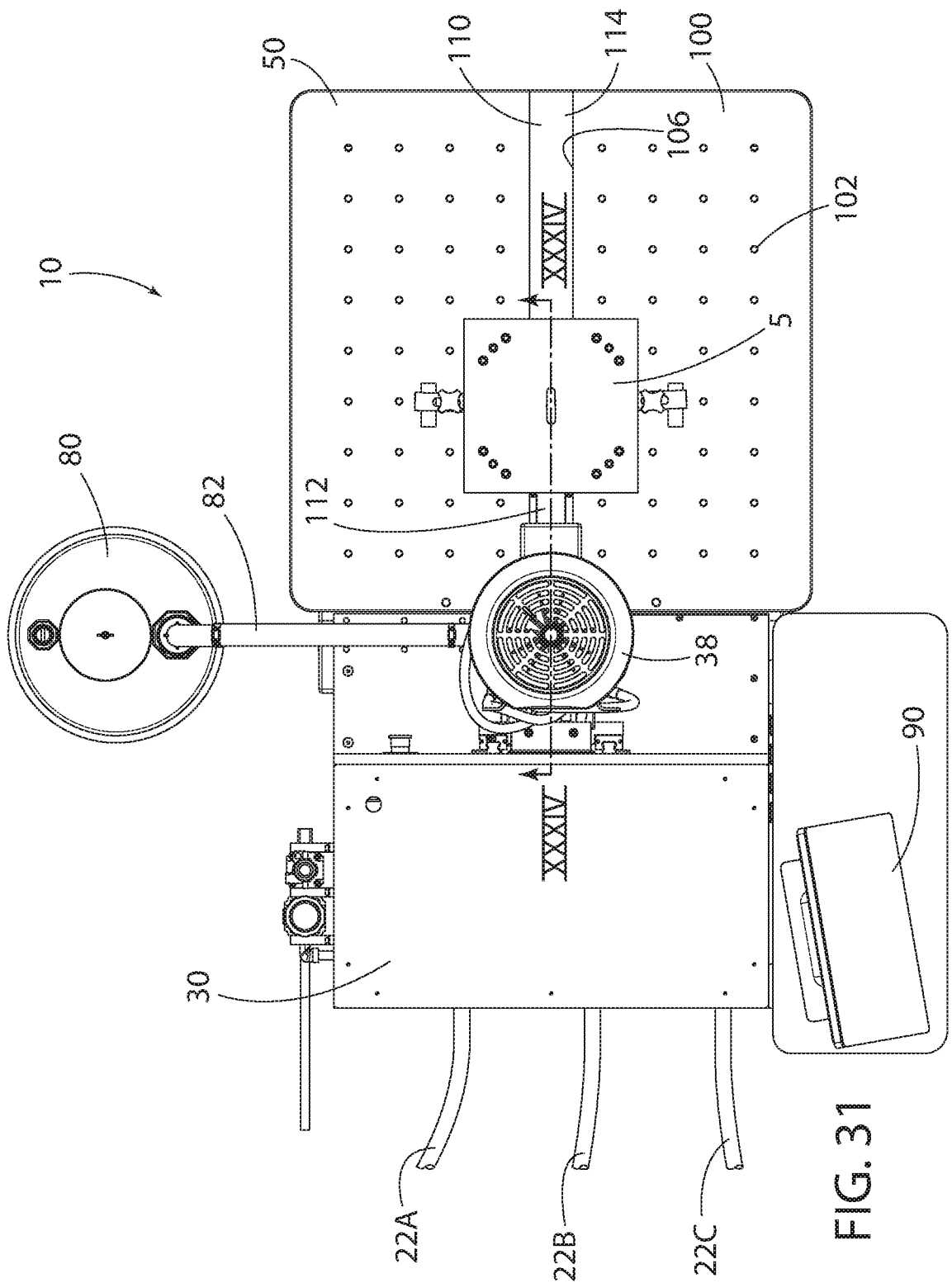
FIG. 31 is a top view of the injection unit and movable molding cart of the second embodiment of the injection system in accordance with the present disclosure.
Figure 47:
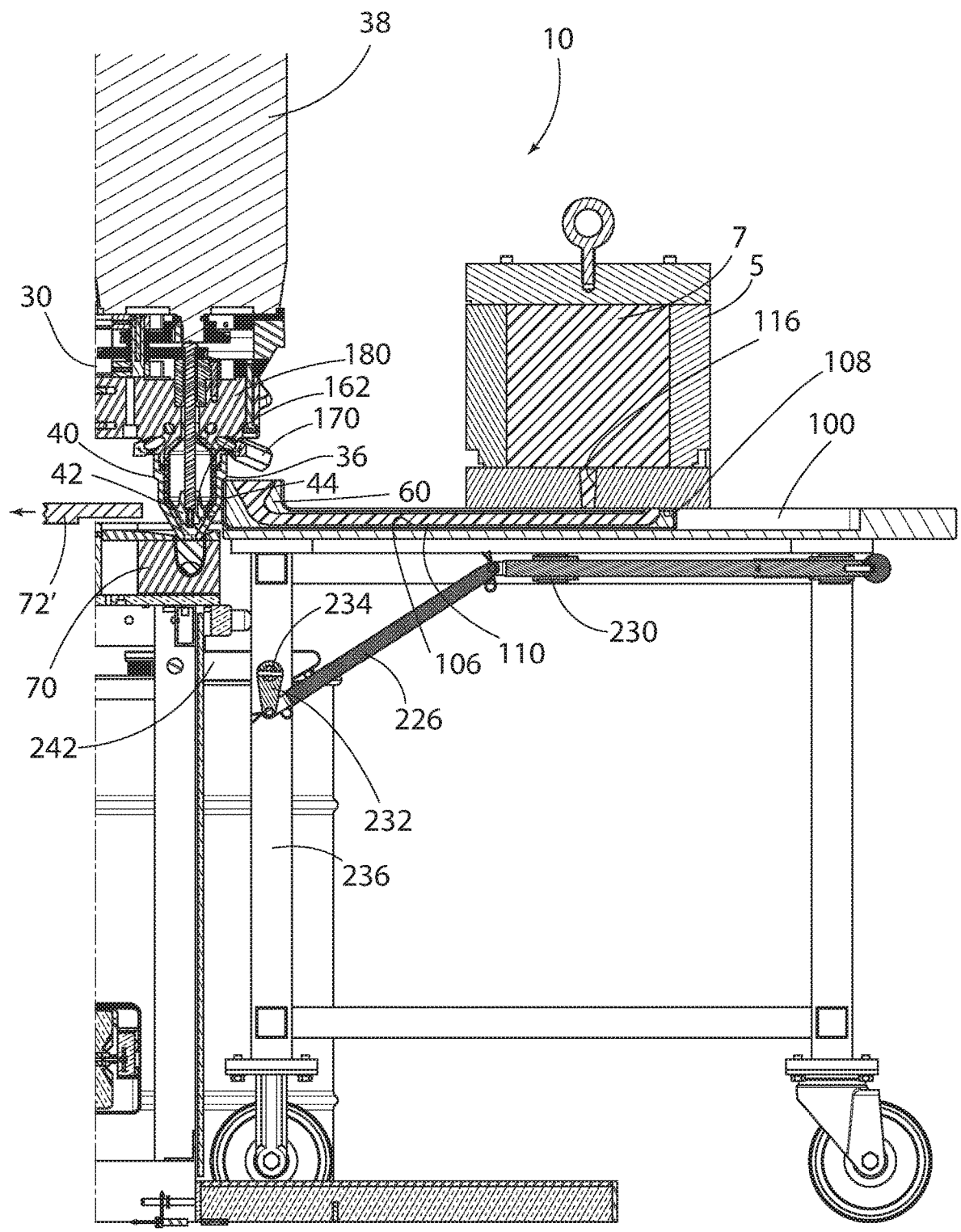
FIG. 47 is a cross-sectional view of the second embodiment of the injection system in accordance with the present disclosure.
Figure 48:
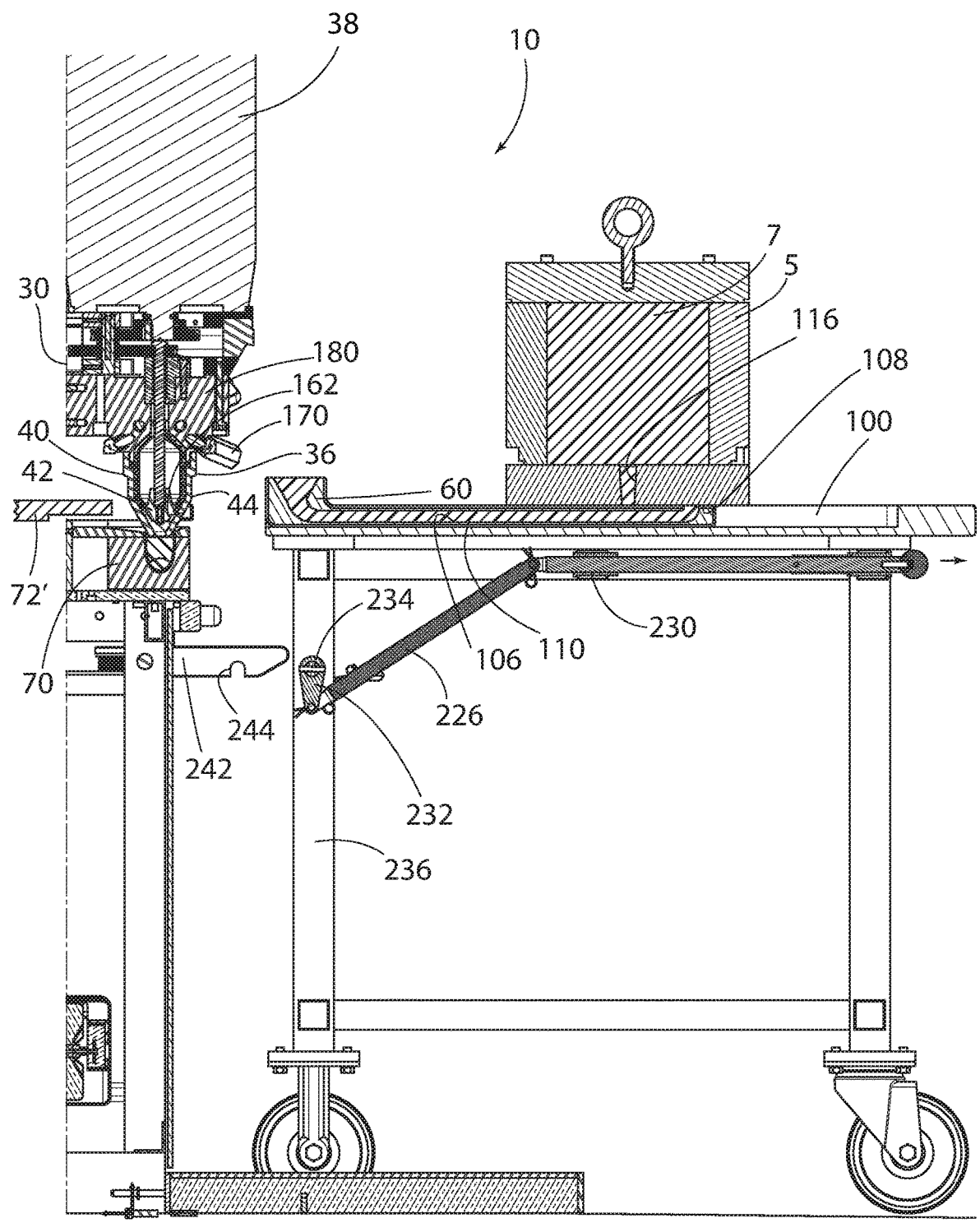
FIG. 48 is a cross-sectional view of the second embodiment of the injection system in accordance with the present disclosure.

The rinse actuator 72', beneath which the rinse cup 70 may be fixedly mounted, is then retracted. The rinse cup 70 mounted on the injection unit 30 may be in vertical alignment with the mixing and injection head 40, as shown in FIG. 47. The mixing and injection head 40 is then again lowered to the Down position, and thereby engages the rinse cup 70, as shown in FIG. 47. The rotatable turbine motor 38 and rinse solvent metering pump 26C are then actuated, pumping a sufficient quantity of rinse solvent 20C to clean the rotatable turbine 42 and vertical mixing chamber 46. The waste from the turbine 42 and vertical mixing chamber 46 passes from the rinse cup 70 and through the attached waste line 82 to the waste rinse vessel 80 and away from the mixing and injection head 40, as shown in FIG. 28. The rinse solvent metering pump 26C is turned off and an air blast may be initiated to dry the vertical mixing chamber 46. A dry nitrogen gas purge system may be utilized. The steps of rinsing with rinse solvent 20C and drying with an air blast may be repeated as necessary. Thus, fouling of the mixing and injection head 40 may be avoided.

The operator can then safely release the safety switches 130. After these steps are completed, the injection cycle can be repeated as required. The vent apparatus 190 on the mold 5 may then be actuated, as discussed below.

Figure 34:
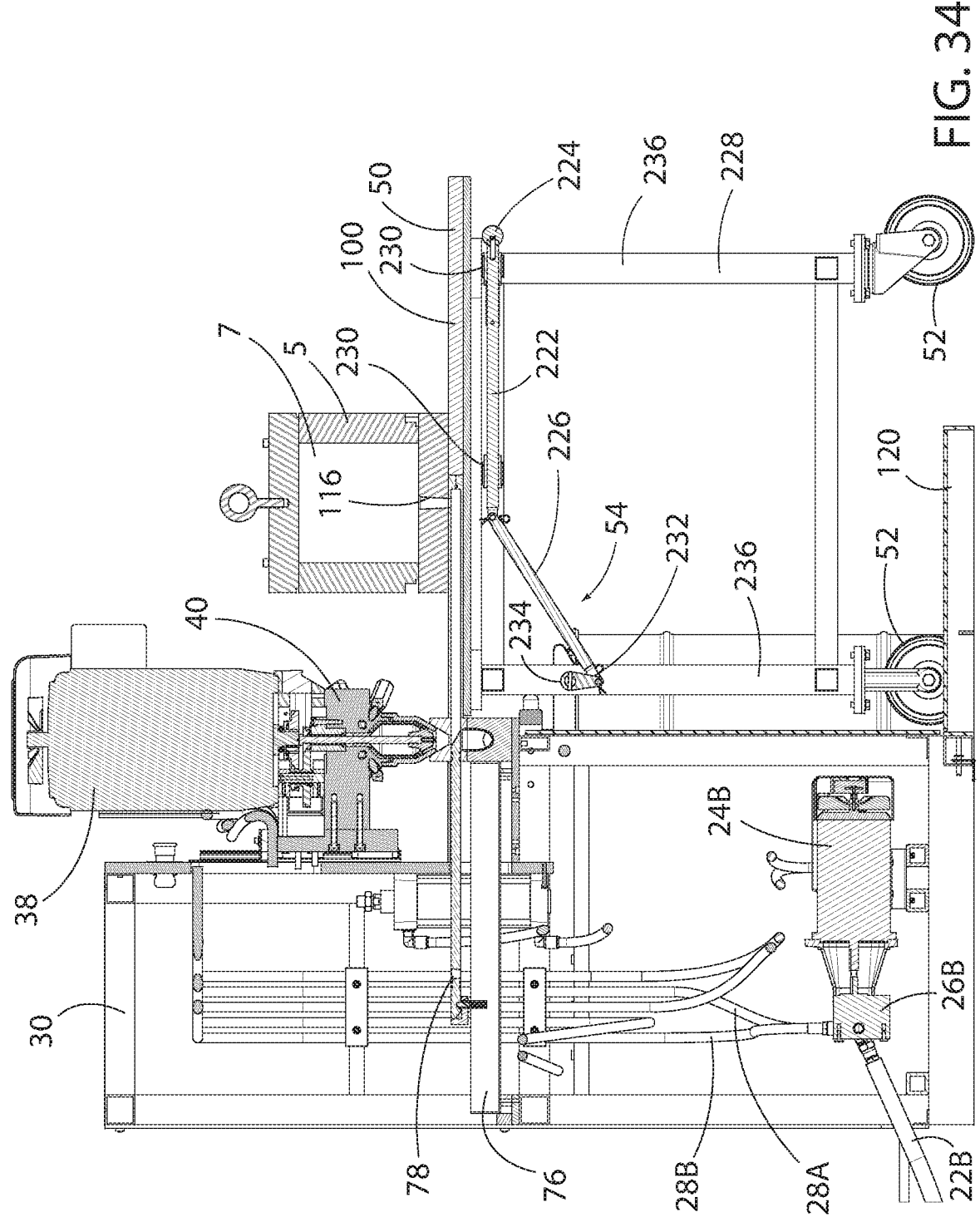
FIG. 34 is a cross-sectional view of the second embodiment of the injection system in accordance with the present disclosure, taken along the line XXXIV-XXXIV in FIG. 31.
Figure 35:
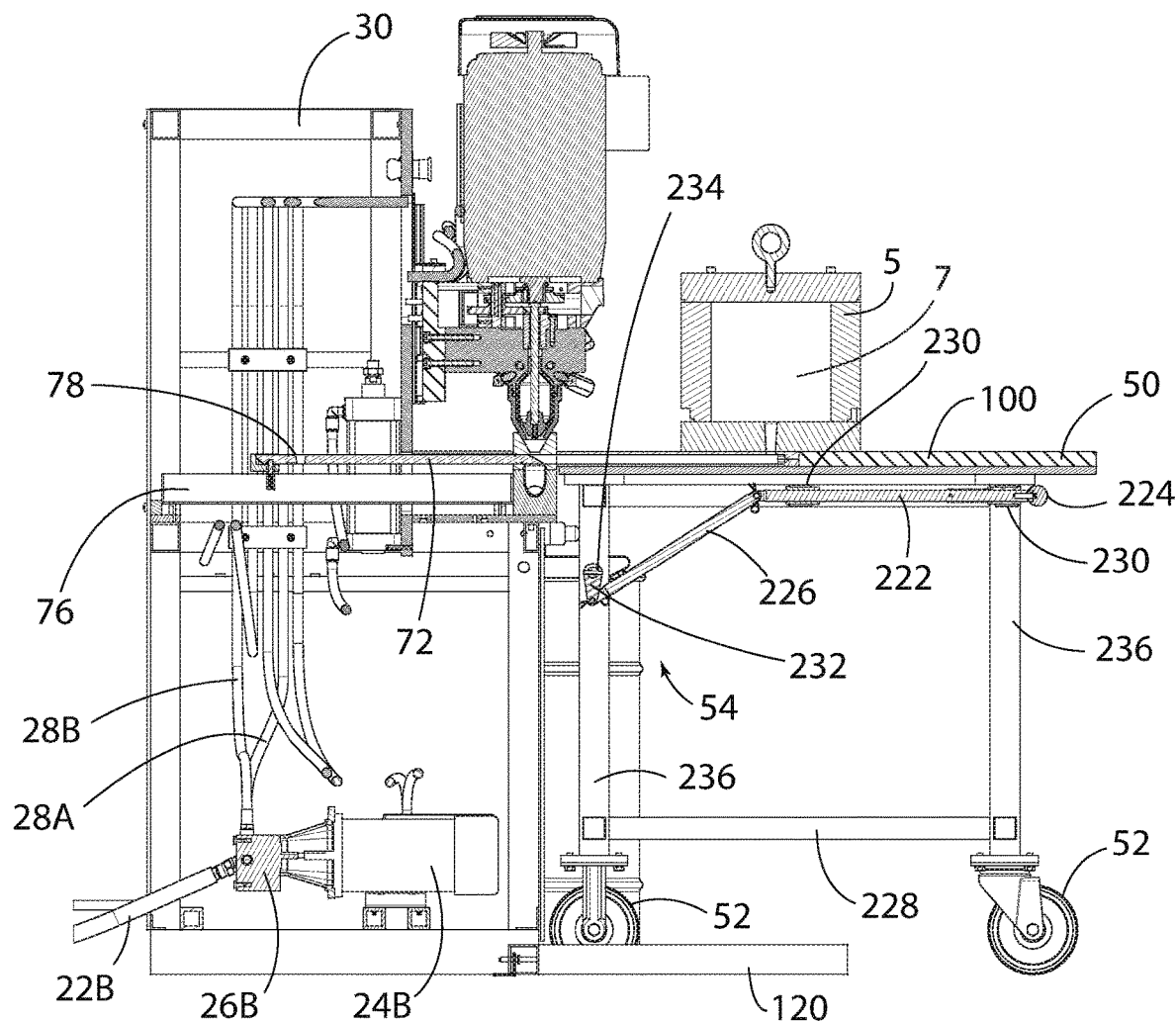
FIG. 35 is another cross-sectional view of the second embodiment of the injection system in accordance with the present disclosure, taken along the line XXXIV-XXXIV in FIG. 31.
Figure 36:
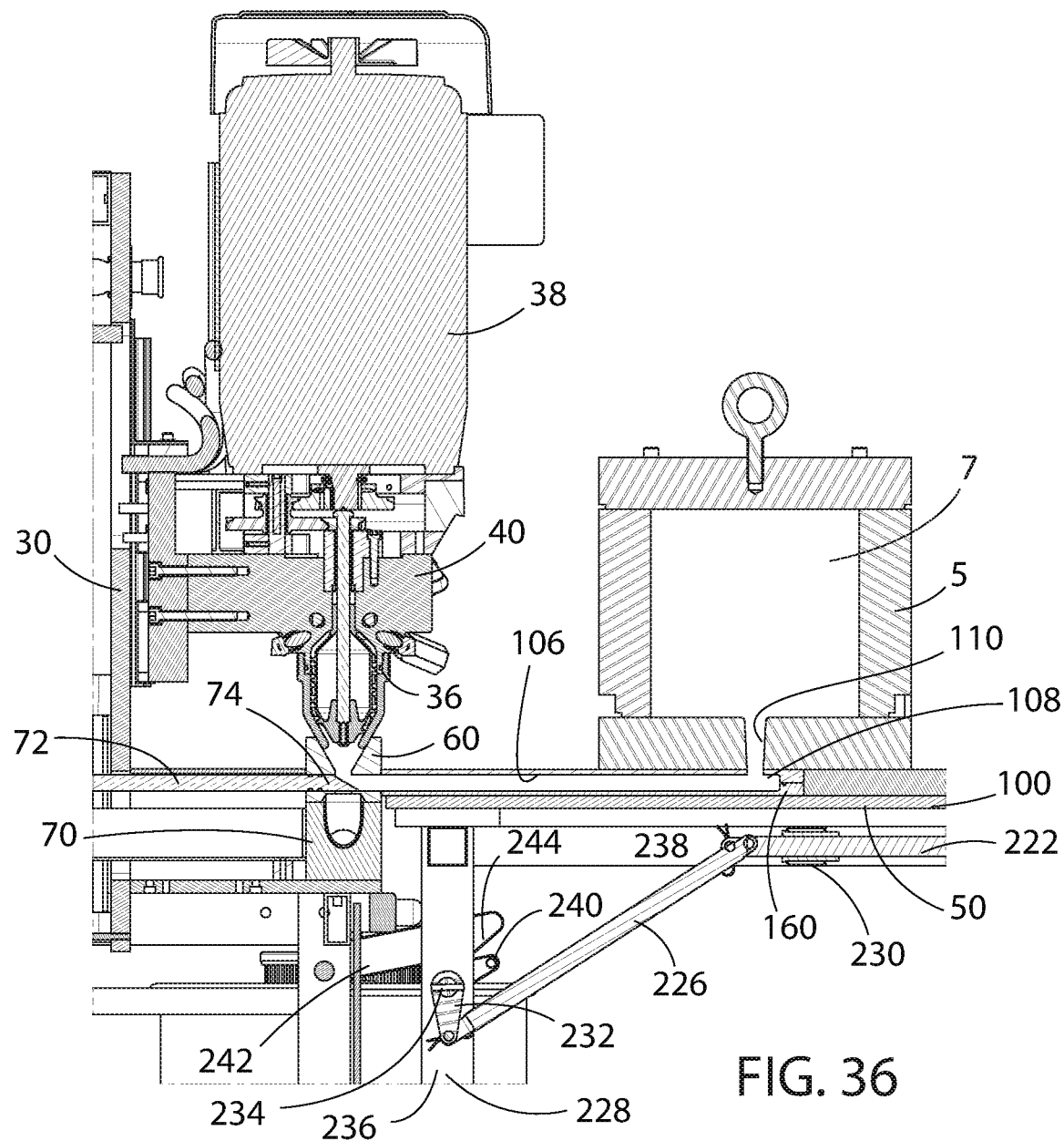
FIG. 36 is partial cross-sectional view of the injection unit and movable molding table of the second embodiment of the injection system in accordance with the present disclosure, taken along the line XXXIV-XXXIV in FIG. 31.
Figure 37:
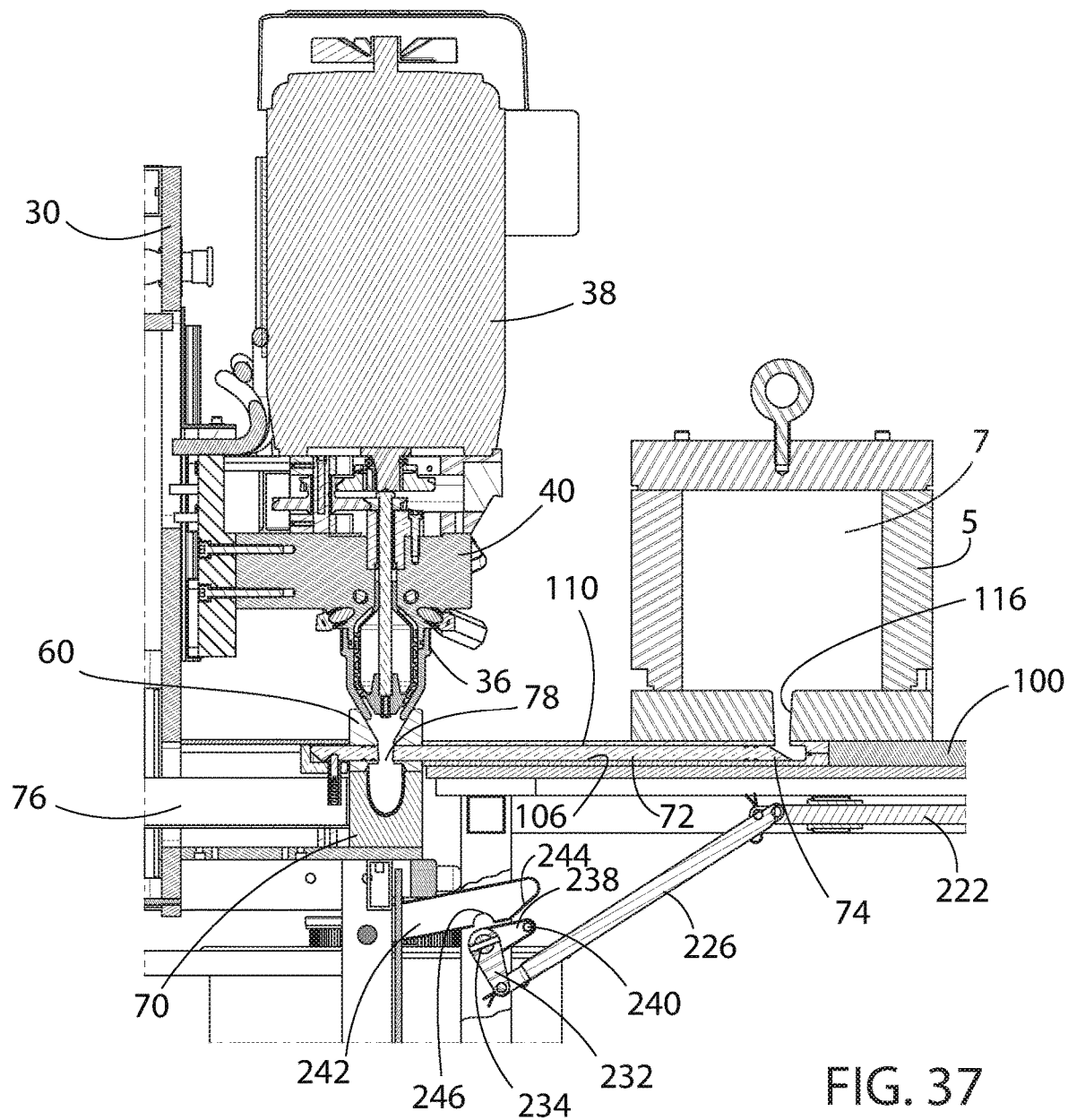
FIG. 37 is another partial cross-sectional view of the injection unit and movable molding table of the second embodiment of the injection system in accordance with the present disclosure, taken along the line XXXIV-XXXIV in FIG. 31.
Figure 38:
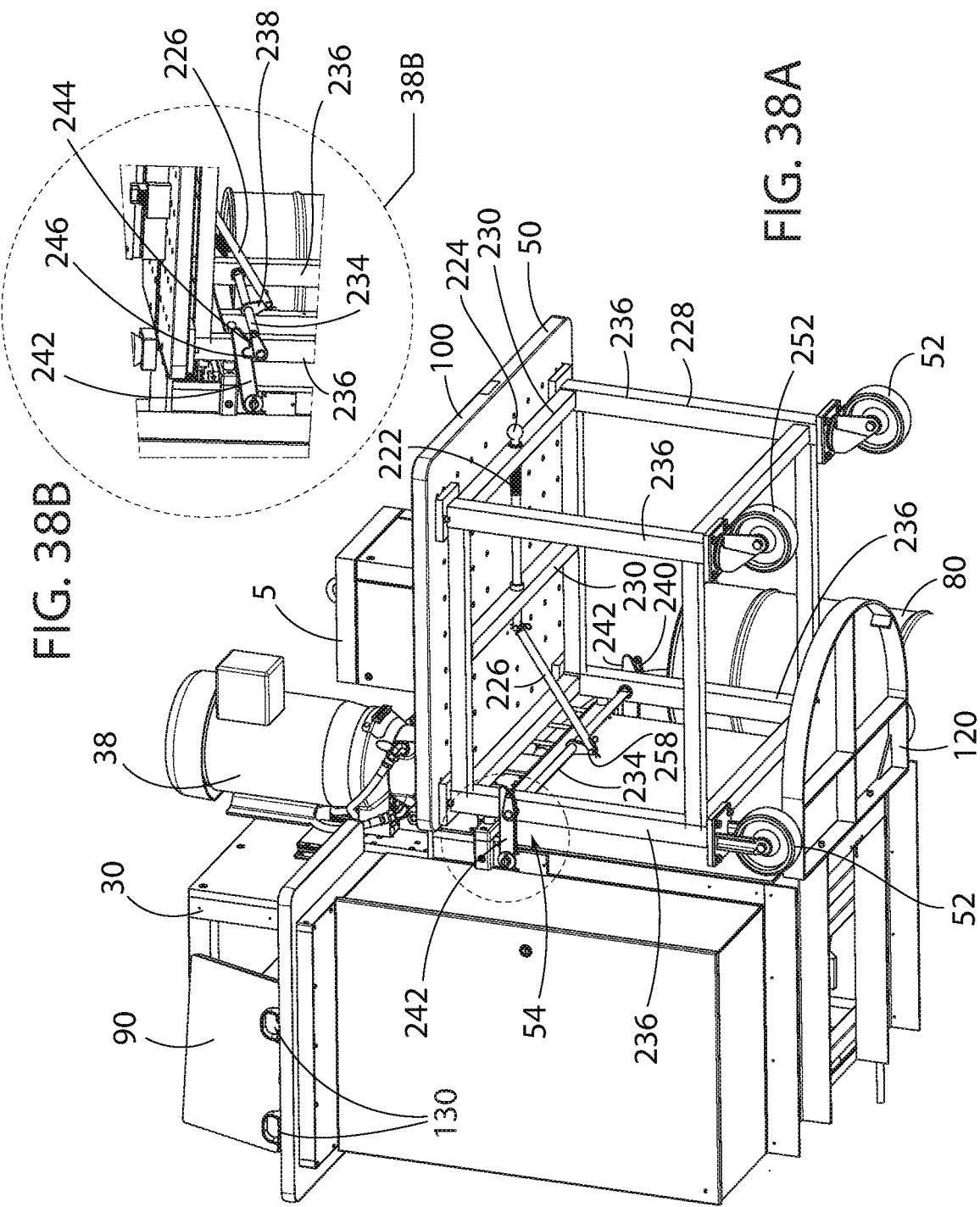
FIG. 38A is a bottom perspective view of the movable molding table of the second embodiment of the injection system in accordance with the present disclosure.
FIG. 38B is a top perspective view of the movable molding table of the second embodiment of the injection system in accordance with the present disclosure.
Figure 39:
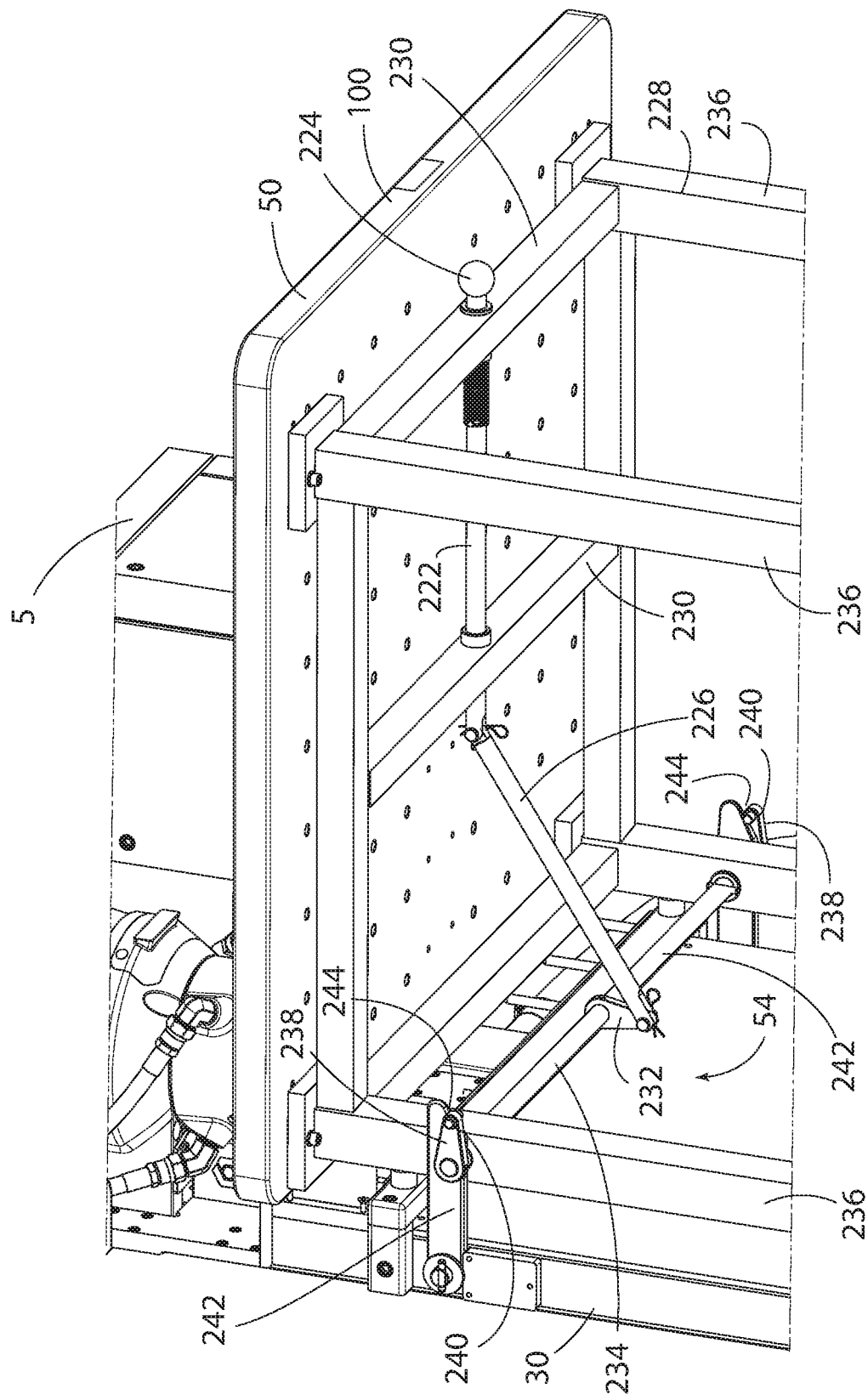
FIG. 39 is a close-up bottom perspective view of the movable molding table of the second embodiment of the injection system in accordance with the present disclosure.
Figure 40:
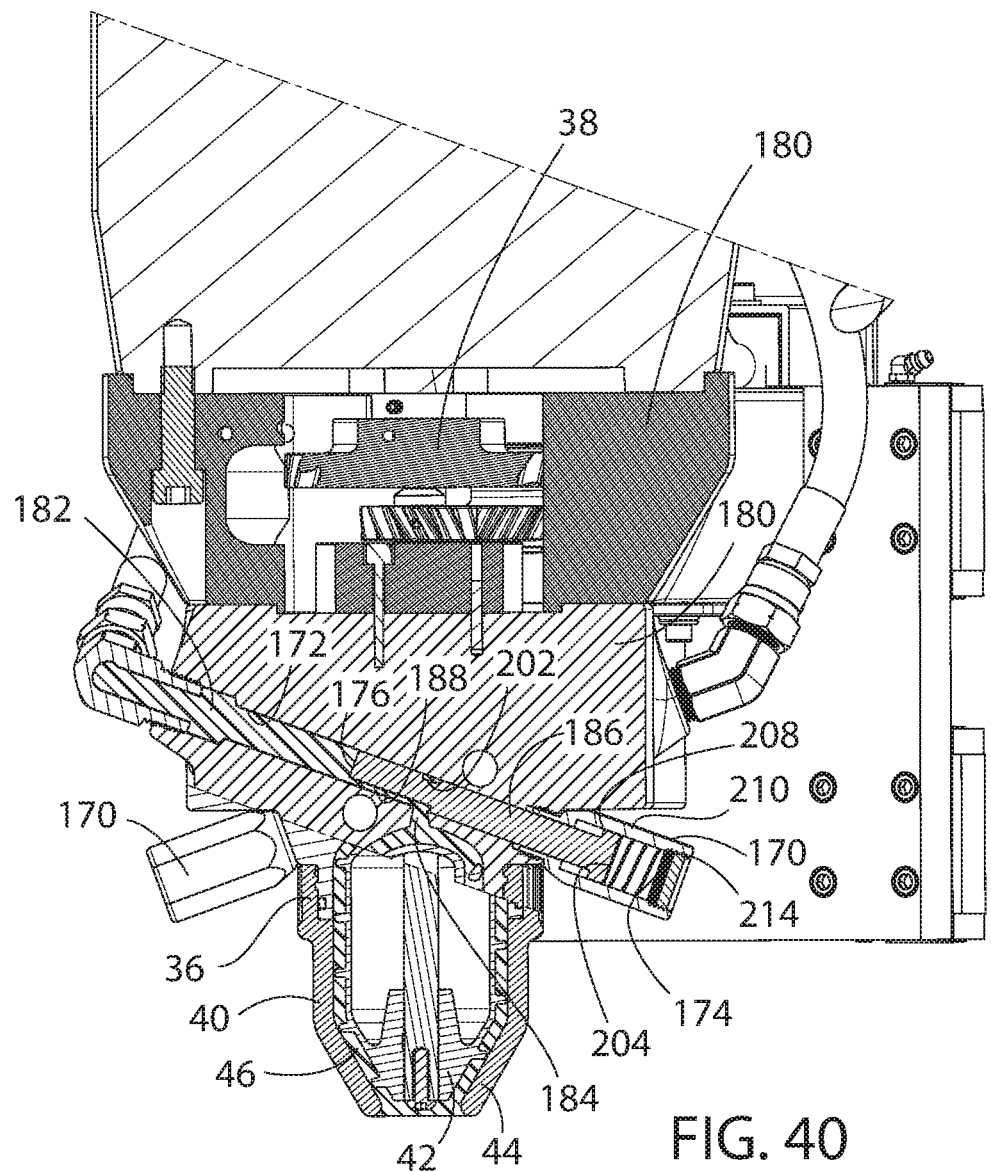
FIG. 40 is a cross-sectional view of the injection unit of the second embodiment of the injection system in accordance with the present disclosure, where the inlet valve is in the open position, taken along the line XLI-XLI in FIG. 30.
Figure 41:
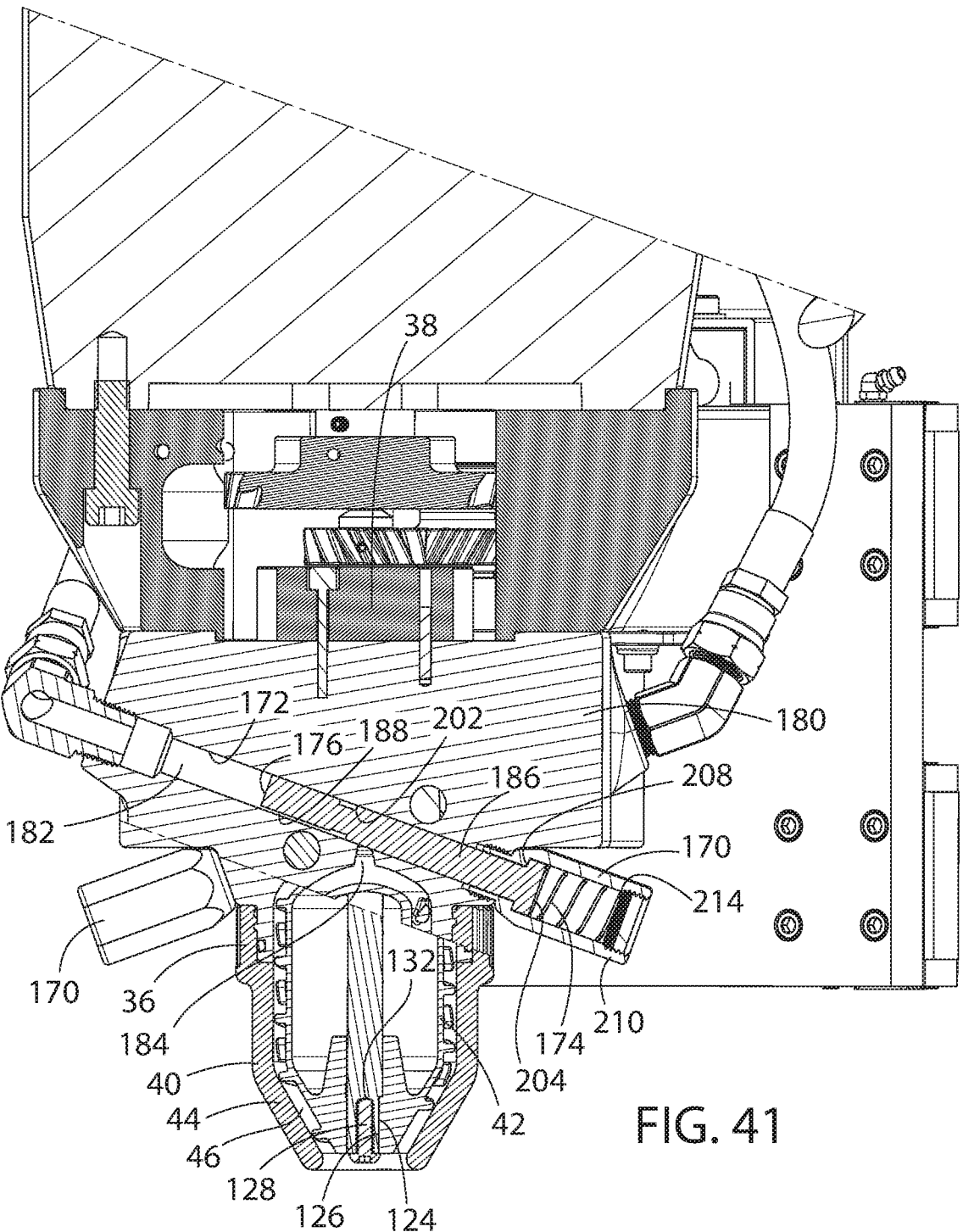
FIG. 41 is a cross-sectional view of the injection unit of the second embodiment of the injection system in accordance with the present disclosure, where the inlet valve is in the closed position.

A further alternative embodiment of the system 10 is disclosed in FIGS. 34-37. In this embodiment, neither the fill cup 60 nor the rinse cup 70 are displaced during either the injection cycle or the rinse cycle. Rather, the fill cup 60 is disposed above and in axial alignment with the rinse cup 70, as shown. The retractable rinse table 72 is provided with a beveled end 74 that may be disposed between the fill cup 60 and the rinse cup 70, so as to allow fluid communication between the mixing and injection head 40 and the investment pattern mold 5 during the injection cycle, but prevent fluid communication between the fill cup 60 and the rinse cup 70, as shown in FIGS. 34-36. During the rinse cycle, however, the retractable rinse table 72 is extended by an actuator 76 to an extended position within the channel 106 on the movable molding cart 50, whereby the lower injection port 162 of the investment pattern mold 5 is effectively closed. The retractable rinse table 72 is further provided with an aligned orifice 78 through which the rinse solvent 20C may flow from the mixing and injection head 40, through the fill cup 60, and into the rinse cup 70 for disposal to the waste line 82.

The mixing and injection head 40 is further provided with a plurality of inlet valves 170 disposed within the static base 180 of the mixing and injection head 40. The inlet valves 170 are interposed between the metering pumps 26A, 26B, 26C, for the raw materials 20A, 20B, 20C and an inlet to the vertical mixing chamber for raw materials. The inlet valves 170 are each mounted within a valve guide 172 and biased to a closed position by a valve spring 174.

In a first embodiment of the inlet valve 170, shown in FIGS. 8-11 and 21, the inlet valve 170 valve comprises a poppet valve having a valve inlet 182, a valve outlet 24, a valve stem 178, and a valve member 176 formed as a frustoconical center portion proximate the outlet 184, upon which the raw material 20A, 20B, 20C to be injected urges the valve member 176 to an open position by the pressurization of metering pumps 26A, 26B, 26C where it is maintained until raw material 20A, 20B, 20C delivery to the mixing and injection head 40 terminates and the pressure created thereby is terminated, whereupon the valve spring 174 then returns the inlet valve 170 to a closed position to seal the mixing and injection head 40.

In a second embodiment of the inlet valve 170, shown in FIGS. 40-43, the inlet valve 170 comprises a linear valve having a valve inlet 182, a valve outlet 184, and a substantially cylindrical main body 186 having a valve member 176 and an inlet portion 188 at a distal end 200 thereof that defines a flow path within the inlet valve 170 in cooperation with the valve guide 172. An annular notch 202 is disposed adjacent the inlet portion 188. The raw material 20A, 20B, 20C to be injected urges the valve member 176, and with it the annular notch 202, into alignment with the valve outlet 184 and thereby flows into the mixing and injection head 40, placing the inlet valve 170 in an open position by the pressurization of the metering pumps 26A, 26B, 26C. The inlet valve 170 is maintained in the open position until raw material delivery to the mixing and injection head 40 terminates and the pressure created thereby is terminated, whereupon the valve spring 174 then returns the inlet valve 170 to a closed position, in which the annular notch 202 is not in alignment with the valve outlet 184 to seal the mixing and injection head 40, thus closing the inlet valve 170.

Figure 42:
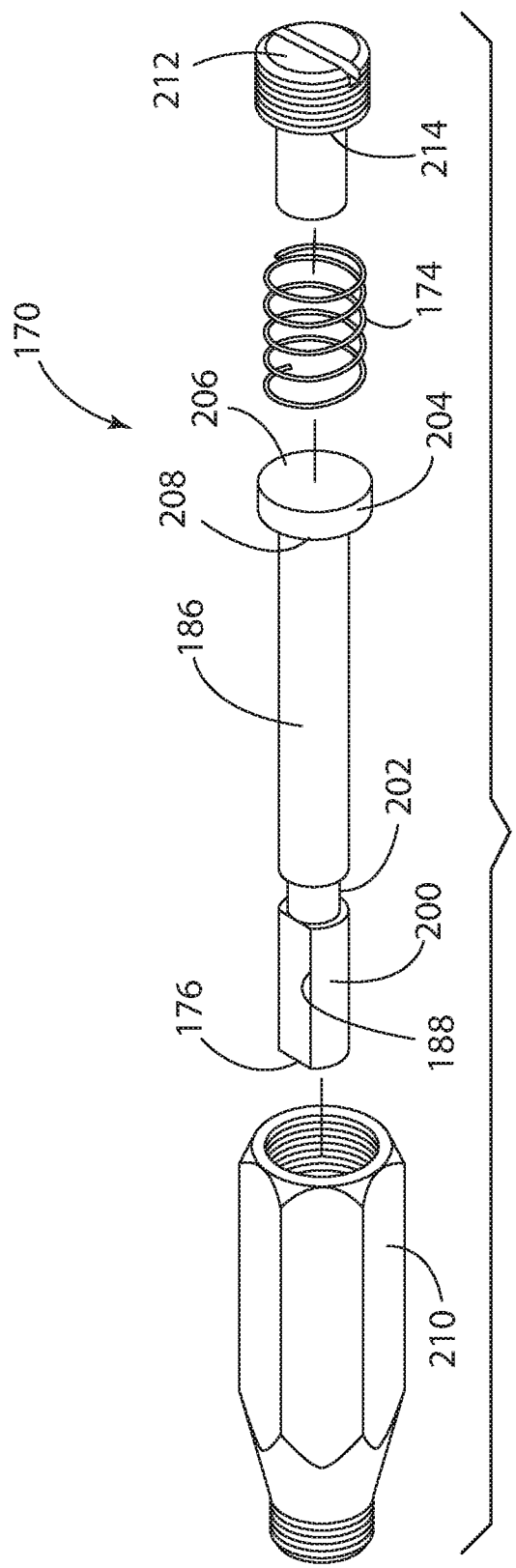
FIG. 42 is exploded view of the second embodiment of the inlet valve of the second embodiment of the injection system in accordance with the present.

As best shown in FIG. 42, the main body 186 includes a proximate end 204 having a first spring seat 206 and a shoulder portion 208. A hollow cylindrical terminal fitting 210 is provided within which the distal end 200 of the main body 186 is inserted and positioned against the shoulder portion 208. A plug 212 is attached to the terminal fitting 210 defining a second spring seat 214, and the valve spring 174 is disposed between the first and second spring seats 206, 214.

An advantage of the second embodiment of the inlet valve 170 is that the inlet valve 170 is self-contained and can readily be removed for cleaning and replacement, if needed. In addition, the linear inlet valve 170 tends to resist fouling by debris accumulating within the inlet valve 170. It has been found that the accumulation of such debris on the valve seat of poppet inlet valve 170 may occur. Such debris may allow air into the mixing and injection head 40, which may prematurely form a crust on the injectable product 164 within the vertical mixing chamber 46. In the event that such debris does accumulate within the linear inlet valve 170, it has been found that simply rotating the linear inlet valve 170 within the valve guide 172 is usually sufficient to dislodge such debris. In addition, the linear inlet valve 170 tends to be much less expensive than the poppet inlet valve 170.

Returning to the operation of the system 10, to prepare the polyurethane for injection into the investment pattern mold, the A component (or isocyanate) and the B component (a polyol such as glycerin, soybean oil, or other difficult polyol), and potentially a catalyst, can be delivered to the mixing and injection head 40 through the delivery lines 28A, 28B that are essentially full, thus eliminating lag time at the initiation of the injection phase of the cycle. However, when combined, the A and B components, and possibly the catalyst, must be immediately mixed prior to such injection.

The mixing and injection head 40 described above is particularly adapted to provide this function, wherein a predetermined quantity of isocyanate and polyol are each individually pumped into and through the static base 180 of the mixing and injection head 40 via the inlet valves 170 discussed above and into the vertical mixing chamber 46 formed by the outer surface of the rotatable turbine 42 and inner surface of the static mix chamber housing 44. As the isocyanate 20A and polyol 20B are delivered into the mixing and injection head 40, the rotatable turbine 42 may be rotated by a programmable 4-HP turbine motor 38 that spins the rotatable turbine 42 from speeds of zero to approximately 21,000 RPM, for example, 7,200 to 8,000 RPM, for a consistent mixture for each program and to thoroughly mix the isocyanate 20A and polyol 20B, which subsequently flows through displaceable gating tray 110 and the sprue 108 at a distal end thereof, through the investment port 116 of the investment pattern mold 5, and into the cavity of the investment pattern mold 5.

It has been discovered that the high speed dynamic mixing disclosed herein via the mixing and injection head 40 can significantly reduce cycle time. For example, by spinning the rotatable turbine 42 at speeds approximately between 7,200 to 8,000 RPM, the cure time of the injectable product within the investment pattern mold 5 can be reduced from 25 minutes to 5 minutes. It is believed that this accelerated cure rate is a result of the additional energy added to the system by the high speed dynamic mixing. Thus, the overall cycle time for any particularly molded article may be significantly reduced.

As shown in FIGS. 1-3, 15-22, and 27, the movable molding cart 50 may be rolled up to the injection unit 30 and locked in place with the alignment pins 118. The semicircular floor guide 120 located adjacent the bottom portion of the injection unit 30 guides the movable molding cart 50 to a predetermined position relative to the injection unit 30, where the rinse cup 70 then automatically displaces the displaceable gating tray 110 within the channel 106 to the first position to align the sprue 108 with the investment port 116 on the lower portion of the investment pattern mold 5.

Alternatively, as shown in FIGS. 28-30, 34-37, and 45-48, a cart latch 54 can be employed instead of the alignment pins 118. The cart latch 54 may include a release shaft 222 operably coupled with a manually actuated release knob 224 at a first proximal end and pivotably attached to a first end of a connecting shaft 226 at an opposed distal end. The movable molding cart 5 may comprise a frame 228 having legs 236 to which the upper platform 100 is attached, including lateral ribs 230 positioned thereunder. The release shaft 226 may be supported by a pair of lateral ribs under the upper platform 100 of the movable molding cart 50. An opposed second end of the connecting shaft 226 is pivotally coupled to a release cam 232 that is fixedly coupled with a pivotable release bar 234 extending between the forward legs 236 of the movable molding cart 50. A release ear 238 having a release pin 240 is attached to each end of the release bar 234. A pivotable latch 242 is attached to and extends normally horizontally from each side of the injection unit 30 and has a front inverted cam surface 244 and engagement notch 246 on a lower edge thereof.

In operation, as the movable molding cart 50 is moved toward the injection unit 30, the front inverted cam surface 244 of the pivotable latch 242 is engaged by the release bar 234 and urged upwardly until the engagement notch 246 is brought into registration with the release bar 234. At that time, the pivotable latch 242 rotates into engagement between the engagement notch 246 and the release bar 234 and the movable molding cart 50 is thus operably coupled with the injection unit 30.

To release the movable molding cart 50, the release knob 224 is manually pulled, rotating the release bar 234 and causing the release pin 240 to urge the pivotable latch 242 upwards and out of engagement with the release bar 234, thus allowing the movable molding cart 50 to be pulled away from the injection unit 30.

A further aspect of the present disclosure relates to a vent apparatus 190 having a closure 192 for a cavity vent 194 mounted at the top of the investment pattern mold 5 to aid in proper material density, as shown in FIGS. 23, 49, 50A, and 50B. A method may be provided of venting investment pattern mold 5 gases as the liquid foam enters the mold cavity 7 and then expands. Before the chemical reaction is complete, the vents 194 need to be closed to create back-pressure and foster good packing of the cavity 7 of the investment pattern mold 5 by the foam expansion.

At the conclusion of the injection cycle, a cavity vent apparatus 190 at the top of the investment pattern mold 5 vents from the top of the investment pattern mold 5 as a rise time is reached to provide slight back pressure to pack the part and create tight cell structured skin. The operator can then close a vent apparatus 190 on the investment pattern mold 5. As polyurethane begins to foam, closure of the vent apparatus 190 creates a back pressure and with it a tight skin. Any polyurethane foam exiting the fill cup 60 may be simply twisted off to make the system 10 ready for the next shot.

Figure 23:
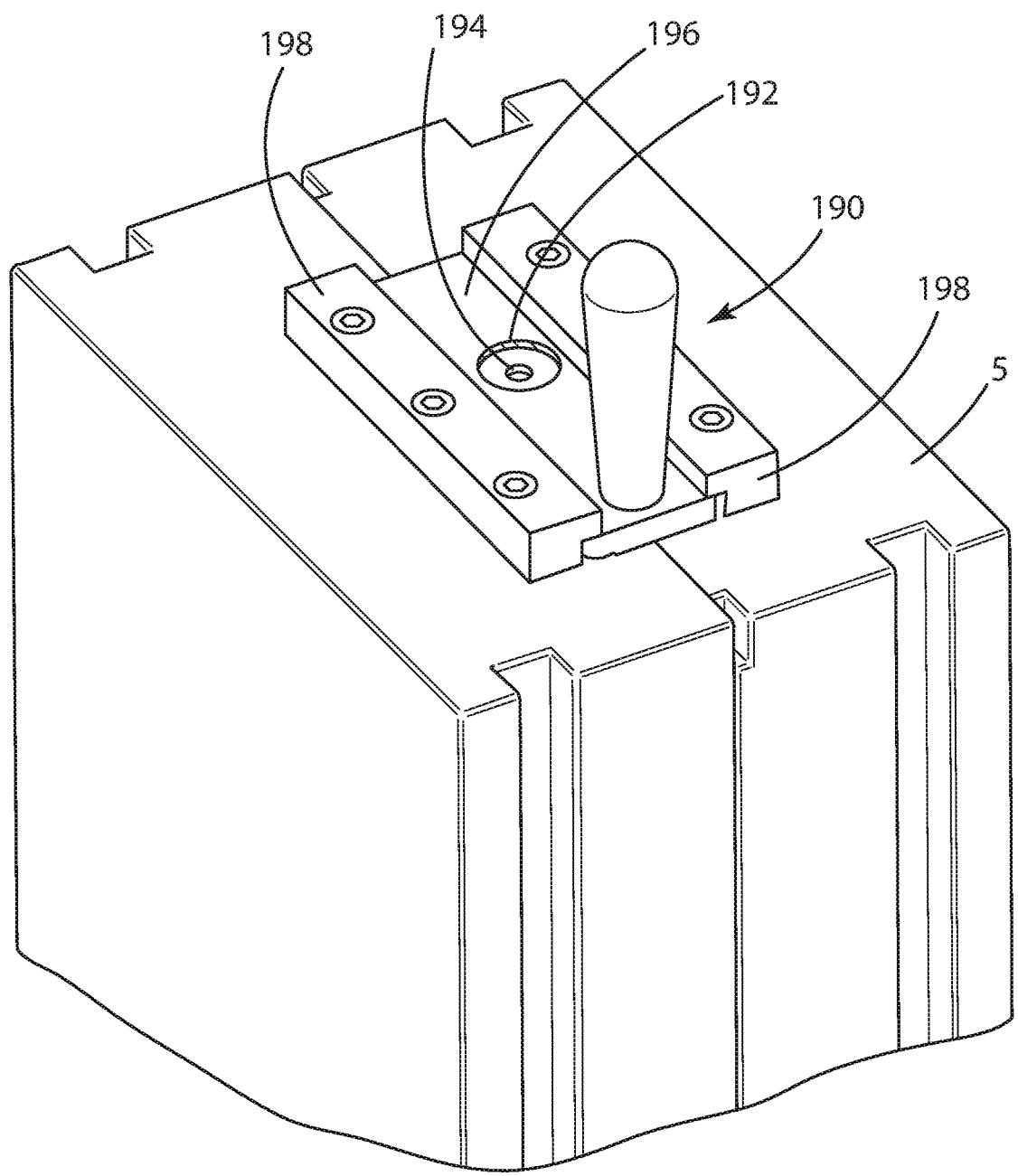
FIG. 23 is a top perspective view of the investment pattern mold and upper vent apparatus of the investment pattern mold of the first embodiment of the injection system in accordance with the present disclosure, wherein the upper vent apparatus is in the closed position.
Figure 25:
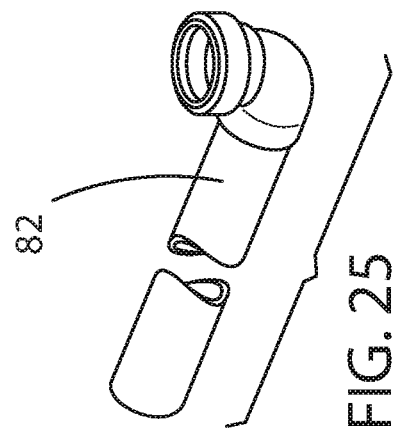
FIG. 25 is a perspective view of the waste line of the waste rinse vessel of the first embodiment of the injection system in accordance with the present disclosure, subsequent the injection sequence.
Figure 24:
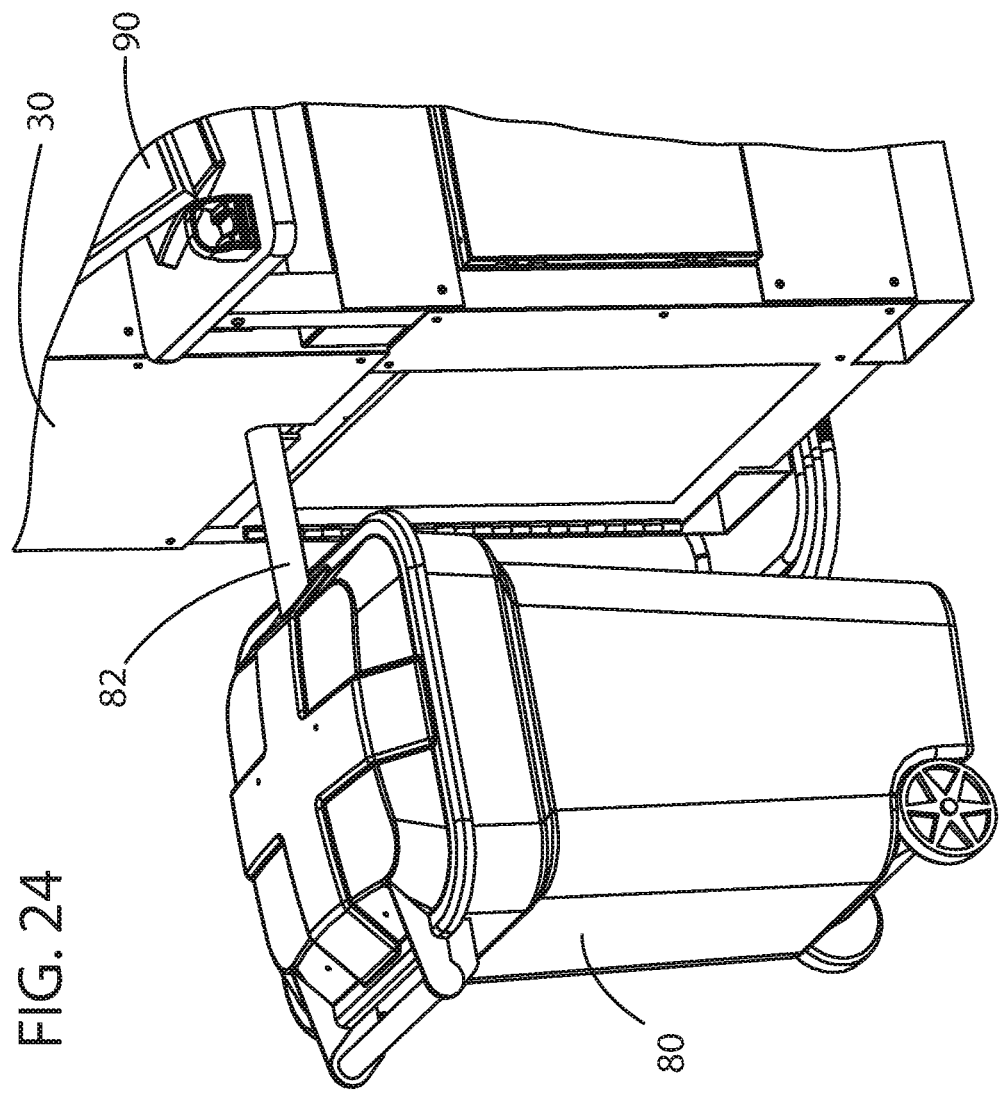
FIG. 24 is a perspective view of the waste rinse vessel of the first embodiment of the injection system in accordance with the present disclosure.
Figure 26:
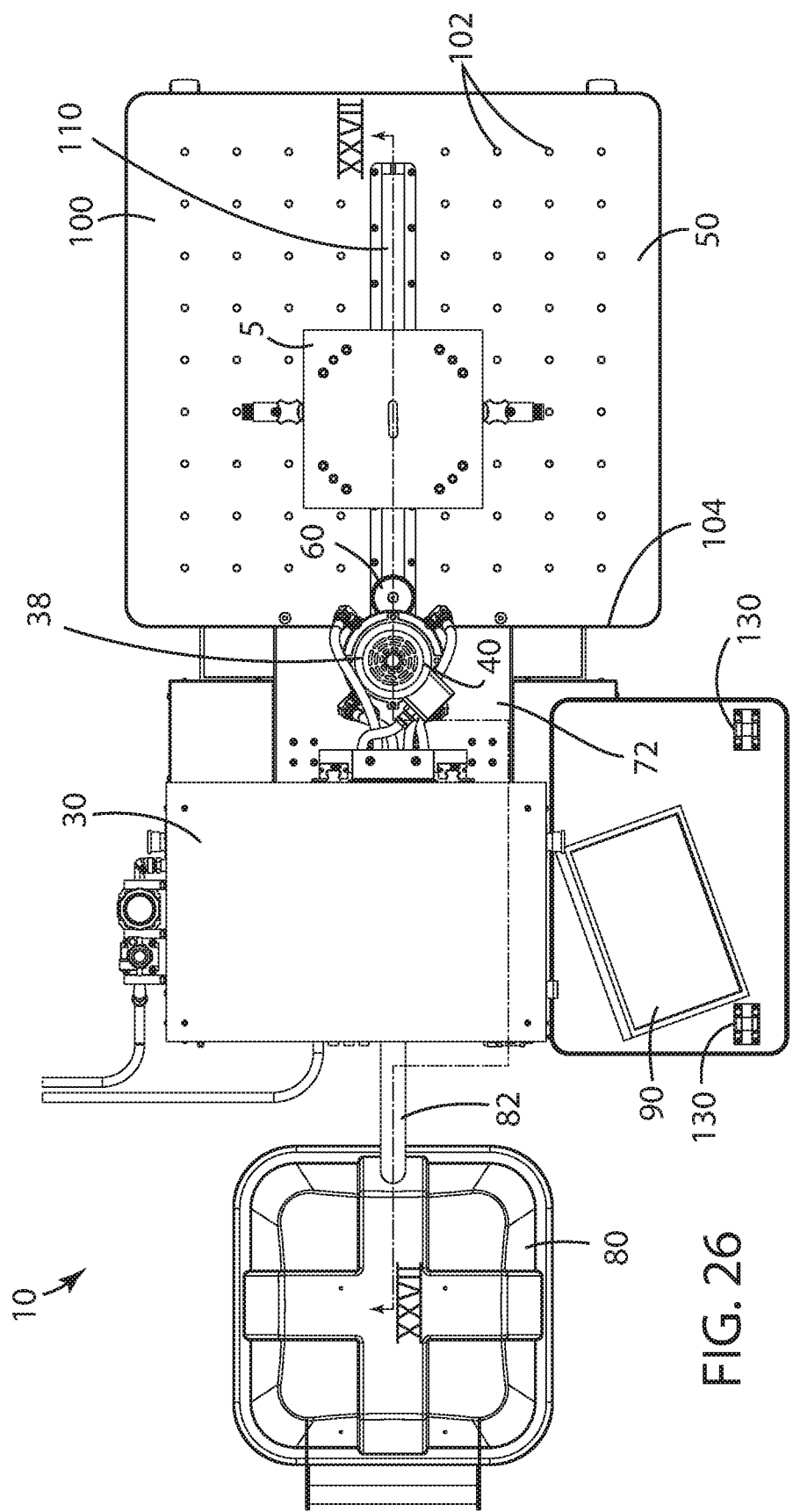
FIG. 26 is a view of the injection unit, mixing and injection head, investment pattern mold and movable molding cart of the first embodiment of the injection system in accordance with the present disclosure.
Figure 27:
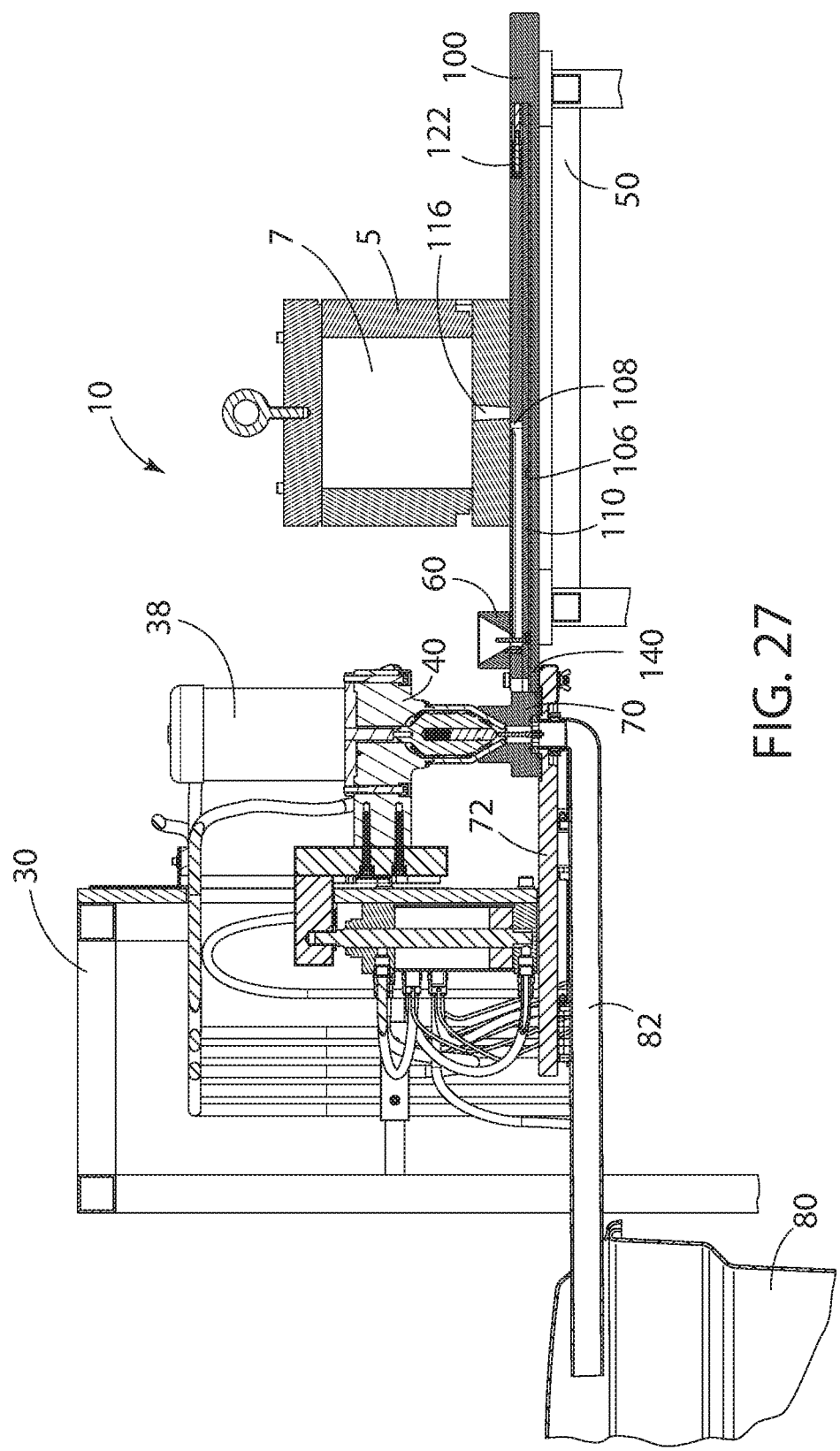
FIG. 27 is a side cross-sectional view of the injection unit, mixing and injection head, investment pattern mold and movable molding cart along the line XXVII-XXVII of the injection system of FIG. 26 in accordance with the present disclosure.

In a first embodiment of the vent apparatus 190, shown in FIG. 23, the vent apparatus 190 comprises a slidable vent block 196 that is restrained within opposing rails 198 attached to the upper surface of the investment pattern mold 5 proximate the cavity vent 194, wherein the slidable vent block 196 is moved between a first position, in which the cavity vent 194 is open and air and gases within the investment pattern mold 5 may be vented outside of the investment pattern mold 5 via the cavity vent 194, and a second position that abruptly closes off the cavity vent 194 to the outside. As the investment pattern mold 5 is filled with the injectable product 164, the open cavity vent 194 will allow any air or gases in the investment pattern mold 5 to escape out of the investment pattern mold 5. Once the investment pattern mold 5 injectable product 164 is detected emerging from the cavity vent 194, the slidable closure, shown as vent block 192, is slid to the second position to close off the cavity vents 194, forcing the foam to "pack" in position to yield a target density and to eliminate voids within the investment pattern mold 5.

Figure 49:
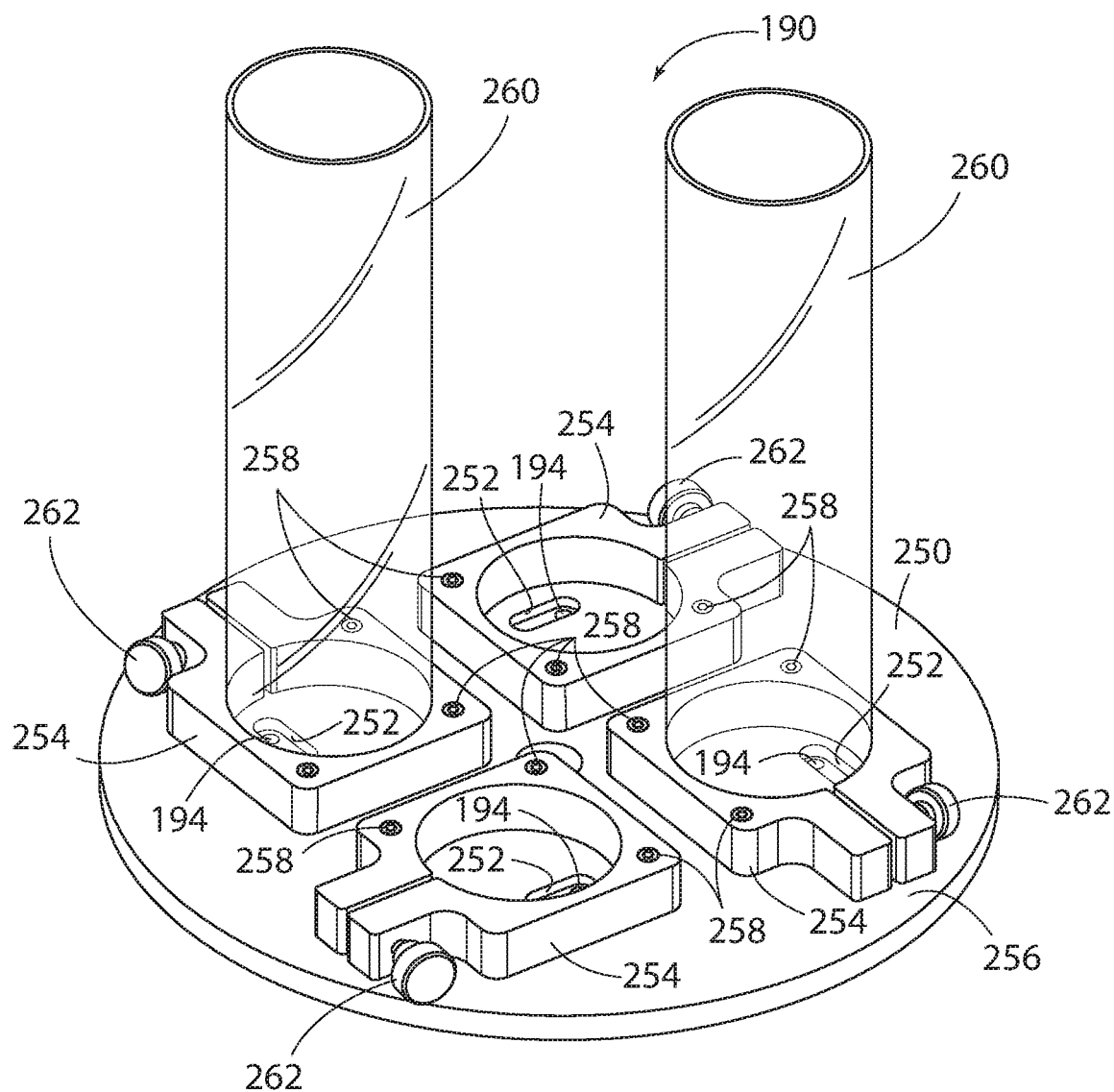
FIG. 49 is a perspective view of a second embodiment of the vent apparatus in accordance with the present disclosure.
Figure 50A:
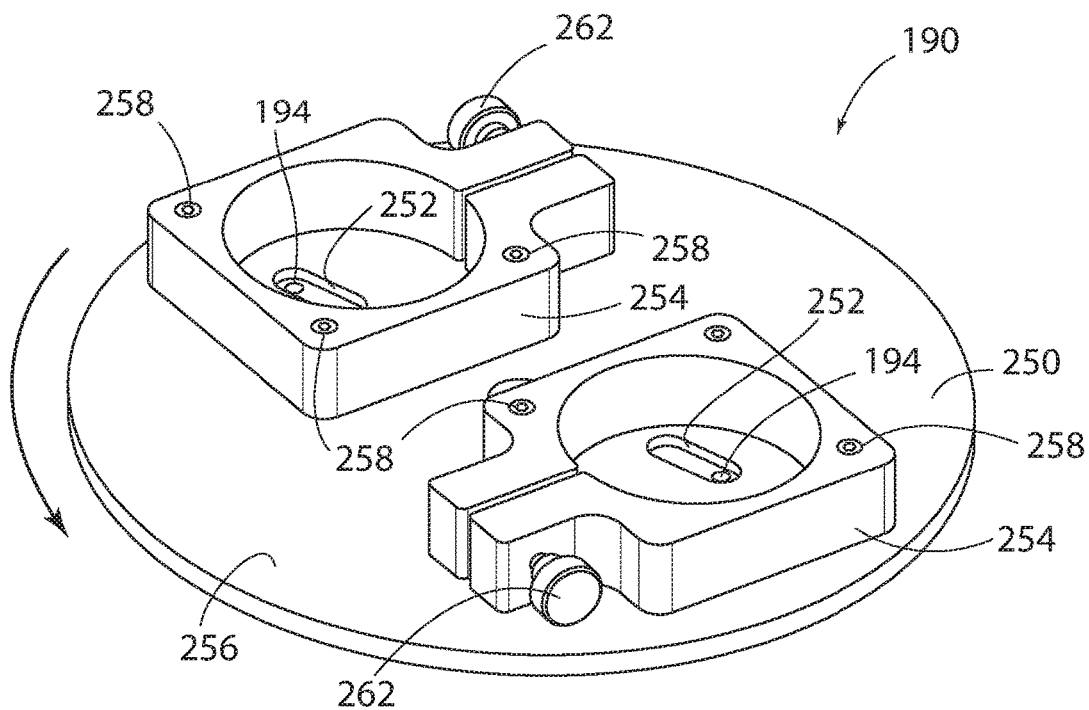
FIG. 50A is a perspective view of the second embodiment of the vent apparatus in accordance with the present disclosure.
Figure 50B:
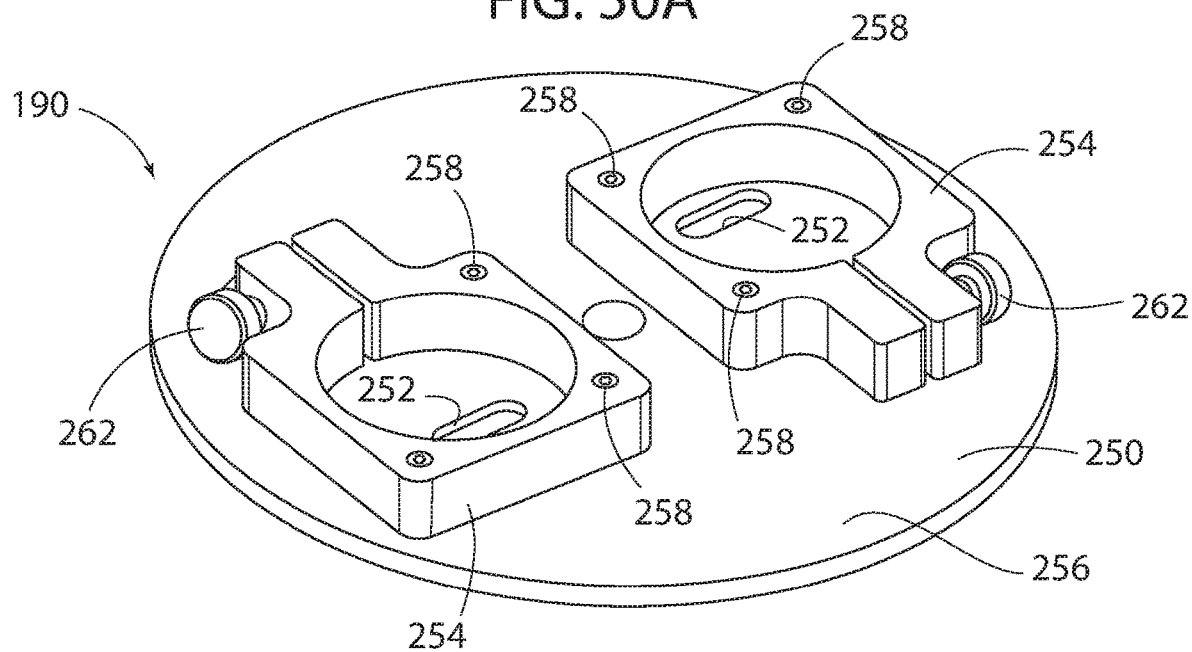
FIG. 50B is a perspective view of the second embodiment of the vent apparatus in accordance with the present disclosure.

In a second embodiment of the vent apparatus 190, shown in FIGS. 49, 50A, and 50B, the vent apparatus 190 comprises a rotatable vent carousel 250 pivotably attached at a center thereof to the upper surface of the investment pattern molds. The vent carousel 250 may be provided with a plurality of vent openings 252, shown in FIG. 49 as four vent openings and in FIGS. 50A and 50B as two vent openings, that may each be rotated into registration with the cavity vent 194 for each of the mold cavities. A collar 254 may be mounted to the upper surface 256 of the vent carousel 250 via fasteners 258, in a position disposed generally concentrically about each of the vent openings 252, within which a containment tube 260 is received and releasably mounted via a clamp 262.

The vent carousel 250 may be rotated between a first position, in which the openings 252 are aligned with cavity vent 194 and the cavity vent 194 is open, whereby air and gases within the investment pattern mold 5 may be vented outside of the investment pattern mold 5 via the cavity vent 194 and the vent openings 252, as shown in FIG. 50A, and a second position that abruptly closes off the cavity vent 194 to the outside, as shown in FIG. 50B. Once the investment pattern mold 5 injectable product 164 is detected emerging from the cavity vent 194 and vent opening 252 and into the containment tube 260, the vent carousel 250 is rotated to the second position to close off the cavity vents 194, forcing the foam to "pack" in position to yield a target density and to eliminate voids within the investment pattern mold 5. The injectable product 164 in the containment tubes 260, now waste material, may be readily removed and discarded.

The alignment pins 118 or cart latch 54 operably coupling the movable molding cart 50 to the injection unit 30 can then be disconnected and the investment pattern mold 5 pushed away from the injection unit 30. For efficiency and purposes of higher pattern production, a team of operators using this system have several movable molding carts 50, so that multiple investment pattern molds 5 can be assembled and disassembled, and attached and detached, from the movable molding carts 50 while another one is in use and operably coupled to the injection unit 30. It should be appreciated that any material left in the displaceable gating tray 110 after the cycle is complete can be simply removed and discarded during this phase of the cycle.

A further feature of this disclosure is the use of a heated movable molding cart 50 for disassembly and assembly of the investment pattern molds 5 prior to their installation on the investment pattern mold (not shown). Such a heated movable molding cart 50, which may be heated by an integral water jacket to about 100° F. to 120° F., has been found to result in superior molded pattern quality, in that the injectable product 164 is not cooled by the investment pattern mold 5 during the injection phase of the cycle.

A clear plastic visual test cup (not shown) may also be attached to the static base 180 to allow test material to be evaluated for color and consistency prior to actual injection. The test cup may also be provided with a threaded collar 36 at an upper edge of a cylindrical upper portion thereof by which the test cup is attached to the mixing and injection head 40. A notch 32 is provided on one side of the threaded collar 36 that is aligned with one of the pair of proximity sensors when completely installed. Since the notch 32 will prevent one of the pair of proximity sensors from generating a signal, only one signal will be apparent (rather than two signals when the static mix chamber housing 44 is attached) and the computer 90 is advised that the test cup, and not the static mix chamber housing 44, is attached to static base 180, thereby allowing manual operation of the material test extrusion to continue.

It is contemplated by the present disclosure that the system 10 disclosed herein, and more particularly the injection unit 30 and the movable molding cart 50, can also be used in the process of molding solid urethane articles through the injection of a liquid urethane material. That is, in the past, the A and B components were typically delivered to an injection head and a then injected through a static mix tube to accomplish the proper mixing of the A and B components prior to their injection into the mold. Subsequent the injection step, the static mix tube is filled with A and B components and is typically discarded, which is wasteful and expensive.

Further, typically mechanical chain and gear drives were used to actuate the pumps and to meter the A and B components into the injection head, which tended to lack precision in delivering a predetermined quantity of either the A or B components to the injection head. Additionally, the control valves used to control the delivery of the A and B components to the injection head were typically actuated by air pressure to open and close the control valves, adding imprecision, complexity, and cost to the system.

In comparison to the aforementioned liquid urethane molding devices, the present disclosure can be aptly applied to the injection of liquid urethane, thereby avoiding the use of a static mix tube, the reliance on chain and gear drives, and air actuated control valves. Rather, the static mix tube has been replaced with the mixing and injection head 40 disclosed herein, which can be repeatedly reused with little waste and expense. Further the chain and gear drives are herein replaced with very precise servo motors 24A, 24B that are capable of delivering very precise quantities of each of the A and B components. In addition, the inlet valves 170 disclosed herein, particularly the embodiment employing the main body 186, provides a much simpler and less expensive solution to controlling the flow of material to the mixing and injection head 40. Finally, the microprocessor control of the digital computer 90 disclosed herein allows many different programs to be stored for injection into multiple molds 5 having different volumes and injection timing requirements.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

These and other features, advantages, and objects of the present invention will be further understood and appreciated by those skilled in the art by reference to the following specification, claims, and appended drawings.

What is claimed is:

1. An injection system for molding molded articles within a mold cavity of a mold, the injection system comprising:
    an injection unit comprising a mixing and injection head further comprising a vertical mixing chamber, an inlet to the vertical mixing chamber for a raw material of an injectable product, and an injection nozzle at a lower end of the vertical mixing chamber for the injectable product;
    a metering pump for delivering a predetermined quantity of the raw material to the vertical mixing chamber; and
    a movable molding cart upon which the mold is mounted, the movable molding cart comprising a displaceable gating tray disposed within a channel of the moveable molding cart, a fill cup disposed on the displaceable gating tray, and a closable sprue in alignment with the mold cavity;
    wherein when the movable molding cart is in a first position proximate the mixing and injection head, the fill cup may be placed in vertical alignment with the injection nozzle of the vertical mixing chamber and the closable sprue is placed in an open position so that the injectable product may be injected into an investment port of the mold cavity.

2. The injection system of claim 1, wherein the raw material comprises a polymer.

3. The injection system of claim 2, wherein the raw material comprises a polyol and an isocyanate and the metering pump is one of a plurality of metering pumps, one of the plurality of metering pumps for each of the polyol and the isocyanate.

4. The injection system of claim 3, wherein the injectable product is a liquid polyurethane.

5. The injection system of claim 3, wherein the injectable product is a polyurethane foam.

6. The injection system of claim 3, wherein the raw material further comprises a catalyst.

7. The injection system of claim 1, further comprising an inlet valve interposed between the metering pump and the inlet to the vertical mixing chamber.

8. The injection system of claim 7, wherein the inlet valve is disposed within a static base of the mixing and injection head, mounted in a valve guide therein, and biased to a closed position by a valve spring.

9. The injection system of claim 8, wherein the inlet valve comprises an inlet, an outlet, a valve stem and a valve seat formed about a frustoconical center portion proximate the outlet and upon which the raw material to be injected urges the valve seat to an open position by pressurization of the metering pump where it is maintained until raw material delivery to the mixing and injection head terminates and the pressure created thereby is terminated, whereupon the valve spring then returns the inlet valve to a closed position to seal the mixing and injection head.

10. The injection system of claim 8, wherein the inlet valve comprises an inlet, an outlet, and a substantially cylindrical main body having a valve face and an inlet portion at a distal end thereof that defines a flow path within the valve in cooperation with the valve guide, and an annular notch adjacent the inlet portion and upon which the raw material to be injected urges the valve face and annular notch into alignment with the outlet and to an open position by pressurization of the metering pump where it is maintained until raw material delivery to the mixing and injection head terminates and the pressure created thereby is terminated, whereupon the valve spring then returns the inlet valve to a closed position in which the annular notch is not in alignment with the outlet to seal the mixing and injection head.

11. The injection system of claim 10, wherein the main body of the inlet valve includes a proximate end having a first spring seat and a shoulder portion, a hollow cylindrical terminal fitting within which the distal end of the main body is inserted and positioned against the shoulder portion, and a plug attached to the hollow cylindrical terminal fitting defining a second spring seat, and wherein the valve spring is disposed between the first and second spring seats.

12. The injection system of claim 1, wherein the mixing and injection head comprises a rotatable turbine and a static mix chamber housing that define the vertical mixing chamber, wherein the rotatable turbine comprises a substantially cylindrical body having a cylindrical middle portion, a semispherical upper portion coupled with an input shaft, and a frustoconical lower portion received within the fill cup terminating in a central axial opening proximate the injection nozzle.

13. The injection system of claim 12, wherein the rotatable turbine comprises a plurality of individual raised nodes or flutes arranged about an outer circumference of the rotatable turbine.

14. The injection system of claim 13, wherein a plurality of individual raised flutes are vertically arranged in a plurality of sets of oblique parallel lines relative an axis of the rotatable turbine, and where the plurality of sets of oblique parallel lines of the plurality of individual raised flutes are separated by a plurality of ribs extending about a circumference of the rotatable turbine.

15. The injection system of claim 14, wherein the rotatable turbine comprises four sets of oblique parallel lines and three circumferential ribs.

16. The injection system of claim 12, wherein an outer surface of a lower portion of the static mix chamber housing has a frustoconical configuration and the fill cup on the displaceable gating tray has an inverted frustoconical cavity within which the lower portion of the static mix chamber housing is received, whereby, when the mixing and injection head is fully moved to a Down position, an effective seal is created between the frustoconical lower portion of the static mix chamber housing and the inverted frustoconical cavity of the fill cup, and fluid communication is allowed between the vertical mixing chamber and the displaceable gating tray.

17. The injection system of claim 16, wherein as the mixing and injection head is moved toward the Down position, the outer surface of the frustoconical lower portion of the static mix chamber housing engages the inverted frustoconical conical cavity within the fill cup which fill cup is fixedly attached to the displaceable gating tray, thereby simultaneously laterally pushing the displaceable gating tray to the open position within the movable molding cart.

18. The injection system of claim 17, wherein the central axial opening at the bottom of the rotatable turbine opens into an upwardly extending cylindrical cavity along a portion of an axis of the rotatable turbine adapted to receive an axially reciprocating plunger biased to a fully extended position by a compression spring disposed at a closed end of the cylindrical cavity, which the compression spring urges the plunger to a fully extended position that closes a lower injection port at a bottom of the static mix chamber housing.

19. The injection system of claim 18, wherein the axially reciprocating plunger comprises an axial recess on one side of the axially reciprocating plunger that receives a radial fastener that extends through the body of the rotatable turbine and extends slightly into the cylindrical cavity and into the axial recess, whereby the radial fastener engages the axial recess to prevent the plunger from further movement within the rotatable turbine.

20. The injection system of claim 18, wherein the fill cup on the displaceable gating tray has a vertically extending pin mounted therein and wherein as the mixing and injection head of the mixing and injection head is moved to the Down position, the axially reciprocating plunger engages the vertically extending pin and is displaced upward so as to open the lower injection port.

21. The injection system of claim 20, wherein as the mixing and injection head is moved to an Up position, the axially reciprocating plunger moves away from contact with the upwardly extending pin, and the axially reciprocating plunger returns to the fully extended position to seal the frustoconical lower portion of the static mix chamber housing, thereby preventing injectable product from dripping from the mix chamber out of the mixing and injection head.

22. The injection system of claim 17, wherein a rinse table on the injection unit is extended to push the movable molding cart away from the injection unit and into a rinse position, thereby closing the displaceable gating tray and moving a rinse cup into alignment with the mixing and injection head.

23. The injection system of claim 22, wherein after an injection phase of a cycle is complete, the displaceable gating tray is displaced to a second position within the channel when the mixing and injection head moves to the Up position to close all fluid communication between the sprue and the investment port on a lower portion of the mold.

24. The injection system of claim 23, further comprising a compression spring disposed proximate a second, opposite end of the displaceable gating tray, wherein as the mixing and injection head moves to the Up position, the displaceable gating tray and the fill cup are forced toward an edge of an upper platform of the movable molding cart so that the sprue is no longer in line with the investment port on the lower portion of the mold, thus effectively closing the mold to maintain a target chemical reaction pressure therein after the injection phase of the cycle is compete.

25. The injection system of claim 1, further comprising a metering pump for a rinse solution and a rinse cup placed in vertical alignment with the injection nozzle of the vertical mixing chamber after the injectable product has been injected into the mold cavity.

26. The injection system of claim 25, further wherein the rinse solution is dibasic ester.

27. The injection system of claim 25, further wherein the rinse cup is in vertical alignment with the injection nozzle of the vertical mixing chamber.

28. The injection system of claim 27, further wherein the rinse cup is in vertical alignment with the injection nozzle of the vertical mixing chamber and disposed below the fill cup when the fill cup is in vertical alignment with the injection nozzle of the vertical mixing chamber.

29. The injection system of claim 27, further wherein when the mixing and injection head is fully engaged with the rinse cup, a vertically extending pin mounted within the rinse cup pushes an axially retractable plunger upward against the urging of a compression spring to allow the injectable product to exit the mixing and injection head.

30. The injection system of claim 1, wherein the movable molding cart has a second position displaced from the mixing and injection head.

31. The injection system of claim 1, wherein the movable molding cart is operably coupled with the injection unit with an alignment pin.

32. The injection system of claim 1, wherein the movable molding cart is operably coupled with the injection unit with a cart latch, the cart latch comprising a release shaft operably coupled with a manually actuated release knob at a first proximal end and pivotably attached to a first end of a connecting shaft at an opposed distal end, an opposed second end of the connecting shaft being pivotally coupled to a release cam fixedly coupled with a pivotable release bar extending across a width of the movable molding cart, a release bar having a release pin attached to each end of the release bar, and a pivotable latch attached to and extending horizontally from the injection unit, the pivotable latch having a front inverted cam surface and engagement notch on a lower edge thereof, wherein as the movable molding cart is moved toward the injection unit, the front inverted cam surface of the pivotable latch is engaged by the release bar and urged upwardly until the engagement notch is brought into registration with the release bar and the pivotable latch rotates into engagement with the release bar, thereby operably coupling the movable molding cart with the injection unit.

33. The injection system of claim 32, whereby the movable molding cart is released from the injection unit by pulling the release knob, rotating the release bar and causing the release pin to rotate the pivotable latch upwards and out of engagement with the release bar.

34. The injection system of claim 1, wherein the mold cavity has a vent comprising a slidable vent block restrained within opposing rails attached to an outer surface of the mold proximate the mold cavity vent, wherein the slidable vent block may be moved between a first position, in which the mold cavity vent is open and air and gases within the mold may be vented outside of the mold via the mold cavity vent, and a second position that closes off the cavity vent to the outside.

35. The injection system of claim 1, wherein the mold cavity has a vent comprising a rotatable vent carousel pivotably attached at a center thereof to an upper surface of the mold, the rotatable vent carousel further comprising a vent opening that is adapted for registration with the mold cavity vent, wherein the rotatable vent carousel may be rotated between a first position, in which the cavity vent is open and air and gases within the mold may be vented outside of the mold cavity via the cavity vent and the opening, and a second position that closes off the cavity vent to the outside.

36. The injection system of claim 35, further comprising a collar mounted to an upper surface of the rotatable vent carousel in a position disposed generally concentrically about the vent opening, within which a containment tube is received and releasably mounted.

37. The injection system of claim 1, wherein the mixing and injection head comprises a rotatable turbine and a static mix chamber housing, the rotatable turbine further comprising a cylindrical cavity adapted to receive an axially reciprocating plunger biased to a fully extended position by a spring disposed at a closed end of a central cavity, which spring urges the axially reciprocating plunger to a full extended position, and when the mixing and injection head is fully engaged with either of a fill cup or a rinse cup, a vertically extending pin mounted within each of the fill cup and rinse cup pushes the axially reciprocating plunger upward against the urging of the spring to allow injectable product to exit the mixing and injection head.

38. The injection system of claim 37, wherein the mixing and injection head may be engaged with the rinse cup at the conclusion of an injection cycle, whereupon the injection unit is then actuated to pass solvent rinse through the mixing and injection head, and the vertically extending pin mounted within the rinse cup pushes the axially reciprocating plunger upward against the urging of the spring to allow passage of the solvent rinse through the rinse cup and a waste line to a waste rinse vessel.

39. The injection system of claim 1, further comprising a controller for:
  selecting a program for a selected mold;
  lowering the vertical mixing chamber into the fill cup;
  engaging an injection cycle to deliver a predetermined quantity of raw materials to the vertical mixing chamber for the selected mold;
  mixing the raw materials within the vertical mixing chamber;
  injecting the raw materials from the vertical mixing chamber into the mold cavity;
  raising the vertical mixing chamber;
  moving the fill cup out of alignment with the vertical mixing chamber;
  lowering the vertical mixing chamber into a rinse cup; and
  engaging a rinse cycle by rinsing the vertical mixing chamber with a rinse material and expelling the rinse material into a collection vessel and drying the vertical mixing chamber.

40. The injection system of claim 39, wherein the rinse cup is disposed below the fill cup when the fill cup is in an injection position.

41. The injection system of claim 39, wherein the rinse cup is disposed to the side of the fill cup when the fill cup is in an injection position and both the rinse cup and the fill cup are displaced between an injection and rinse cycle.

42. An injection system to dispense, mix, and inject liquids into a vented investment pattern mold cavity of an investment pattern mold, the injection system comprising:
  a source of raw materials in fluid communication with an injection unit for metering and delivering the raw materials;

a mixing and injection head mounted proximate an edge of the injection unit that receives and mixes the metered raw materials; and a movable molding cart upon which the investment pattern mold is mounted disposed adjacent the injection unit and proximate the mixing and injection head, the movable molding cart further comprising a displaceable gating tray disposed within a channel of the movable molding cart, a fill cup disposed on the displaceable gating tray and mounted proximate an edge of an upper platform of the movable molding cart, and a closable sprue in alignment with the investment mold cavity, which fill cup may be controlled by a position of the mixing and injection head, an actuator, or manually so as to allow for an injectable product to be injected into an investment mold port of the investment mold cavity via the fill cup and sprue.

43. The injection system of claim 42, wherein the movable molding cart further comprises the displaceable gating tray providing fluid communication with the vented investment pattern mold cavity of the investment pattern mold, and wherein the displaceable gating tray is disposed within the channel, the channel further being provided in the upper platform of the movable molding cart.

44. The injection system of claim 43, wherein the movable molding cart has a locked molding position relative the injection unit and the displaceable gating tray has a first end to which the fill cup is mounted and aligned with and in fluid communication with the sprue and the investment mold port on a lower portion of the investment pattern mold at a second, opposite end of the displaceable gating tray.

45. The injection system of claim 44, wherein the displaceable gating tray is displaced by engagement with the mixing and injection head or the actuator.

46. The injection system of claim 44, wherein in a first position where the movable molding cart is in a position adjacent the injection unit, the displaceable gating tray aligns the sprue with the investment mold port on the lower portion of the investment pattern mold and wherein in a second position where the movable molding cart is removed from a position adjacent the injection unit, the displaceable gating tray closes fluid communication between the sprue and the investment mold port on the lower portion of the investment pattern mold.

47. The injection system of claim 44, further comprising a gating piston operably coupled with the displaceable gating tray, whereupon an operator may shift the displaceable gating tray to a closed position to close both the sprue and investment mold port according to a programmed cycle time.

48. A method for dispensing, mixing, and injecting the injection product into the mold cavity using an injection system according to claim 1, wherein the injection product chemically reacts to create a self-skinning foam article that completely fills the mold cavity and maintains its shape subsequent to removal from the mold cavity, the method comprising the steps of:

mounting the mold upon the movable molding cart;
moving the movable molding cart into proximity with the vertical mixing chamber;
delivering a predetermined quantity of the raw material of the injection product to the vertical mixing chamber;
mixing the predetermined quantity of the raw material of the injection product within the vertical mixing chamber;
injecting the predetermined quantity of the raw material of the injection product into the mold cavity via the fill cup and sprue;
sealing the mold cavity; and
rinsing the vertical mixing chamber with a rinse material and expelling the rinse material into a collection vessel and drying the mixing chamber.

49. The method of claim 48, further comprising the step of selecting a program for a selected mold and injection material.

50. The method of claim 48, wherein the mold cavity is a vented investment pattern mold cavity.

* * * * *